(12) United States Patent
Platt et al.

(10) Patent No.: US 12,146,821 B2
(45) Date of Patent: Nov. 19, 2024

(54) SHAPE ANALYSIS DEVICE

(71) Applicant: Loughborough University, Leicestershire (GB)

(72) Inventors: Mark Platt, Leicestershire (GB); Marcus Andrew Pollard, Leicestershire (GB); Eugenie Lee Hunsicker, Leicestershire (GB); Rhushabh Maugi, Leicestershire (GB); Steven Douglas Rae Christie, Leicestershire (GB)

(73) Assignee: Loughborough University, Leicestershire (GB)

( * ) Notice: Subject to any disclaimer, the term of this patent is extended or adjusted under 35 U.S.C. 154(b) by 0 days.

(21) Appl. No.: 17/771,345

(22) PCT Filed: Oct. 23, 2020

(86) PCT No.: PCT/GB2020/052699
§ 371 (c)(1),
(2) Date: Apr. 22, 2022

(87) PCT Pub. No.: WO2021/079153
PCT Pub. Date: Apr. 29, 2021

(65) Prior Publication Data
US 2022/0390347 A1 Dec. 8, 2022

(30) Foreign Application Priority Data
Oct. 23, 2019 (GB) .................................. 1915345.1

(51) Int. Cl.
*G01N 15/10* (2024.01)
*G01N 15/1031* (2024.01)
(Continued)

(52) U.S. Cl.
CPC ......... *G01N 15/12* (2013.01); *G01N 15/1023* (2024.01); *G01N 15/1031* (2013.01);
(Continued)

(58) Field of Classification Search
CPC ............... G01N 15/1056; G01N 15/12; G01N 15/1031; G01N 2015/0038; G01N 2015/1093
See application file for complete search history.

(56) References Cited

U.S. PATENT DOCUMENTS 9,664,643 B2    5/2017  Van Der Voorn et al.
2007/0159156 A1* 7/2007 Hu ........................ G01N 15/12
                                                              324/71.1
(Continued)

FOREIGN PATENT DOCUMENTS

EP    2211164       7/2010
JP    2019117064 A  7/2019
(Continued)

OTHER PUBLICATIONS

International Search Report for corresponding PCT Application No. PCT/GB2020/052699 dated Mar. 9, 2021.
(Continued)

*Primary Examiner* — Eman A Alkafawi
*Assistant Examiner* — Suresh K Rajaputra
(74) *Attorney, Agent, or Firm* — Caesar Rivise, PC

(57) ABSTRACT

According to the present invention there is provided a first particle sensor, a second particle sensor and a device for characterisation of one or more particles in a fluid sample comprising a first particle sensor and/or at least one second particle sensor. A method for characterising one or more particles in a fluid sample is also disclosed.

19 Claims, 27 Drawing Sheets

(51) Int. Cl.
    *G01N 15/12* (2024.01)
    *G01N 15/00* (2006.01)
(52) U.S. Cl.
    CPC ............... *G01N 2015/0038* (2013.01); *G01N 2015/103* (2024.01)

(56) References Cited

U.S. PATENT DOCUMENTS

| | | | |
|---|---|---|---|
| 2011/0089328 A1* | 4/2011 | Li | B01L 3/50273 324/693 |
| 2016/0171296 A1* | 6/2016 | Ikenoue | G06V 10/752 382/103 |
| 2016/0290993 A1 | 10/2016 | Lai et al. | |
| 2016/0334351 A1* | 11/2016 | Lu | G01N 27/06 |
| 2019/0204204 A1* | 7/2019 | Sarioglu | G01N 15/1056 |
| 2020/0217771 A1* | 7/2020 | Boersma | G01N 1/2273 |
| 2021/0387185 A1* | 12/2021 | Sarioglu | B01L 3/502746 |

FOREIGN PATENT DOCUMENTS

| | | |
|---|---|---|
| WO | WO2016139809 | 9/2016 |
| WO | WO2018/211503 | 11/2018 |

OTHER PUBLICATIONS

Search Report for related Great Britain Patent Application No. GB1915345.1 dated Apr. 6, 2020.
Hampson et al., "Additively Manufactured Flow-Resistive Pulse Sensors", Analytical Chemistry, 91, 2947-2954 (2019).
English abstract of WO2016139809.
Hernandez et al., "Plastic Teabags Release Billions of Microparticles and Nanoparticles into Tea", Environmental Science and Technology, vol. 53, pp. 12300-12310 (2019).

\* cited by examiner

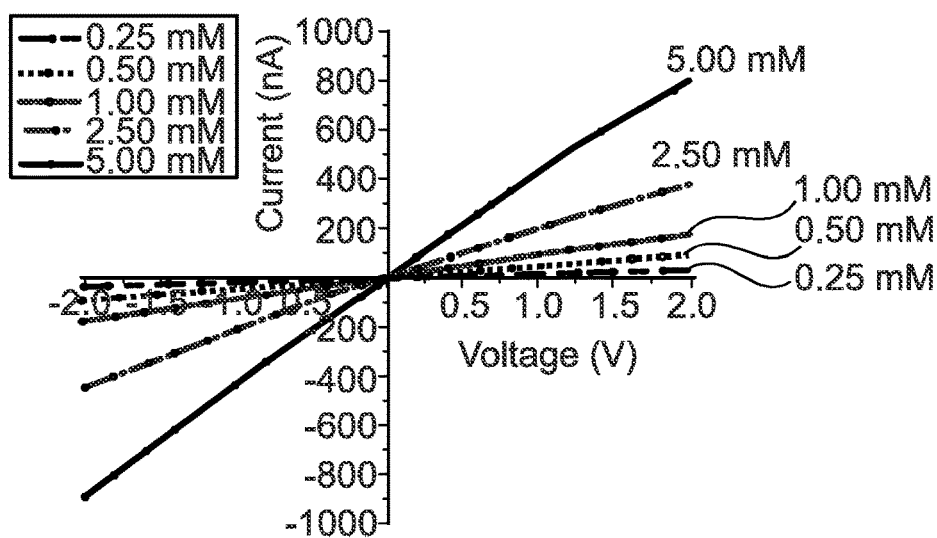
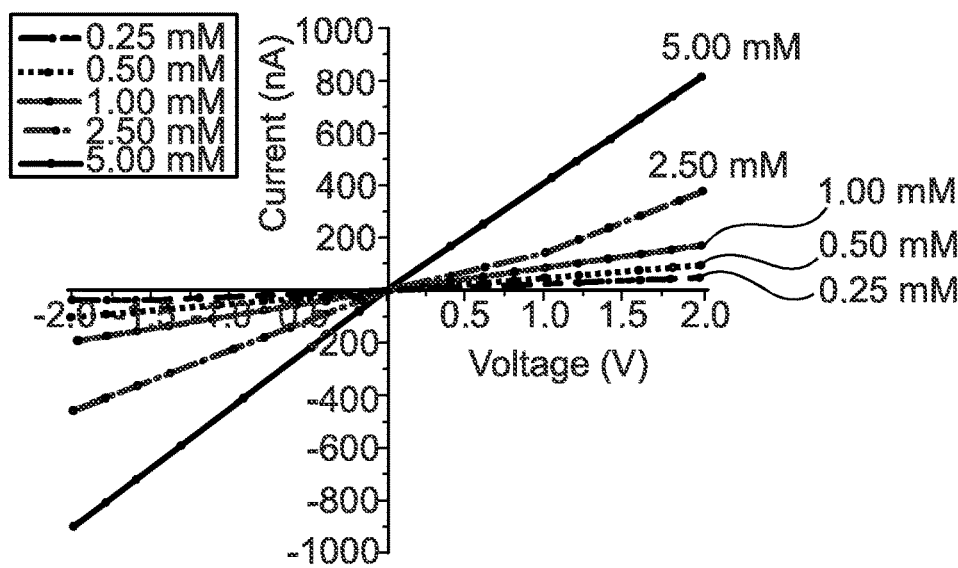
Fig. 29b-d a)

b)

SHAPE ANALYSIS DEVICE

CROSS REFERENCE TO RELATED APPLICATIONS

This United States national phase application claims the benefit under 35 U.S.C. § 371 of PCT Application No. PCT/GB2020/052699, filed on Oct. 23, 2020, which in turn claims priority to British Application Serial No. GB 1915345.1, filed on Oct. 23, 2019, and all of whose entire disclosures are incorporated by reference herein.

FIELD OF THE INVENTION

The present invention relates to a device for the characterisation of one or more particles in a fluid sample.

BACKGROUND TO THE INVENTION

The discovery and deployment of new materials requires their detailed characterisation. In the case of emerging materials for environmental (energy, agricultural), healthcare (nanomedicines, therapeutics) or food industry (food, packaging) details such as size, shape, charge, and concentration are essential. There is increasing evidence that properties of materials such as nanomaterials and their applications are not only dependent on the chemical properties of the materials but also the physical and mechanical characteristics of the materials. Rapid, onsite or inline analysis within the manufacturing industry is limited. Current state of the art uses microscopy (electron or optical) which is costly, low throughput and provides limited information of the materials in their natural environment. Solution based techniques include light scattering which can be complicated by flow. Furthermore, it can be difficult to work with multimodal sample sets and turbid solutions. There is also lack of technologies available to quantify shape properties of nano-objects in a high-throughput manner.

An emerging technology over the last two decades, which has become more common place for biological samples such as DNA, are Resistive Pulse Sensors (RPS). Most of the research and commercial activity within RPS has focused on DNA sequencing/analysis. The theory and applications of RPS for nanomaterials is emerging and growing rapidly and is ready to be exploited and applied to the manufacturing of emerging nanomaterials.

The traditional route for analysis of materials is to run the reaction/synthesis, extract and then analyse the products. These workflows are often referred to as batch reactors. The translation of batch synthesis onto continuous flow platforms represent an area of increased research over the last decade. They offer lower production costs, as well as reducing the variation in products from batch-to-batch. However, infrequent sampling/monitoring of the reaction within fluidic reactors limits the benefit of the flow process. Thus, improvements within micro-reactor systems lie in the manufacturing of complete laboratories on a chip. These "lab-on-a-chip" devices guarantee uniform mixing, and fluidic behaviour with integrated continuous inline monitoring of chemical products for high-throughput processing.

It is desirable for a sample mixture to have individual particle sorting and analysis so that the size, charge and concentration of various particles can be determined. Current techniques have a fixed range such that they only measure one type of material. There is a need for high-throughput inline sensors for nanomaterials with single particle resolution, capable of dealing with nano to micro particles.

An emerging fabrication process for microfluidic systems is additive manufacturing (AM) or 3D printing. It is a favourable alternative mainly due to its ability to build a 3D design from an STL (standard tessellation language) file with no intermediate steps, thus minimising labour, time and costs. AM allows bespoke flow channels to be designed and interfaced into for the analytical platform.

BRIEF DESCRIPTION OF SEVERAL VIEWS OF THE DRAWINGS

The present invention will now be described by way of example only and with reference to the accompanying drawings in which:

FIG. 20d-g show different flow set ups for a second particle sensor;

FIG. 22(a) shows a schematic of the RPS setup and signal. Nanoparticles pass through the pore and produce a time-current signal. The signal can be characterised based upon its magnitude, $\Delta ip$, the width across the pulse e.g. full width half maximum (FWHM), or its shape.

FIG. 22 (bii) is a SEM image of CPC200 polystyrene particles. Scale bar is 1 μm;

FIG. 25 shows visualisation of the key spline segments that identify particle shape as determined by multiple t-tests with a Bonferroni correction;

BRIEF SUMMARY OF THE INVENTION

Figure 1:
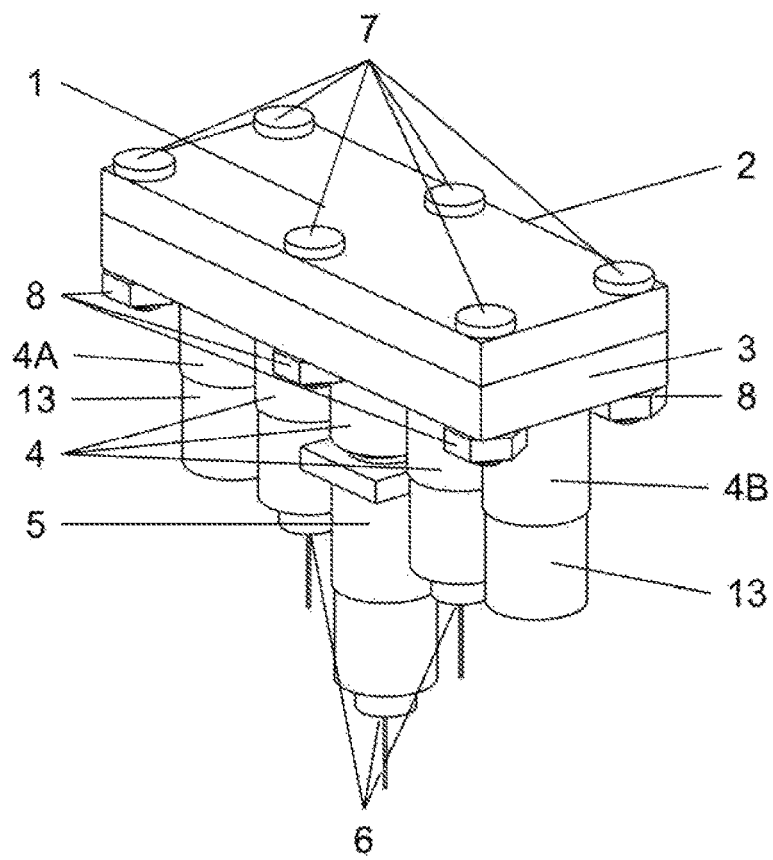
FIG. 1 is a perspective view illustration of a device according to an embodiment of the present invention.

According to the present invention there is provided a first particle sensor comprising:
  a base comprising a microfluidic channel, wherein the microfluidic channel comprises a first electrode and a second electrode positioned along the microfluidic channel, wherein the first particle sensor is configured such that when a fluid sample comprising at least one particle passes along the microfluidic channel and over the first and second electrodes, each of the at least one particle is recorded as a pulse (e.g. a resistive or conductive pulse).

According to another aspect of the present invention there is provided a second particle sensor comprising:
  a holder which houses a membrane and an electrode, wherein the membrane comprises at least one hole, wherein the second particle sensor is configured such that when a fluid sample comprising at least one particle passes through the at least one hole of the membrane, the electrode detects at least one particle in the fluid sample records a pulse (e.g. a resistive or conductive pulse).

According to a further aspect of the present invention there is provided a device for characterisation of one or more particles in a fluid sample comprising:
  (i) a first particle sensor as described herein; and/or
  (ii) at least one second particle sensor as herein described, wherein the device further comprises a fluid inlet and a fluid outlet which are connected by the first particle sensor, wherein in use, the fluid sample flows in through the inlet, along the microfluidic channel of the first particle sensor, over the first and second electrodes, and exits through the fluid outlet, and wherein each of the at least one particle is recorded as a pulse (e.g. a resistive or conductive pulse).

According to a further aspect of the invention, there is provided device for characterisation of one or more particles in a fluid sample, the device comprising:
  a first particle sensor comprising a base comprising a microfluidic channel, wherein the microfluidic channel comprises a first electrode and a second electrode positioned along the microfluidic channel, and a detection region between the first and second electrodes;
  an inlet; and
  an outlet,
wherein, in use, a fluid sample comprising at least one particle flows in through the inlet, along the microfluidic channel of the first particle sensor, over the first and second electrodes, and exits through the fluid outlet, and wherein the passage of said at least one particle through the detection region is recorded as a pulse (e.g. a resistive pulse).

According to a further aspect of the invention, there is provided a device for characterisation of one or more particles in a fluid sample, the device comprising:
- an inlet
- an outlet
- a microfluidic channel extending between the inlet and the outlet and providing an axial flow path for fluid flowing therealong
- a first particle sensor for detecting the passage of particles moving along the axial flow path first and second electrodes positioned along the microfluidic channel
- wherein, in use, one or more particles flowing along the microfluidic channel are detected by the first particle sensor and passage of said one or more particles is recorded as a pulse (e.g. a resistive pulse).

The first particle sensor may be aligned with the flow path or may extend obtusely, acutely or orthogonally to the axial flow path.

In a yet further aspect of the invention there is provided a device for characterisation of one or more particles in a fluid sample, the device comprising:
- an inlet;
- an outlet;
- a microfluidic channel extending between the inlet and the outlet and providing an axial flow path for fluid flowing therealong;
- a particle sensor for detecting the passage of particles moving along the axial flow path, the particle sensor extending at an angle to the microfluidic channel;
- first and second electrodes wherein, in use, one or more particles flowing along the microfluidic channel are detected by the particle sensor and passage of said one or more particles is recorded as a pulse (e.g. a resistive pulse).

The particle sensor may comprise a flow path for particles. The particle sensor or the flow path may extend obtusely, acutely or orthogonally to the axial flow path. In an embodiment the particle sensor extends at right angles to the microfluidic channel.

The flow of fluid through the microfluidic channel of the device may be driven by a pressure applied to the fluid (e.g. by a pump), by the application of a potential difference between the first and second electrodes, or by a combination of both pressure and the potential difference. In some embodiments, fluid flow is predominantly driven by pressure applied to the fluid and, to a lesser extent, the potential difference between the first and second electrodes or vice versa.

In some embodiments (e.g. in use), the microfluidic channel is filled with an electrolyte solution.

The first particle sensor comprises a detection region at a point along the longitudinal axis of the microfluidic channel and/or the axial flow path, between the first and second electrodes. The detection region may comprise a constriction or a nanopore in the channel. The passage of particles in the fluid sample through the detection region may be recorded as a pulse.

In some embodiments, a second particle sensor may be provided. The base of the first particle sensor comprises at least one port for receiving a further sensor, for example a second particle sensor. In embodiments plural second sensors may be provided.

In some embodiments, the first particle sensor is configured to detect particles of from 1 µm to 100 µm, from 5 µm to 100 µm in size, from 10 to 80 µm, or from 20 to 50 µm. In some embodiments, the first particle sensor is configured to detect particles of from 5 µm to 50 µm. Thus, particles which are smaller than 1 µm will not be detected by the first particle sensor.

It will be appreciated that the cross-sectional area of the microfluidic channel, or that of the detection region therein, can be selected in accordance with the size of the particles being detected. Thus, in some embodiments, the microfluidic channel, or the detection region therein, has a cross-sectional area of less than $10^4$ µm$^2$.

As such, the first particle sensor may be capable of detecting, characterising and/or counting biological particles such as cells (e.g. bacterial cells, fungal cells, algae mammalian cells, human cells, blood cells, cancer cells, stem cells), exosomes, vesicles, proteins, protein-protein or protein-nucleic acid complexes, nucleic acids, antibodies, colloids, organic particles such as polymer particles and drug particles, inorganic particles such as metal particles, bubbles and emulsions.

Optionally, the device comprises at least one second particle sensor comprising a nanopore.

The second particle sensor may further comprise at least one electrode. The second particle sensor may be configured such that when a fluid sample comprising at least one particle passes through the nanopore, the electrode detects at least one particle in the fluid sample and records a pulse (e.g. a resistive or conductive pulse).

In some embodiments, the nanopore of the second particle sensor is a solid state nanopore.

As is known to those skilled in the art, solid state nanopores typically comprise a hole (e.g. from 1 to 1000 nm in diameter) formed in a membrane. The membrane may be formed from any suitable material. In some embodiments, the membrane is formed from a material selected from the group consisting of silicon nitride, silicon dioxide, glass, graphene, plastics (e.g. polyurethane or polyester).

In some embodiments, the nanopore is provided in a nanopipette. As is known in the art, nanopipettes are a class of nanopores which can be used for the detection and analysis of single molecules in solution. Nanopipettes can be easily fabricated with highly controlled pore sizes, making then a cost effective alternative to traditional solid state nanopores. The detection and analysis of a single molecule using a nanopipette relies on resistive pulse sensing. For this, the nanopipette is filled with and the tip immersed in an electrolyte and a voltage is applied between an electrode in side and an electrode outside of the nanopipette to generate an electric field at the tip. This field drives the molecule of interest through the nanopipette pore, resulting in a detectable pulse.

The nanopipette may be formed from any suitable material, such as a metal, polymer, glass, quartz, organic materials (e.g. graphene) or inorganic materials (e.g. boron nitride). In some embodiments, the nanopipette is made from glass or quartz.

Nanopipettes may be fabricated using methods which will be known to those skilled in the art. Typically, nanopipettes are pulled from capillaries (e.g. quartz) using mechanical pipette pullers.

It will be appreciated that the diameter of the nanopore of the second particle sensor can be selected in accordance with the size of the particles being detected. In some embodiments the second particle sensor is configured to detect particles of from 1 nm to 100 µm, from 5 nm to 50 µm, from 10 nm to 20 µm, from 20 nm to 10 µm, from 30 nm to 10 µm, from 40 nm to 5 µm, from 50 nm to 2 µm, or from 100 nm to 1 µm in size.

Thus, in some embodiments, the nanopore has a diameter of from 1 nm to 100 µm, from 5 nm to 50 µm, from 10 nm to 20 µm, from 20 nm to 10 µm, from 30 nm to 10 µm, from 40 nm to 5 µm, from 50 nm to 2 µm, or from 100 nm to 1 µm in size. It will be appreciated that nanopores are not necessarily circular. As such, the "diameter" of the nanopore in this context refers to the average dimension of the pore. It will further be appreciated that references to the diameter of the nanopore refers to the internal diameter.

As such, the second particle sensor may be capable of detecting, characterising and/or counting particles such as microorganisms (e.g. bacterial cells, fungal cells, algae), viruses, nucleic acids (e.g. DNA, RNA), peptides, proteins, polymer particles, inorganic particles, metal particles, bubbles, and emulsions.

Conveniently, the second particle sensor can be configured to detect particles which are different in size to the particles which the first sensor is configured to detect. It may be that the second particle sensor is configured to detect a range of particle sizes which is different to the range of particle sizes which the first particle sensor is configured to detect. The second particle sensor may be configured to detect particles which are smaller than the particles which the first sensor is configured to detect. Thus, the second particle sensor may comprise a nanopore having a diameter which is smaller than the diameter (or the largest dimension) of a constriction or nanopore of the first particle sensor. The second particle sensor may therefore be able to measure particles which are not measured by the first particle sensor. The range of particle sizes detectable by the first and second particle sensors, respectively, may or may not overlap. For example, the first particle sensor may be configured to detect particles falling within a range of from 2 µm to 100 µm, while the second particle sensor may be configured to detect particles falling within a range of from 1 nm to 2 µm. For example the population of particles flowing through the device or flowing along the microfluidic channel may be polydisperse and/or have a broad distribution of sizes. The first particles sensor may be configured to detect a first subset of particle sizes within the broad distribution of particle sizes wherein the second particle sensor may be configured to detect a second, distinct subset of particle sizes within the broad distribution of particle sizes. Optimally, the first particle sensor may detect a first subset of particle sizes which are relatively large whereas the second particle sensor may detect a first subset of particle sizes which are relatively small. The first subset of particle sizes and the second subset of particle sizes may overlap or may not overlap.

It will be appreciated that references to a particle size, as used herein, refer to a largest transverse dimension for a given particle. Particles detectable by the sensors and device of the invention are not necessarily spherical, but may be elongate or irregular in shape. It will be appreciated that the invention allows for the determination of a volume of a particular particle.

Advantageously, the use of first and second particle sensors which are configured to detect different sizes of particles enables the device as a whole to detect particles which span a much wider range of sizes, for example from nano- to micro-sized analytes. It will be appreciated that the first and second sensors can be independently configured to detect particles within a desired size range. The tunability of each sensor means that the device can be tailored for a given application, e.g. to the type of fluid being analysed.

In some embodiments, the device comprises two or more second particle sensors. For example, the device may comprise three, four, five, six or more second particle sensors.

In some embodiments, one of the second particle sensors is configured to detect particles of a different size (i.e. falling in a difference size range) to the particle size (or particle size range) detectable by one or more of the other second particle sensors. In some embodiments, each second particle sensor is configured to detect particles of a different size, or a different particle size range. In some embodiments, one of the second particle sensors comprises a nanopore having a diameter which is different to the diameter of a nanopore within another of the other second particle sensors. In some embodiments, each of the second particle sensors comprises a nanopore having a different diameter to each of the nanopores within the other second particle sensors.

The nanopore of the second particle sensor may be located off-axis relative to the longitudinal axis of the microfluidic channel. By "off-axis" it will be understood that the second particle sensor is off-set from the main direction of fluid flow within the microfluidic channel. For example the second particle sensor may extend at an angle to the microfluidic channel. In an embodiment the second particle sensor may provide a flow path for particles. The flow path may extend obtusely, acutely or orthogonal to the microfluidic channel or to the axial flow path It may be that the nanopore is located within a second channel which extends from the (main) microfluidic channel. The second channel thus provides an additional flow path along which fluid can flow, through the nanopore of the second particle sensor. The nanopore may be spaced apart (i.e. set back from) from the fluid flow within the microfluidic channel.

The second channel may extend perpendicularly (i.e. at a 90° angle) from the microfluidic channel. In such embodiments, the nanopore may be positioned parallel to the longitudinal axis of the microfluidic channel (i.e. parallel to the main direction of fluid flow). An arrangement in which the second channel (or each second channel, in embodiments wherein multiple second particle sensors are provided) extends perpendicularly from the main microfluidic channel may facilitate manufacturing.

Alternatively, the second channel may extend from the microfluidic channel at a non-perpendicular angle, i.e. at an angle which is greater than or less than 90°. In further embodiments, the second channel may bend as it extends from the microfluidic channel. It will be appreciated that in such embodiments, the nanopore may not be parallel to the longitudinal axis of the microfluidic channel, but instead may be angled relative thereto.

The second particle sensor may be positioned upstream of the detection region of the first particle sensor (i.e. between the inlet and the detection region), or it may be positioned downstream of the detection region (i.e. between the detection region and the outlet) or first particle sensor. It may be that a second channel in which the second particle sensor may be located (or may provide) joins the microfluidic channel at a point upstream or downstream of the detection region of the first particle sensor. In embodiments in which the device comprises two or more second particle sensors, one or some of the second particle sensors may be located upstream of the detection region, while the remaining second particle sensors may be located downstream. Alternatively, all of the second particle sensors may be located upstream of the detection region, or all of the second particle sensors may be located downstream of the detection region.

In some embodiments the second particle sensor comprises a holder which houses the nanopore (i.e. a solid state nanopore comprising a membrane, or a nanopipette) and an electrode.

The holder may have a second channel therein, wherein the nanopore is located inside the second channel. When the second particle sensor is connected to the base of the first particle sensor, the second channel joins (i.e. forms a flow path with) the microfluidic channel. For example, the holder may be in the form of a plug or screw which is configured to be releasably inserted into a port in the base of the first particle sensor, thereby forming a fluid connection between the microfluidic channel and the second channel. Thus, fluid is able to flow from the main microfluidic channel and into the second channel such that it passes through the nanopore.

In some embodiments, the nanopore (e.g. the nanopipette, or solid state nanopore membrane) does not extend across the full width of second channel such that fluid is able to flow past, rather than through, the nanopore. The second channel may extend through the holder to a surface thereof and may have an open end, thereby providing an outlet for fluid which has flowed through and/or around the nanopore.

In some embodiments, the second particle sensor further comprises a tube. The tube may be in fluid communication with the second channel. At least a portion of the tube may be housed within the holder. In some embodiments, a part of the tube extends from the holder. In some embodiments, the tube provides a further fluid outlet of the device. Fluid which flows past (and/or through) the nanopipette may flow into the tube, and out of the device. The presence of the tube has been found to aid fluid flow in the device, and to facilitate set-up of the device by enabling removal of air bubbles.

Conveniently, the second particle sensor may be reversibly connected to the base of the first particle sensor. This enables a device to be provided in which the second particle sensor (or some or all of the second particle sensors) is interchangeable. As such, a second particle sensor can be selected having the most appropriate nanopore size for the detection of small particles. In this way, the sensitivity of the device can be tailored to the required use, or the nature of the fluid being analysed. When there is a second particle sensor present, the sensor may be filled with an electrolyte solution between the nanopore and the electrode (e.g. between the membrane and the electrode).

In some embodiments, the (or each) second particle sensor may comprise, or be connected to, a flow regulator (e.g. a pump). The flow regulator may be used to control the fluid flow through the second sensor. In embodiments wherein the second particle sensor does not comprise, or is not connected to a flow regulator, fluid flow through the second sensor will be driven primarily or exclusively by the potential difference between the working electrode of the second particle sensor and the ground electrode.

As discussed above, the first particle sensor comprises a first electrode (a ground electrode) and a second electrode (a working electrode). Application of a potential difference between the first and second sensors enables the detection of particles by the first particle sensor, and may also contribute towards driving the flow of fluid through the microfluidic channel. The first and second electrodes thus form a first electrode set.

The second particle sensor may comprise at least one electrode. In some embodiments, the second particle sensor comprises a single electrode, which is a working electrode. The first electrode (the ground electrode) of the first particle sensor may also serve as a ground electrode for the second particle sensor. Thus, in some embodiments a second electrode set is formed by the first (ground electrode) of the first particle sensor, and the working electrode of the second particle sensor. For example, in an embodiment in which the device comprises two sensors, a first particle sensor and a second particle sensor, the device may comprise three electrodes including a common ground electrode and a working electrode for each particle sensor.

In embodiments wherein multiple second particle sensors are provided, each second particle sensor may comprise a working electrode, and each of the first and second particle sensors may share a common ground electrode (the first electrode).

Alternatively, the (or each) second particle sensor may be provided with its own ground electrode in addition to a working electrode. Thus, the or each second particle sensor may comprise an electrode set.

In some embodiments, the device comprises one or more third sensors. A third sensor may be configured for measuring a parameter of the fluid such as oxygen content, pH, ionic strength, temperature or viscosity. Thus, a third sensor may comprise a probe for measuring a desired parameter, such as a pH probe, a viscosity probe, an oxygen probe, and ionic strength probe or a thermometer. In some embodiments, the device may comprise a plurality of third sensors. Each of the third sensors may be configured to detect a different parameter of the fluid.

In some embodiments, the third sensor comprises a holder which houses the probe. Like the holder of the second particle sensor, the holder of the third sensor may take the form of a plug or screw which can be inserted into a port in the base of the first particle sensor, such that the probe is able to contact fluid flowing through the microfluidic channel.

Thus, in a further aspect the invention provides a kit for characterisation of one or more particles in a fluid sample, the kit comprising:
  a device comprising a first particle sensor as described herein; and
  at least one further sensor for connecting to the first particle sensor (e.g. for connecting to the base of the first particle sensor). The further sensor may be a second particle sensor and/or a third sensor, as described herein.

Conveniently, the further sensor may be releasably connectable to the base of the first particle sensor. In some embodiments, the base of the first particle sensor comprises at least one port for receiving the further sensor.

In some embodiments, the second particle sensor comprises a holder which houses a nanopore and an electrode, the holder having a second channel therein in which the nanopore is located, and wherein the holder is configured to be releasably inserted into a port in the base of the first particle sensor.

In some embodiments, the kit comprises at least one second particle sensor, and at least one third sensor.

In some embodiments, the kit comprises two or more second particle sensors, wherein one of the second particle sensors comprises a nanopore having a diameter which is different to the diameter of a nanopore within another of the other second particle sensors.

For example, one of the second particle sensors may comprise a first nanopore having a first diameter, and another of the second particle sensors may comprise a second nanopore having a second diameter, wherein the first diameter is different to the second diameter.

In some embodiments, the kit comprises a plurality of second particle sensors, e.g. 2, 3, 4, 5, 6 or more second particles sensors. In some embodiments, each of the second particle sensors comprises a nanopore having a diameter which is different to the diameter of a nanopore within each of the other second particle sensors.

The kit may comprise at least one third sensor for connecting to first particle sensor (e.g. for connecting to the base of the first particle sensor). In some embodiments, the kit comprises two or more third sensors (e.g. 2, 3, 4 or more third sensors).

The present invention thus conveniently provides a modular system wherein different sensors can be interchangeably connected to a first particle sensor comprising a microfluidic channel.

The device may further comprise a lid which is configured to seal the microfluidic channel of the device.

In some embodiments, the lid may also create a constriction within the microfluidic channel, so as to tune the sensitivity of the first particle sensor.

The lid may comprise a primary ridge which fits into and is configured to seal the microfluidic channel. In some embodiments, the lid comprises a primary ridge which is configured to be received within the microfluidic channel when the lid is placed on the base, thereby reducing the volume of the channel. The primary ridge may have a depth with is less than a depth of the microfluidic channel. The primary ridge may have a length (the length being the dimension which is measured in parallel with the longitudinal axis of the base/microfluidic channel) which is substantially the same as a length of the microfluidic channel. The primary ridge may have a width which is substantially the same as a width of the microfluidic channel.

Optionally, the primary ridge further comprises a secondary ridge extending from the primary ridge. The secondary ridge may function to create a constriction within a portion of the microfluidic channel, or at a specific point within the channel. The secondary ridge may have a width which is substantially the same as the width of the primary ridge.

Optionally, the secondary ridge comprises a conduit which allows the fluid sample to flow through the secondary ridge when the lid seals the microfluidic channel. In some embodiments, the primary ridge and the secondary ridge together span the height and width of the microfluidic channel when the lid is placed on the base. In such embodiments, the secondary ridge comprises a conduit which allows fluid to flow through the secondary ridge when the lid seals the microfluidic channel.

In some embodiments, the lid comprises a layer (e.g. a polymer layer) on a surface of the lid which contacts the base when the lid is placed on the base, so as to seal the microfluidic channel. The layer (e.g. the polymer layer) thus functions as a gasket.

The layer (e.g. polymer layer) may cover substantially the whole of the surface, or a portion of the surface. For example, in embodiments wherein the lid comprises a primary ridge, and optionally a secondary ridge, the layer (e.g. polymer layer) may not cover the primary and/or the secondary ridge.

The layer (i.e. gasket) may be formed from any suitable deformable (e.g. compressible) material. Suitable materials include synthetic or natural rubbers, silicone, cork, cellulose, foam, nitrile and fibre. In some embodiments, the layer is a polymer layer. The polymer layer may be formed from a deformable polymer, such that the shape of the polymer layer can be altered upon application of a force. Suitable polymers include polydimethyl siloxane (PDMS).

In some embodiments, the lid is attached to the base with one or more screws. The lid may be attached to the base by a plurality of screws, for example 2, 3, 4, 5, 6 or more screws.

In some embodiments in which the lid comprises a polymer layer, upon tightening the screws which attach the lid to the base, the polymer layer may be deformed and forced into the microfluidic channel, thereby reducing the volume of the channel.

It will therefore be appreciated that the internal volume (i.e. the shape and/or dimensions) of the microfluidic channel, and thus the sensitivity of the first sensor, can be conveniently controlled by (i) the structure of the lid, via the provision of a primary ridge and, optionally, a secondary ridge, and/or (ii) the provision of a deformable polymer layer which can be compressed into the microfluidic channel.

Optionally, device comprises a polymer layer between the lid and the base, wherein the polymer layer is configured to seal the device, preferably wherein the polymer layer is a polydimethyl siloxane (PDMS). Optionally, the polymer layer may be configured to tune the sensitivity of the device.

In some embodiments, one or more components of the device are 3D printed. For example, the base, the lid and/or the holder of the second sensor may be 3D printed. In some embodiments each of the components of the device are 3D printed.

The base may further comprise a groove which comprises an O-ring, which surrounds the microfluidic channel and is configured to prevent leaks from the microfluidic channel.

Optionally, the device is configured on a chip, preferably the chip is for inline processing.

In accordance with the present invention, there is provided a method of characterising one or more particles in a fluid sample comprising one or more of the devices as described herein, wherein the method comprises passing a fluid sample comprising at least one particle through the fluid inlet, along the microfluidic channel, over the first and second electrodes, and out of the fluid outlet; and wherein under the application of a potential difference between the first and second electrodes, each of the at least one particles present in the fluid sample is recorded as a resistive pulse.

Preferably, the method further comprises the step of using predictive logistic regression models to characterise the resistive pulses to determine information on the particle size, shape and flow rate.

The method may be used for characterization of one or more of:
(i) cells in body fluids
(ii) organic compounds, proteins, peptides, cells, bacteria, fungi, algae, viruses, nucleic acids (e.g. DNA), exosomes, colloids, polymer particles (e.g. microplastics) and nanomedicines
(iii) inorganic materials, such as metal particles.

The method of the present invention may be used for in-line sensing of one or more fluid samples for high-throughput processing.

The base of the device may be comprised of a polymer and/or a resin and may be manufactured using a mould/manufacturing technique that can create a 3-D shape. 3-D printing techniques which may be used for the present invention would be well known to the person skilled in the art. Alternatively, any other convenient manufacturing process may be used to create the device, such as moulding or microinjection.

Resistive pulse sensors (RPS) provide detailed characterisation of materials from small molecules to nanomaterials on an individual particle basis. They provide information on the particle size, shape, concentration and charge with some information also available on particle shape. Importantly the low cost of RPS and high-throughput (tens to hundreds of particles per second) make it applicable within the manufacturing work flow. There has also been recent advancement to apply the technology for a high-throughput characterization of object's deformation. Thus, RPS provides multipronged non-destructive characterization of nanomaterials.

The signal within the RPS experiment can reveal information about the shape of the material. Resistive pulse sensing may also be combined with predictive logistic regression models, termed RPS-LRM, to rapidly characterise a nanomaterial's size, aspect ratio, shape and concentration when mixtures of rods and spheres are present in the same solution. RPS-LRM may be applied to the characterisation of nanoparticles over a wide size range and varying aspect ratios and can distinguish between nanorods over nanospheres when they possess an aspect ratio grater then two. The RPS-LRM can rapidly measure the ratios of nanospheres to nanorods in solution within mixtures, regardless of their relative sizes and ratios i.e. many large spherical particles do not interfere with the characterisation of smaller nanorods.

High aspect nanopores are used herein to identify the shape of individual nanoparticles in solution. The signals recorded by spheres and rods are sufficiently different to permit their classification on an individual basis. The analysis is quick, analysing hundreds of particles within seconds. Further, the differences observed experimentally between rod and sphere pulse shape correspond to computational models of predicted pulse shapes, which allows for the characterisation of nanoparticle shape more broadly using large pore RPS coupled to statistical methods. Calibrating the response of the nanopore method makes the process reproducible across several nanopores and days and allows accurate measurement of the ratio of spheres and rods in solution.

During the RPS procedure, particles pass through a channel or pore which conducts ions, and the change in ionic current versus time is monitored. The change in current during each translocation, also known as a 'pulse', is dependent upon the ratio of the particle and channel dimensions. Information on the particle size, concentration and velocity can be measured even in turbid solutions flowing at high velocities.

RPS can be made from materials such as graphene, polymer, silicon nitride and glass. Their sensitivity may be varied by altering the dimensions of the channel. The transport through the pore or channel may be controlled by tuning the potential difference, charge on the pore wall, electrophoretic mobility of the analyte, supporting electrolyte concentration and induced convection. Maintaining sensitivity whilst retaining high count rates has in past been a challenge as the pulse frequency is directly related to the pore size.

The present inventors have found that by using additively manufactured flow channels, different sensors can be included, designed and tailored for different applications. By combining additively manufactured parts with, precision ion drilled nanopores, multiple sensors can be included within the same flow channel. Preferably, wherein the flow channel has more than one sensor. More preferably there are two or more sensors. However, the number of sensors can be more than one, more than two, more than three, more than four. Optionally, the number of sensors can be greater than 10. Preferably wherein the sensor is a nanopore sensor. The number of sensors and sizes of flow channels can be tailored to the desired application of the device and the particles to be detected.

The use of flow allows particles to be counted quickly and observed at an event per second at low particle concentrations (for example, $1\times10^{-3}$ particles/ml). The sample is flowed/injected into the sensor through the fluid inlet. As the sample passes through the microfluidic channel it passes through a narrow constriction and the particles are characterised by the one or more sensors.

The translocation of a nanoparticle or analyte through these microfluidic channels can be monitored by measuring ionic current. Each translocation event causes a change to conductance of the channel known as Resistive Pulse, which is related to the physical properties of the analyte. Resistive Pulse Sensors are therefore highly attractive sensing platforms that have single particle/analyte resolution. Information of analyte size, concentration and charge can be measured quickly, reliably and to a high level of sensitivity. The microfluidic channel dimensions can be created to suit the size of the particles to flow through the channel.

The microfluidic channel may be formed by using 3-D printing and may allow particles having a size of from 1 micron to 100 microns, preferably from 5 to 50 microns and optionally from 10 to 25 microns to be detected. However, any channel size desired can be created. The microfluidic channel may have multiple sensors to allow characterisation of the size, shape and concentration of one or more particles present in a fluid sample.

The particles to be characterised are present in a fluid sample. By fluid sample this means a particle in solution. The fluid sample may comprise any conductive liquid which includes, but is not limited to, fluids such as blood, urine, buffer solution or a salt containing solution such as sea water. The one or more particles may be selected from, but not limited to organic compounds, proteins, DNA, cells, bacteria, viruses, exomes, colloids and nanomedicines.

To adjust the sensing range of the device of the present invention, rather than having to manufacture a different sized constriction, the standard flow microfluidic channel is retained and the device further comprises a lid which both seals the device (and allows easy access for cleaning) but tunes the sensitivity of the device by inserting a protrusion into the channel, altering the size of the constriction and thus tuning the sensitivity. By keeping the same flow channel and changing the lid, the sensitivity of the sensor can be adjusted. The shape, size and number of protrusions inserted into the flow from the lid may aid the measurement of particle size and shape and can be altered accordingly.

The lid provides a reusable seal which allows easy assembly/disassembly and cleaning. The lid may comprise a primary ridge which may be adjustable insert to refine the sensitivity of the device. The lid may be of any suitable size or shape. The primary ridge may be one or more ridges. The primary ridge may be fabricated to correspond to the dimensions of the microfluidic channel. The primary ridge may further comprise a secondary ridge extending therefrom. The secondary ridge may be of any size, but preferably is smaller in dimensions than the primary ridge and may further comprise a conduit that allows liquid to pass through the ridge of the lid.

In accordance with a preferred aspect of the present invention there is provided a first particle sensor which comprises a base comprising a microfluidic channel, wherein the microfluidic channel comprises a first electrode and a second electrode positioned along the microfluidic channel, wherein the first particle sensor is configured such that when a fluid sample comprising at least one particle passes along the microfluidic channel and over the first and second electrodes, under the application of a potential difference between the first and second electrodes, each of the at least one particle is recorded as a resistive pulse.

The present invention may also comprise a second particle sensor which comprises a holder which houses a membrane and an electrode, wherein the membrane comprises at least one hole, wherein the second particle sensor is configured such that when a fluid sample comprising at least one particle passes through the at least one hole of the membrane, the electrode detects at least one particle in the fluid sample records a resistive pulse.

DETAILED DESCRIPTION OF THE PREFERRED EMBODIMENTS

Figure 2:
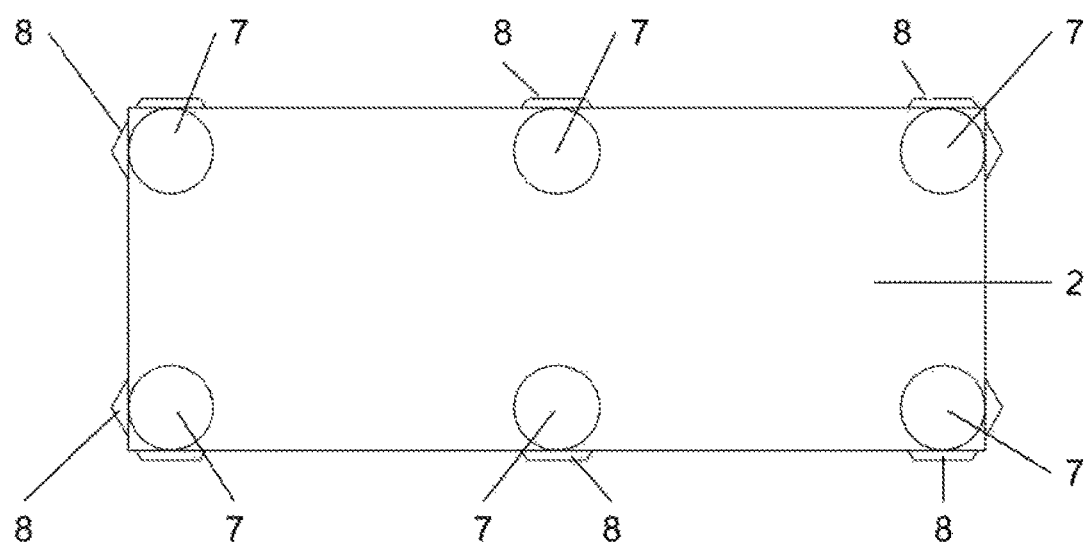
FIG. 2 shows a device according to an embodiment of the present invention from above.
Figure 3:
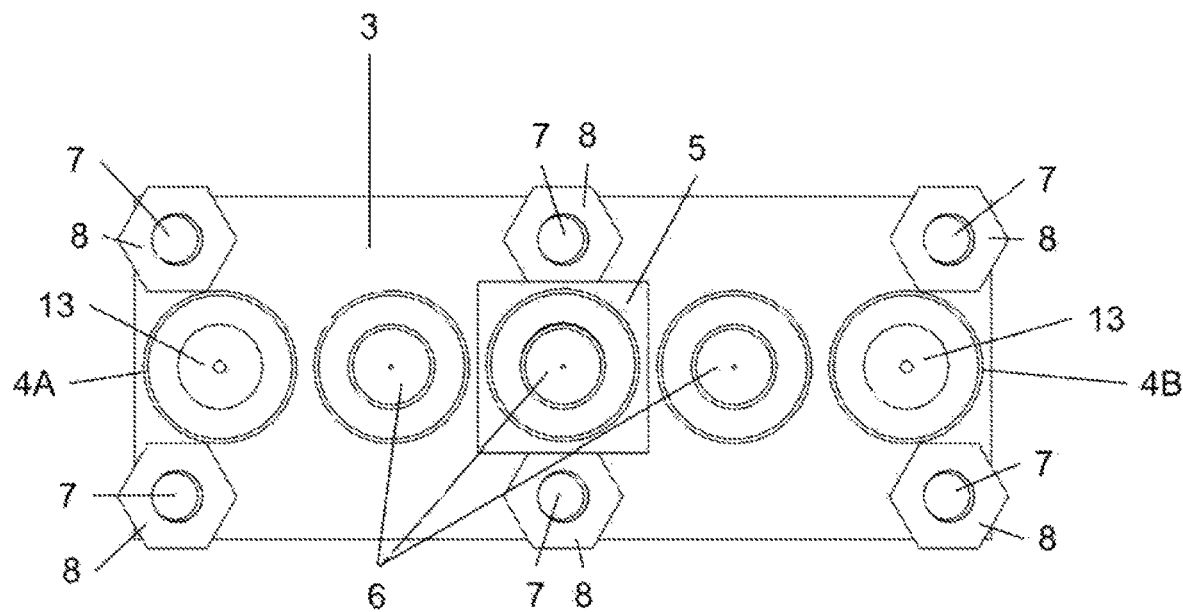
FIG. 3 shows a device according to an embodiment of the present invention from below.

FIG. 1 shows the preferred embodiment of the assembled device (1) with its main components of the lid (2) and device base (3). The assembled device further comprises threaded apertures (4) which allow the second particle sensor (5) and electrodes (6) to be screwed into the device (1). The lid (2) and base (3) are held together with screws (7) and nuts (8). The top down view of the assembled device is shown in FIG. 2. The bottom view of the assembled device is shown in FIG. 3. In FIGS. 1 and 3, the outer threaded apertures (4A and 4B) house the fluidic inlet and outlets, respectively (13).

Figure 4:
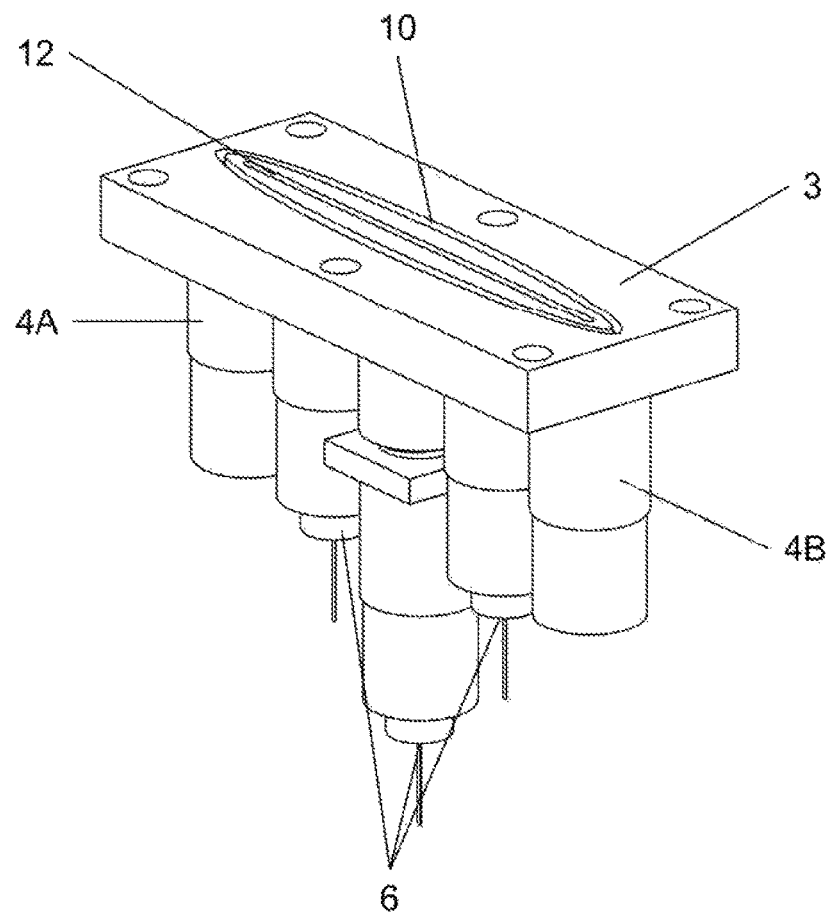
FIG. 4 shows a device according to an embodiment of the present invention without a lid.

FIG. 4 shows an embodiment of the device (1) without the lid (2). This embodiment shows the main microfluidic channel (12), where the liquid flows into the inlet (4A), along the microfluidic channel (12) and out of the outlet (4B) of device (1). In FIG. 4, the microfluidic channel (12) and flow of the fluid goes from the inlet (4A) up to the surface of the base unit and then runs along the top surface. The flow of fluid follows this path, over each electrode (6) and out the exit (4B).

To ensure no liquid leaks from the device (1), between the lid (2) and base unit (3), an O-ring is housed in groove (10) (shown in FIG. 4), this represents a first configuration of the lid. The groove (10) and O-ring surround the path of the microfluidic channel (12) along the surface of the base unit.

In a second lid configuration, a polymer layer may be used instead of an O-ring as a seal. The polymer may be any suitable polymer. Preferably, the polymer is polydimethyl siloxane PDMS (16) and the layer is placed and sandwiched between the device base (3) and the lid (2) and is held in place by the screws (7) and nuts (8).

Figure 5:
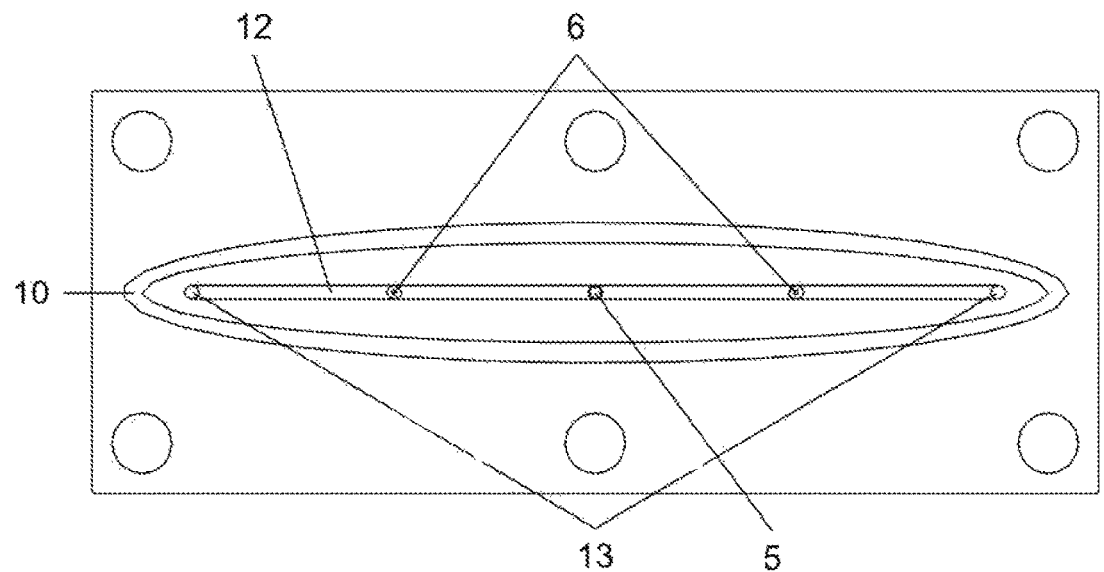
FIG. 5 shows when the lid is removed showing the electrodes, O-ring grove and inlet/outlet.

FIG. 5 is a top down view of the microfluidic channel (12), electrodes (6), O-ring groove (10) and inlet/outlet (13) when the lid (2) is removed.

Figure 7:
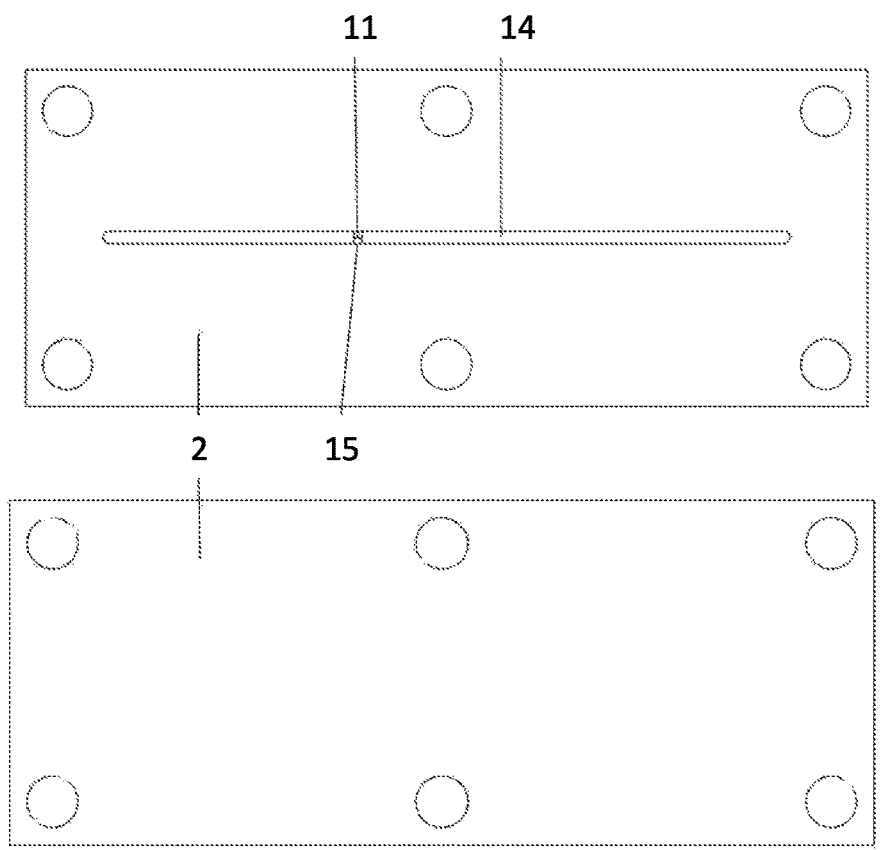
FIG. 7 illustrates a plan view of the lid of an embodiment of the present invention.
Figure 6:
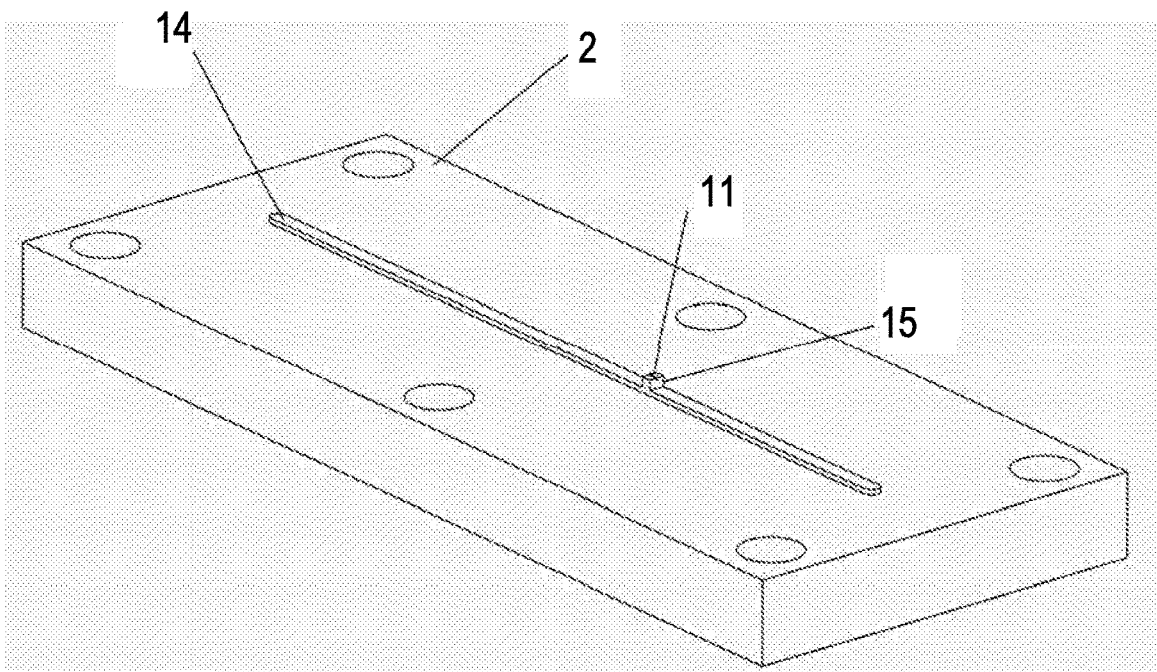
FIG. 6 illustrates a perspective view of the lid of an embodiment of the present invention.

FIG. 6 shows the preferred embodiment of the lid (2) when in its first configuration. It has a protrusion (primary ridge) (14) that runs the entire length of the microfluidic channel. The depth of the primary ridge (14) determines the total volume of liquid that is required to fill the channel (12) when the device (1) is sealed as shown in FIG. 1. FIG. 7 shows the top and the bottom images of the lid (2).

Along the primary ridge is a secondary ridge (15), which may be any length but is preferably the width of the channel (14) and is the height of the channel (14) when the device is sealed. Within the secondary ridge a conduit (11) is present that allows the fluid to flow through the device when the device is sealed with the lid in this configuration.

The dimensions of the first particle sensor (11) determine the sensitivity of the sensor. The channel (12), the sensor (11) and two of the electrodes (6) record data from the first particle sensor. When a particle passes through the electrolyte-filled sensor channel (12), under the application of a potential difference between the two electrodes (6), each particle is recorded as a resistive pulse. The pulse size and shape are dependent upon the channel and pore dimensions, the pulse reveals information on the particle size, shape and flow rate.

The first particle sensor (11) can be used independently and does not require the presence of the second particle sensor (5). All particles in solution flow through the first particle sensor (11).

Figure 8:
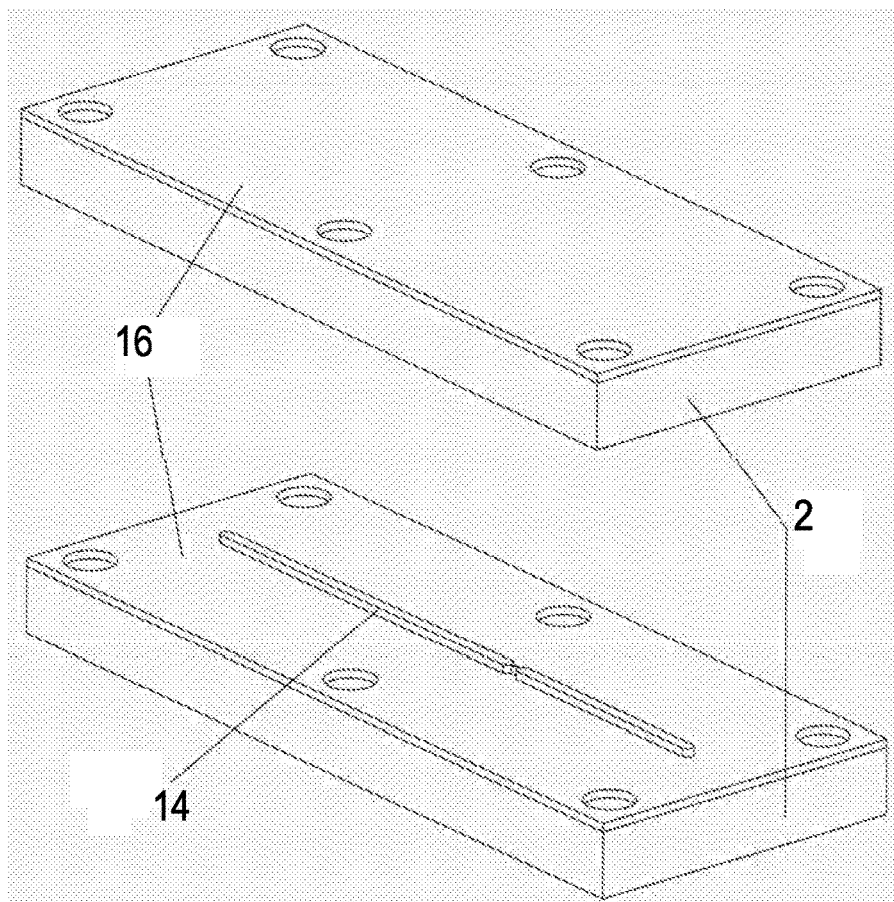
FIG. 8 illustrates a second configuration of a lid on a device according to an embodiment of the present invention.

FIG. 8 shows the preferred embodiment of the lid (2) in its second configuration. A polymer layer, such as a PDMS layer (16) is inserted between the lid (2) and base unit (3). The lid can be flat, or with a primary (14) and secondary (15) ridge as before. The PDMS layer (16) has two functions, firstly it provides a seal resulting in no leakage. Secondly, the volume of the channel and the sensitivity of the first particle sensor (11) can be altered by the PDMS layer (16). Upon the application of a pressure caused by the tightening of the screws and the force exerted by the lid down onto the PDMS, the PDMS polymer can be forced into the microfluidic channel. The volume of liquid in the microfluidic channel (12) is reduced by increasing the pressure (tightening) the screws (7). As the volume of the channel decreases the sensitivity of the first particle sensor (11) increases. The tightening of the screws (7) affects the sensitivity of the first particle sensor (11). Tightening of the screws has no effect on the second particle sensor (5).

The second particle sensor (5) may be in a separate housing which may be connected to the floor of the microfluidic channel (12). The fluid sample flows over the top of the second particle sensor (5) and not through the sensor.

Figure 9:
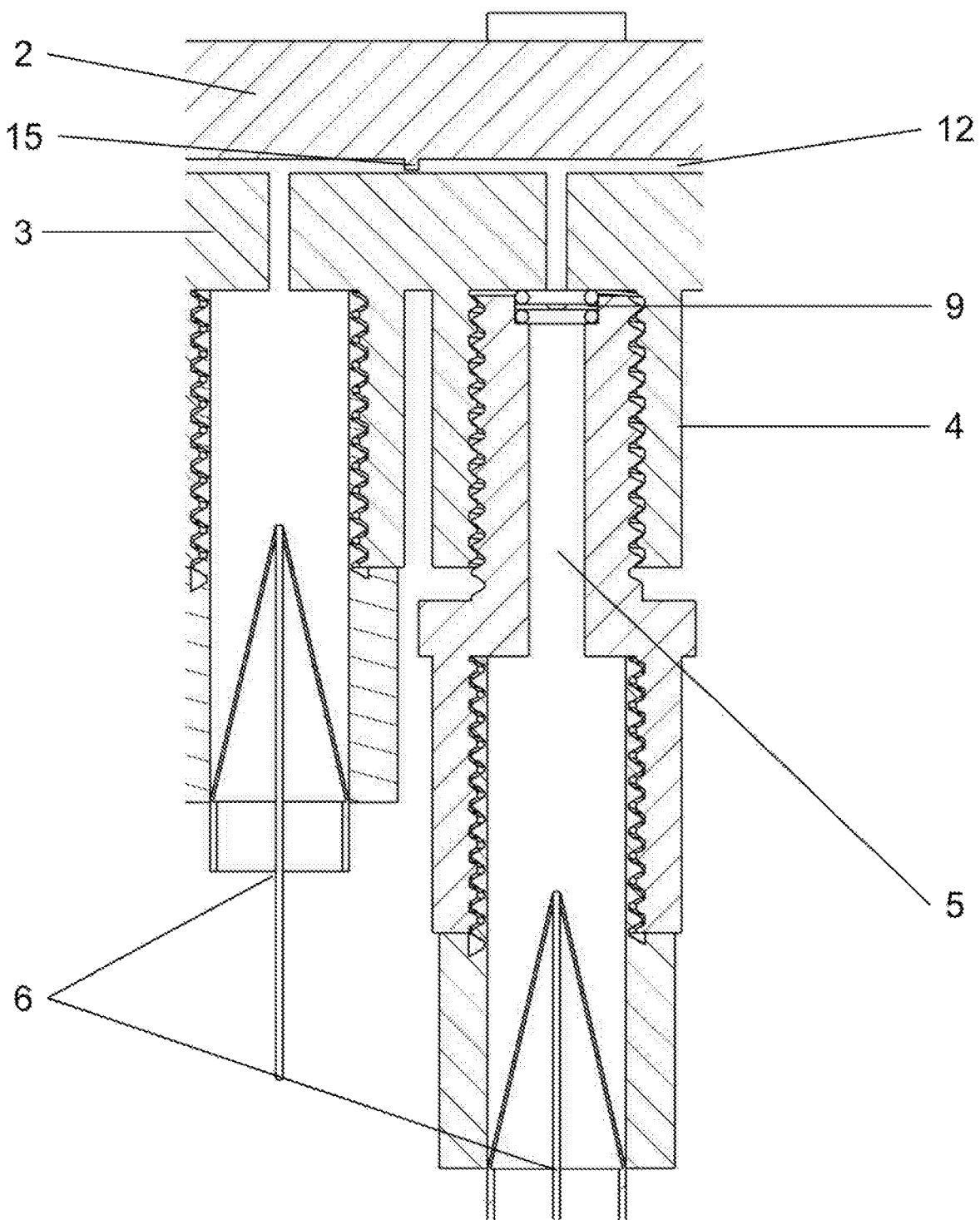
FIG. 9 illustrates a second particle sensor according to an embodiment of the present invention.

FIG. 9 shows the second particle sensor (5) comprising a small hole within a membrane (9). The membrane may be comprised from silicon nitride, polyurethane or a polyester membrane. The membrane may be held in place using a 3D printed screw thread (5), which also contains an electrode in the threaded aperture (4). Between the electrode (6) and the membrane is an electrolyte solution. The flow in the microfluidic channel (12) passes over the top of the sensor (5). An electric field is applied between the two electrodes (6). Charged particles in the microfluidic channel (12) move along the electric field gradient via a process of electrophoresis and convention, while neutral particles move by convention. The particles pass from the microfluidic channel (12) through the membrane (9) housed in the second particle sensor (5). As the particles pass through the hole in the membrane the electrodes (6) record a resistive pulse and characterise the particle shape, size and charge.

The location of the second particle sensor (5) can be anywhere along the microfluidic channel (12) but not under the secondary ridge (15). There can be more than one second particle sensor (5).

Figure 10:
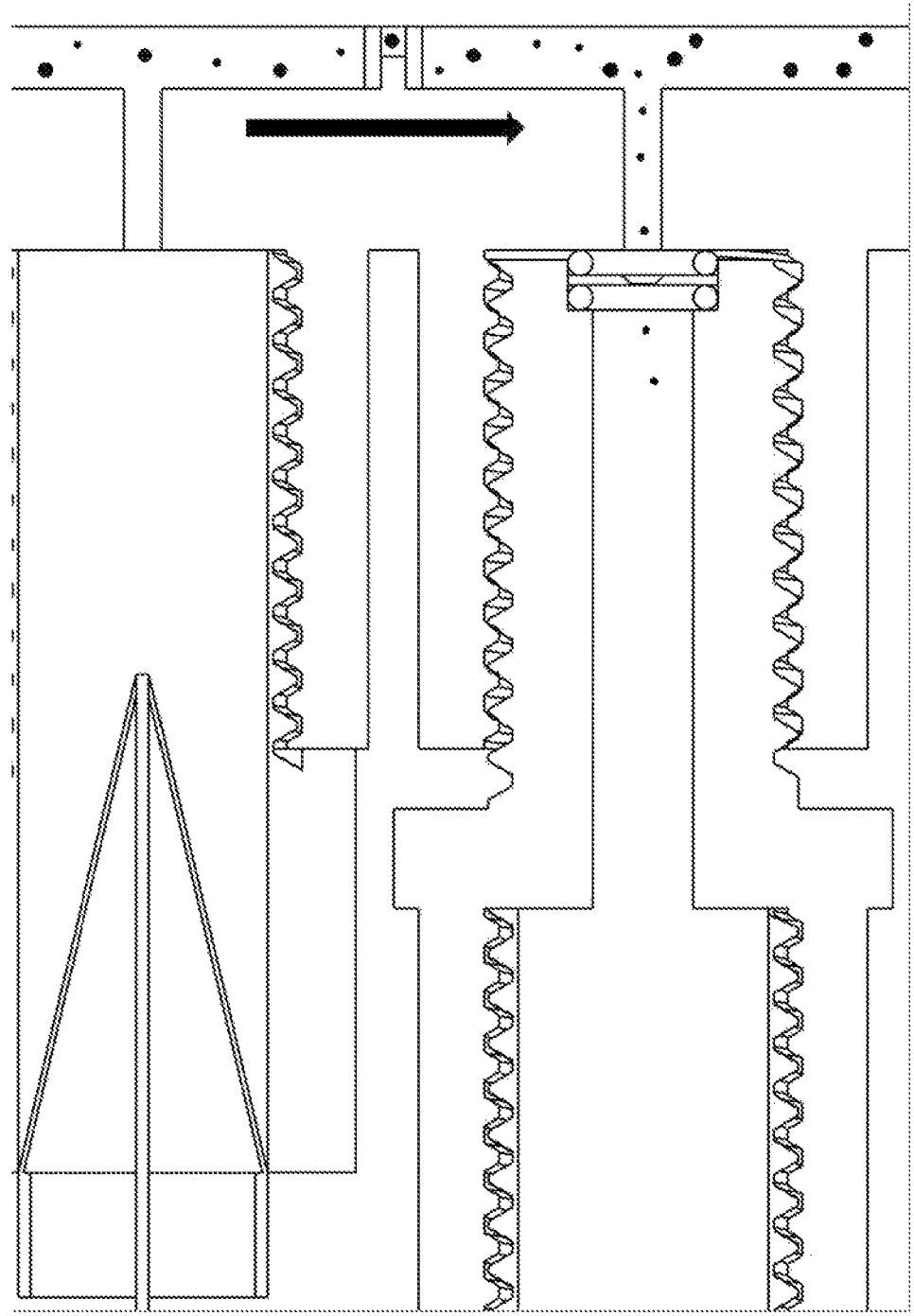
FIG. 10 illustrates the mechanism of interaction between the device and the particles.

The second particle sensor (5) can be used independently and does not require the presence of the first particle sensor (11). The second particle sensor (5) does not require a flowing solution, thus the microfluidic channel (12) can be filled with the sample and the flow can be switched off and the second particle sensor (5) would still characterise particles that can move via electrophoresis through the hole in the membrane (9), in this way the second particle sensor (5) can be used in both flow and when no flow is present. The first particle sensor (11) will only work in the presence of flow. FIG. 10 shows the interaction between the flow of fluid and the one or more sensors.

Figure 11:
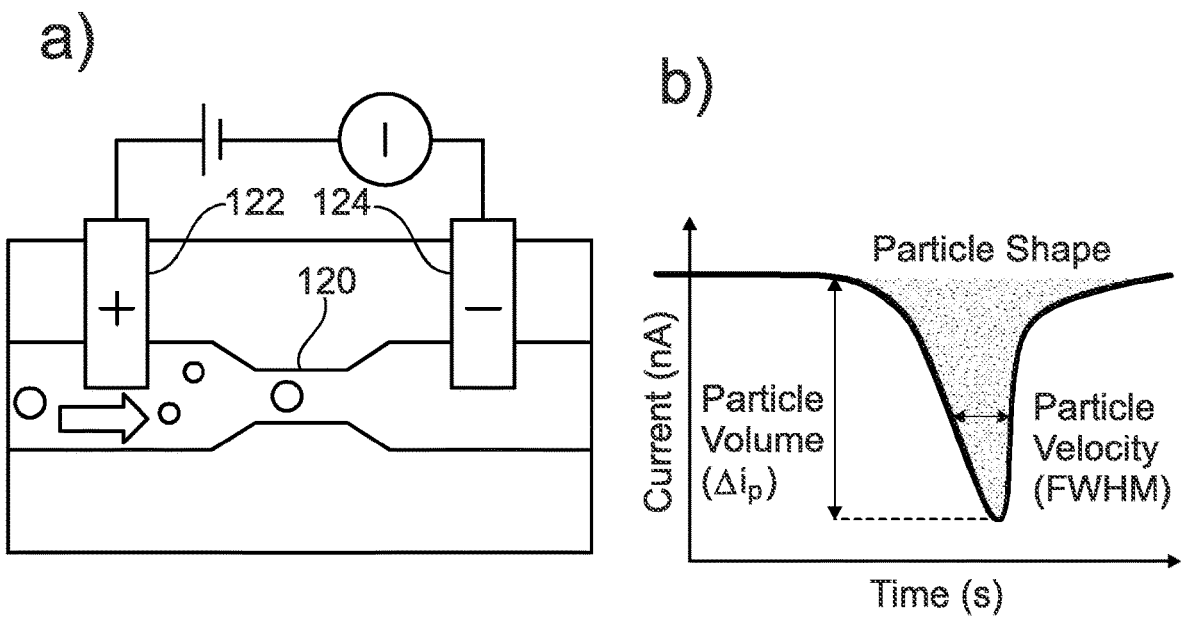
FIG. 11a) illustrates a schematic of a RPS setup in accordance with an embodiment of the invention.
FIG. 11b shows a signal from a translocation event.
Figure 12:
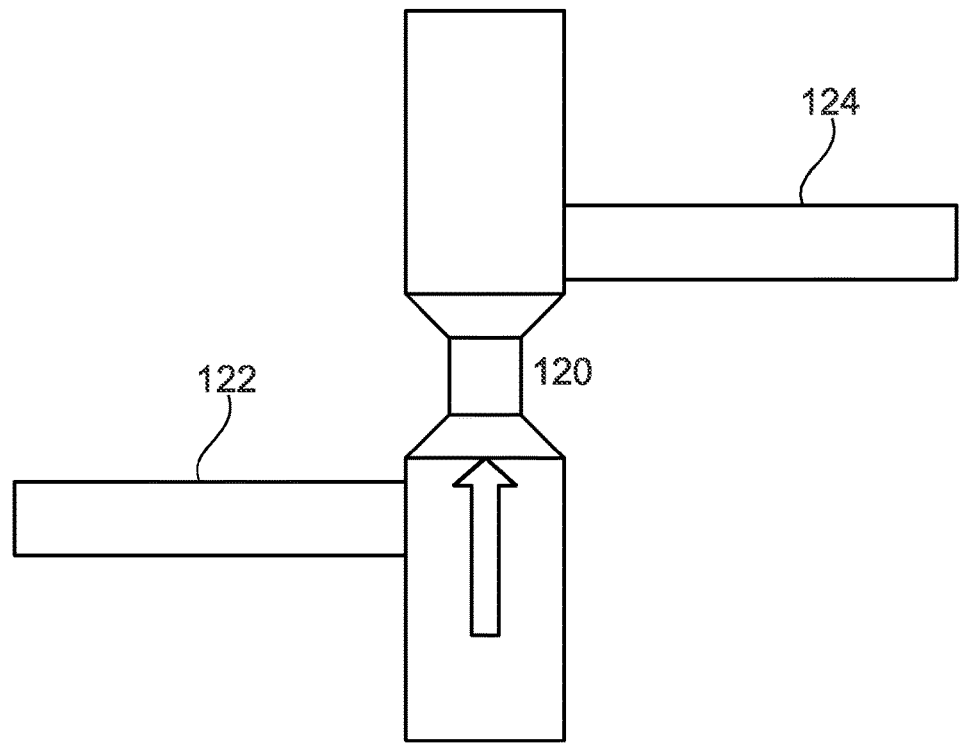
FIG. 12 shows a plan view of an electrode arrangement in an embodiment of a first particle sensor.

With reference to FIG. 11(a) and FIG. 12, fluid travels along a microfluidic channel within a first particle sensor, as depicted by the arrow. The first particle sensor comprises a constriction 120 which provides a detection zone. The constriction 120 is positioned between a first electrode 122 and a second electrode 124, which form an electrode set. Passage of a particle through the detection zone is detected as a current pulse, as shown in FIG. 11(b).

Figure 13:
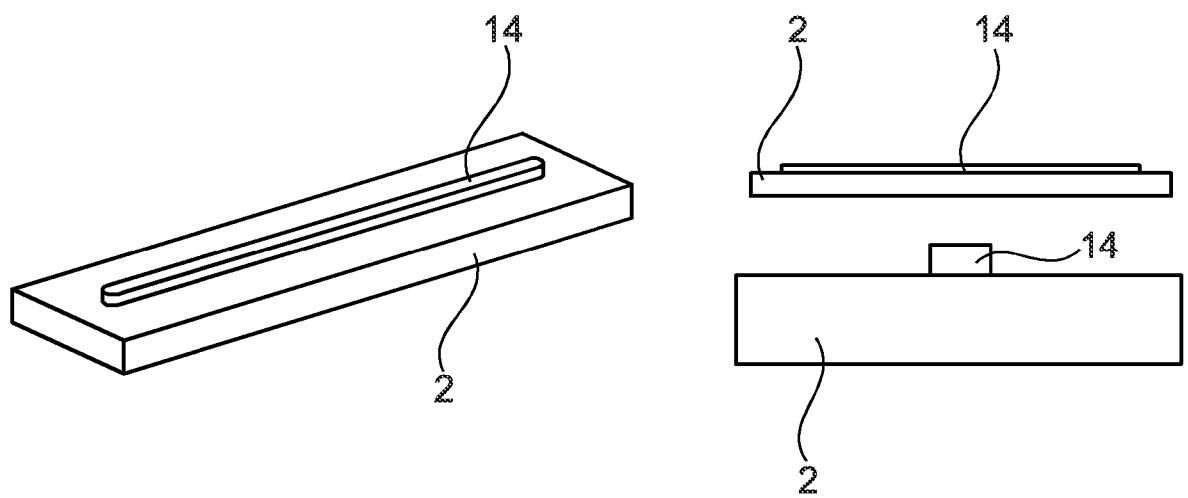
FIG. 13 shows a CAD drawing of a lid according to an embodiment of the present invention with a primary ridge.

FIG. 13 shows an image of an example of a lid (2) according to the present invention comprising a primary ridge (14) of dimensions 1×2 mm (H×W) which stretches the length of the microfluidic channel (12). The microfluidic channel (12) and corresponding lid (2) may of course be fabricated to any suitable dimension. Preferably, the lid (2) provides a seal. When the lid (2) comprises a ridge, this allows the sensitivity of the sensor to be tuned. Furthermore, the ridge may be fabricated such that it allows for interchangeability between different sensors without having to change the core flow component.

Figure 14:
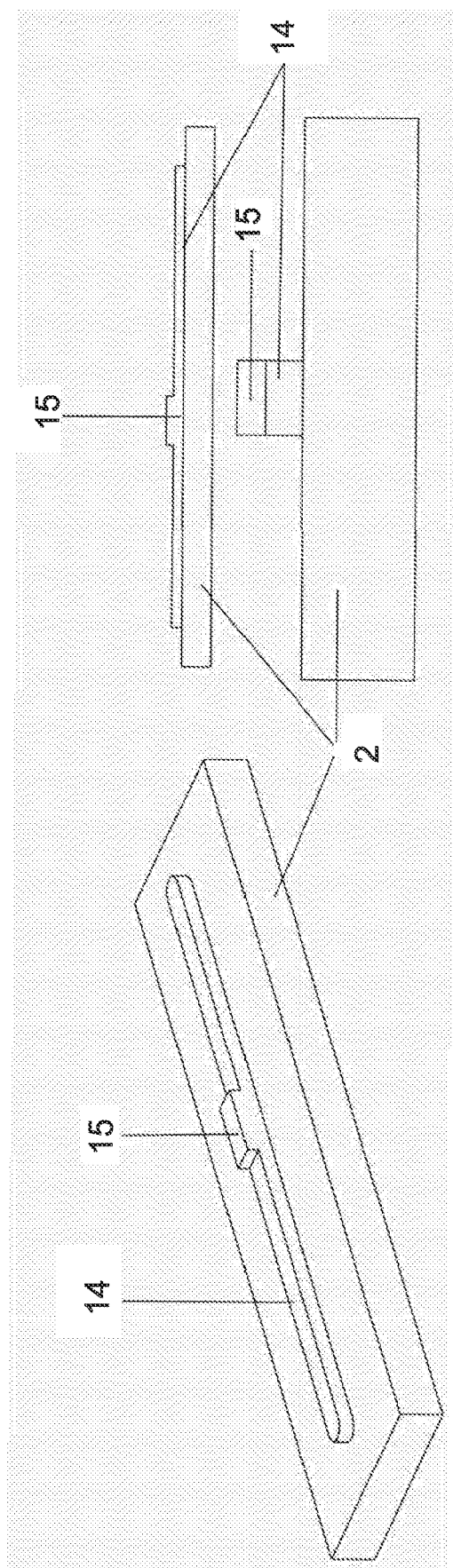
FIG. 14 shows a CAD drawing of a lid according to the present invention with a secondary ridge extending from the primary ridge.
Figure 15:
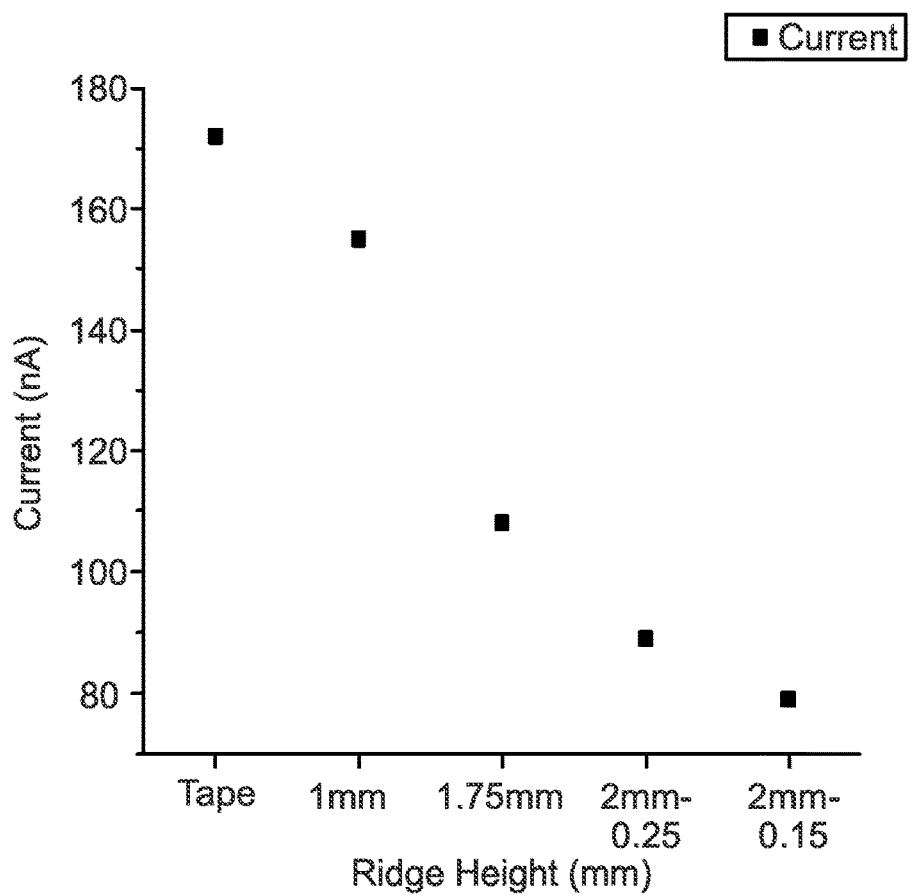
FIG. 15 shows a graph comparing current against ridge height measurements recorded at 1 volt in 0.25 mM KCl buffer.
Figure 16:
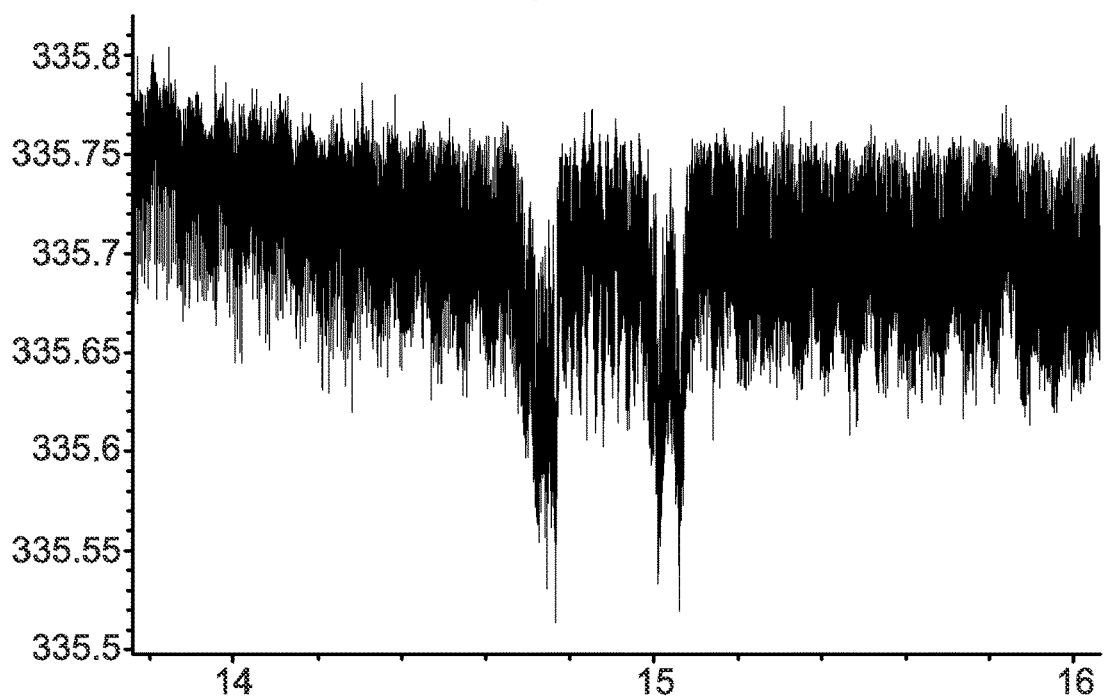
FIG. 16 shows pulses measured from a 80 micron particle in a 150 micron microfluidic channel.

FIG. 14 shows a lid (2) comprising an additional secondary ridge (15), which is an extension of the primary ridge (14). By increasing the size of the ridge, the size of the sensor is reduced which allows smaller particles to be characterised (as demonstrated in FIG. 14). The results in FIG. 15 demonstrate that particles can be detected within a microfluidic channel (shows pulses from an 80 micron particle in a 150 micron channel).

Maintaining sensitivity whilst retaining high count rates is a difficult challenge as the pulse frequency is directly related to the pore size. Thus, to be able to measure smaller particles in solution the channel diameter may be decreased.

The second particle sensor (5) may be a second nanopore fabricated from ion drilled silicon nitride membranes (9). The second particle sensor (5) may be positioned parallel to the flow and after the first particle sensor. In an example of the device (FIG. 1), the fluid flows through the first particle sensor (11), and over the second particle sensor (5). This stops the larger particles measured in the first particle sensor (11) blocking the second particle sensor (5). As the second particle sensor (5) lies parallel to the fluid, the RPS can be made to characterise particles of any size, without the worry of blockages. The second particle sensor (5) (and any number of further sensors) can be screwed in, changed and chosen for the sample/application of the user.

Figure 17:
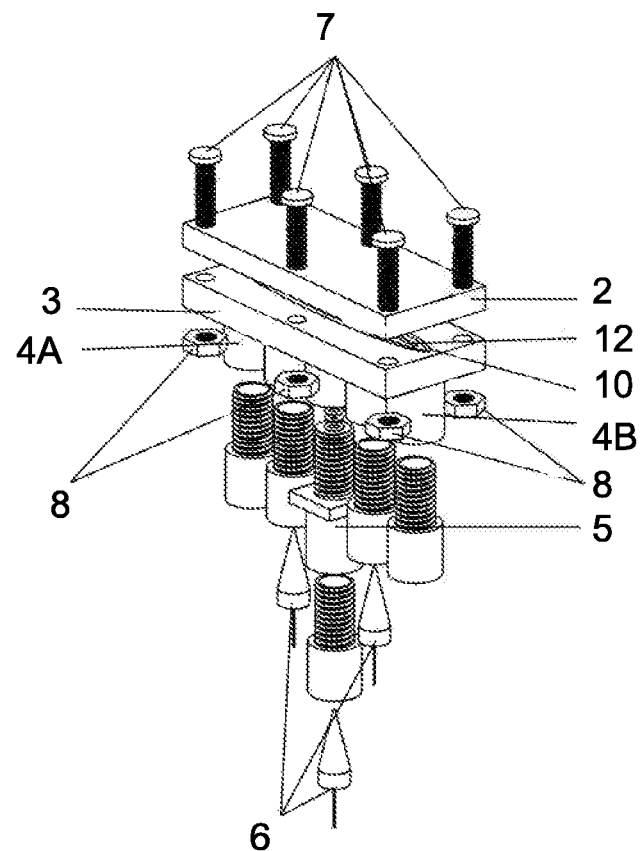
FIG. 17 shows an exploded-view of a device according to an embodiment of the present invention.

To add extra sensors, additional 3D printed screw threads can be added along the base (as illustrated in FIG. 17). The device may also comprise additional solid state nanopore holder which houses a smaller pore (9), thus expanding the analysis range of the device (1).

The second particle sensor (5) also may hold a lower fluid cell and working electrode (6). The holder may be mounted using a screw thread located on the bottom of the flow device, and a set of O-rings may be used to provide a seal. A CAD image of the holder is illustrated in FIG. 17.

In order to be able to characterise various sizes of particles simultaneously, the second particle sensor (5) would allow the detection and characterisation of particles down to 1 nm or be adapted to sequence DNA.

Figure 18:
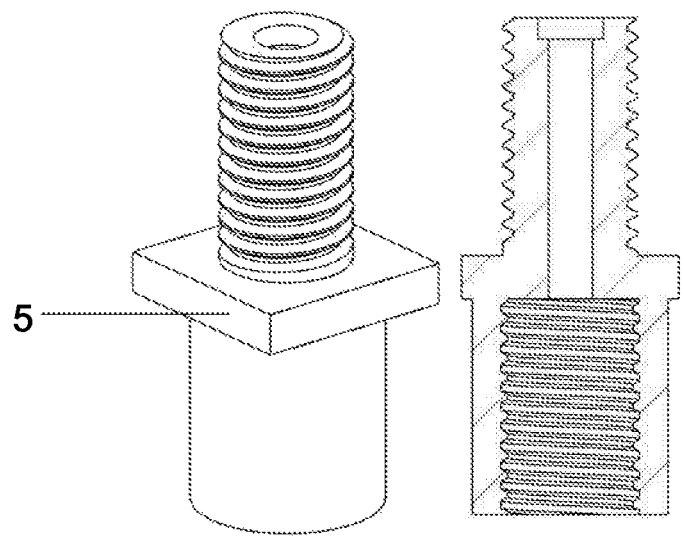
FIG. 18 shows a CAD drawing of a solid state nanopore holder.

To aid the device (1) when it is used in a manufacturing process that produces high concentrations of particles within high flow rate reactors, two identical devices (such as two identical devices shown in FIG. 1, or in FIG. 18) may be used simultaneously. The main flow/sample is diverted such that the volume and flow rate through the second device differs from the first device. This allows each device to characterise different properties/particles in the same sample.

Figure 19:
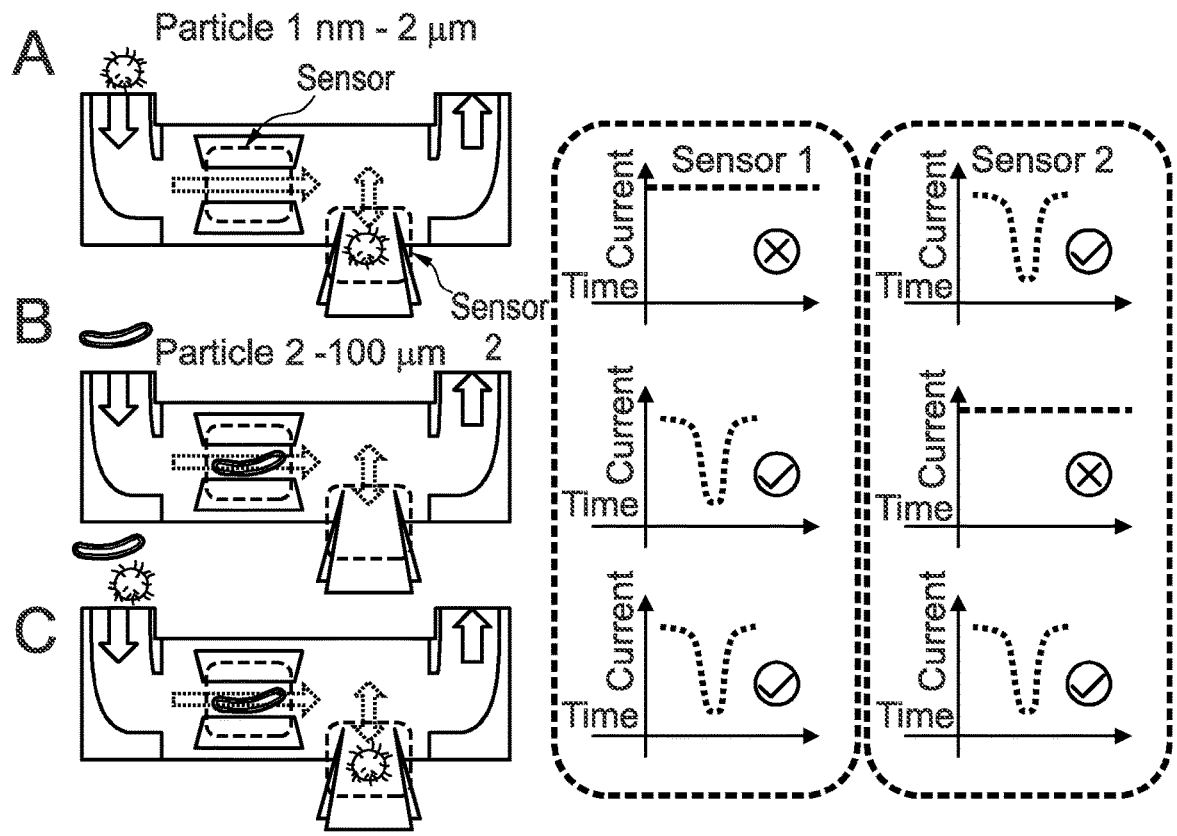
FIG. 19 shows schematically the operation of a device comprising first and second particle sensors, and corresponding pulses.

FIG. 19 shows schematically the operation of the device. In FIG. 19A, a small particle having dimensions of from 1 nm to 2 µm enters the microfluidic channel. The small particle is not detected by the first particle sensor, which is configured for the detection of larger particles. The small particle flows through the nanopore of the second particle sensor, which results in a signal. In FIG. 19B, a large particle having dimensions of from 2 to 100 µm enters the microfluidic channel. The large particle is detected by the first particle sensor, resulting in a signal. In FIG. 19C, a fluid comprising both large and small particles flows into the microfluidic channel. The large particle is detected by the first particle sensor, while the small particle is detected by the second particle sensor.

Figure 20A:
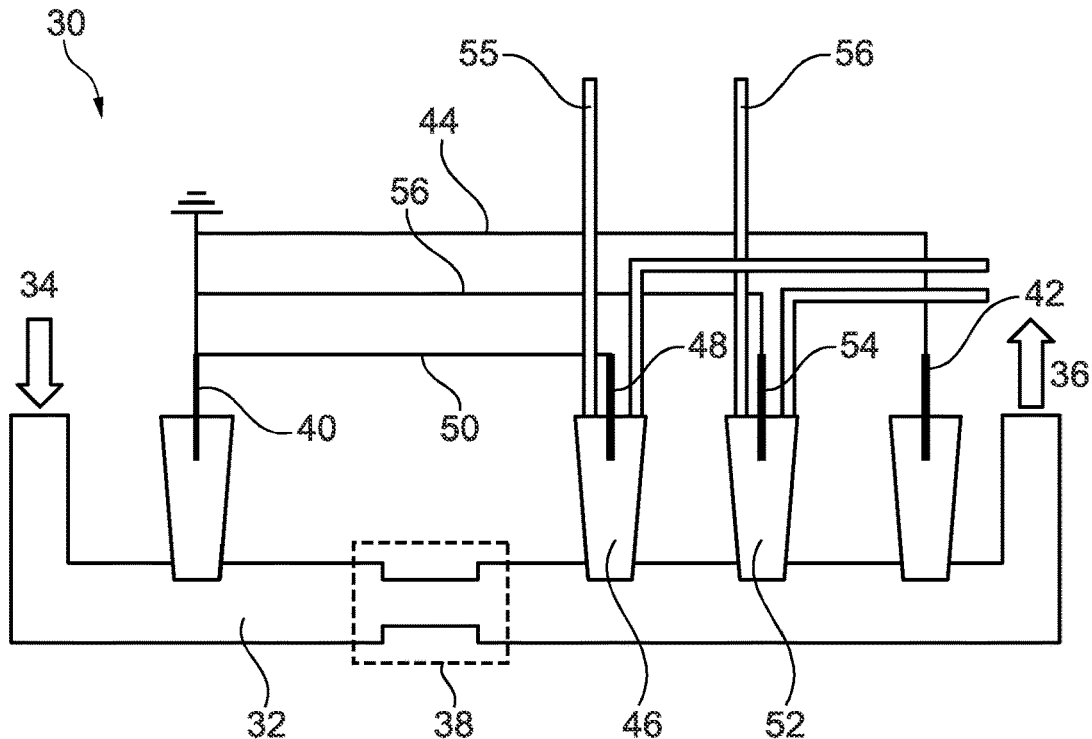
FIG. 20a is a diagram of a device comprising multiple second particle sensors.

FIG. 20a shows a device 30 comprising a first particle sensor (sensor 1) and a plurality of second particle sensors (sensor 2, . . . sensor n). The plurality of second particle sensors may be referred to as third, fourth, fifth etc particle sensors. The first particle sensor comprises a microfluidic channel 32, having an inlet 34, an outlet 36, and a constriction therein which provides a detection zone 38. The device 30 further comprises a first ground electrode 40 and a second working electrode 42, which together form a first electrode set 44 of the first particle sensor.

The device 30 further comprises a second particle sensor 46. The second particle sensor 46 comprises a second electrode set having a ground electrode and a working electrode. In some embodiments, the ground electrode of the second electrode set 47 may be shared with the first working electrode set. That is, the plurality of particle sensors may comprise n+1 electrodes where n is the number of particle sensors and a shared ground electrode is used. In other embodiments, at least some of the particle sensors may comprise a working set of electrodes comprising both a ground and a working electrode. In the illustrated embodiment, the second particle sensor 46 comprises a working electrode 48, which forms a second electrode set 50 with the first ground electrode 40. A further second particle sensor 52 is provided, which comprises a working electrode 54 that forms a third electrode set 56 with the first ground electrode 40. Each of the second particle sensors 46, 52 is provided with a flow regulator 55, 56.

An electrical signal output by each working electrode set may be referred to as a channel providing a channel of pulse data associated with the respective particle sensor. The pulse data is indicative of current flow between the electrodes of the electrode set. The current flow is caused by a particle passing through the respective particle sensor. Thus each pulse of current flow is indicative of a particle passing through the particle sensor. Since each sensor is independent, pulse data of the plurality of channels may be output from the sensor at least partly simultaneously. That is, pulses indicative of current flow may be simultaneous, at least partly, amongst the plurality of channels. Therefore apparatus used with particle sensors according to embodiments of the invention may store pulse data for subsequent analysis, or may comprise a plurality of means to receive and analyse pulse data simultaneously.

Figure 20B:
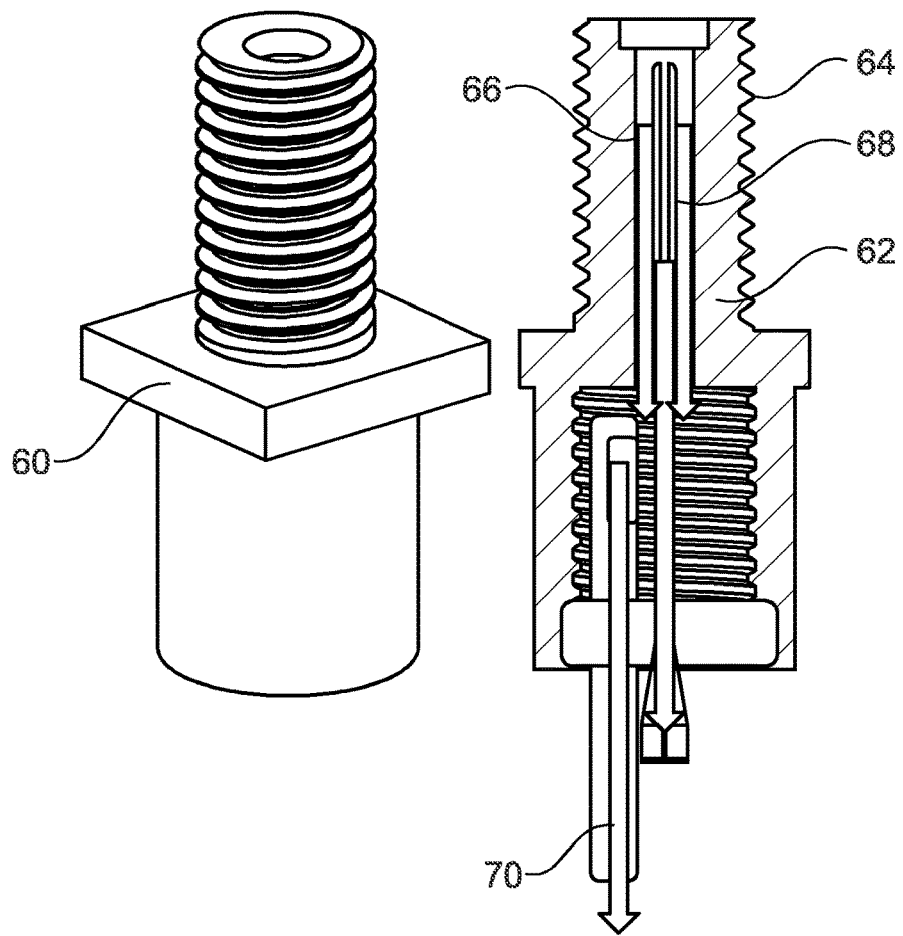
FIG. 20b is a diagram of an embodiment of a second particle sensor comprising a holder.

FIG. 20b shows a second particle sensor (60) according to further embodiment of the invention. The second particle sensor (60) comprises a body (62) having an outer screw thread (64), for connecting the second particle sensor (60) to the base of the device. The body has an interior channel (66) in which is located a nanopipette (68). When the second particle sensor (60) is connected to the base of the device, the interior channel (66) is joined to the main microfluidic channel of the first particle sensor, thereby forming a flow path therebetween. Also housed with the body (62), and in fluid communication with the interior channel (66), is a tube (70). A portion of the tube (70) extends out of the body (62). The tube (70) may function as the main fluid outlet of the device.

For example, in some embodiments the flow rate through the main fluid outlet of the microfluidic channel, and optionally each tube present in the series of second particle sensors, may be independently controlled, or stopped. Thus it is possible to configure the system so as to allow all the sample to flow out of a single outlet, such as tube (70).

Figure 20C:
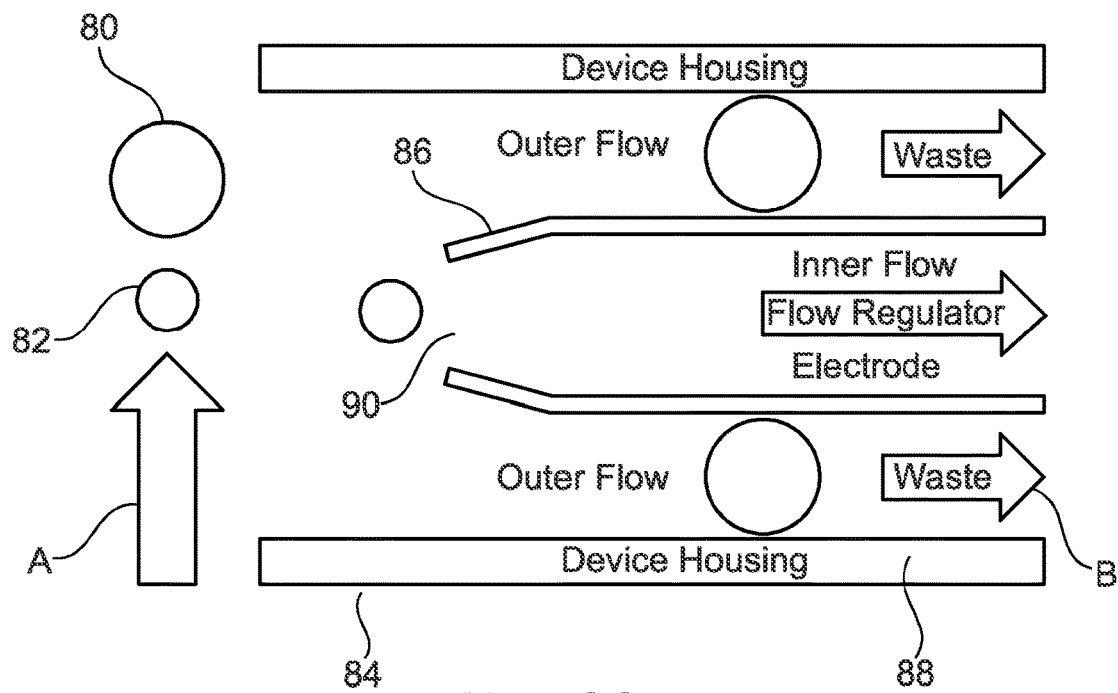
FIG. 20c is a schematic showing a fluid flow in relation to a second particle sensor.

FIG. 20c shows the passage of fluid through the device. A fluid sample comprising large (80) and small (82) particles travels through the microfluidic channel of the first particle sensor, depicted by arrow A. Some of the fluid enters a second particle sensor (84). The second particle sensor (84) comprises a nanopipette (86) within a housing (88). The nanopipette (86) has a pore (90) which is sized such that only the small particles (82) are able to pass through the pore (90) and be detected. The large particles (80) travel around the nanopipette in an outer flow stream depicted by arrows B, and exit the device as waste.

Larger particles are prohibited from entering the nanopore (90) of the second particle sensor, such that the flow rate of fluid through the nanopipette (86) ("inner flow") is lower than the flow rate past the nanopipette ("outer flow"). As such, the nanopore (90) of the second particle sensor is constantly being washed by a flow of liquid which pushes larger particles away from the nanopore, thereby preventing blockage of the nanopore. The flow rate of liquid through the nanopipette can also aid the sensitivity. If the flow rate through the nanopipette (86) is increased, more particles may be detected. Equally, if the flow rate through the nanopipette (86) is stopped, the second particle sensor remains inactive until the flow is switched back on.

FIGS. 20d-g show how fluid flow through the second particle sensor can be regulated. In FIG. 20d, fluid from the main microfluidic channel is allowed to flow into the second sensor and through the nanopipette with a flow rate depicted by arrow F1. Fluid which does not pass through the nanopore flows around the nanopipette, depicted by arrows W1.

FIG. 20e shows how the flow rate through the nanopipette can be increased using a flow regulator (not shown), depicted by arrow F2. In this case, the fluid flow which travels around the nanopipette, rather than through it, is decreased, as depicted by arrows W2.

In FIG. 20f, the fluid flow through within the nanopipette is reversed (arrow F3), thereby stopping translocation of particles through the nanopore. In FIG. 20g, all flow through the second particle sensor is stopped, such that no fluid travels through or around the nanopipette.

Figure 21:
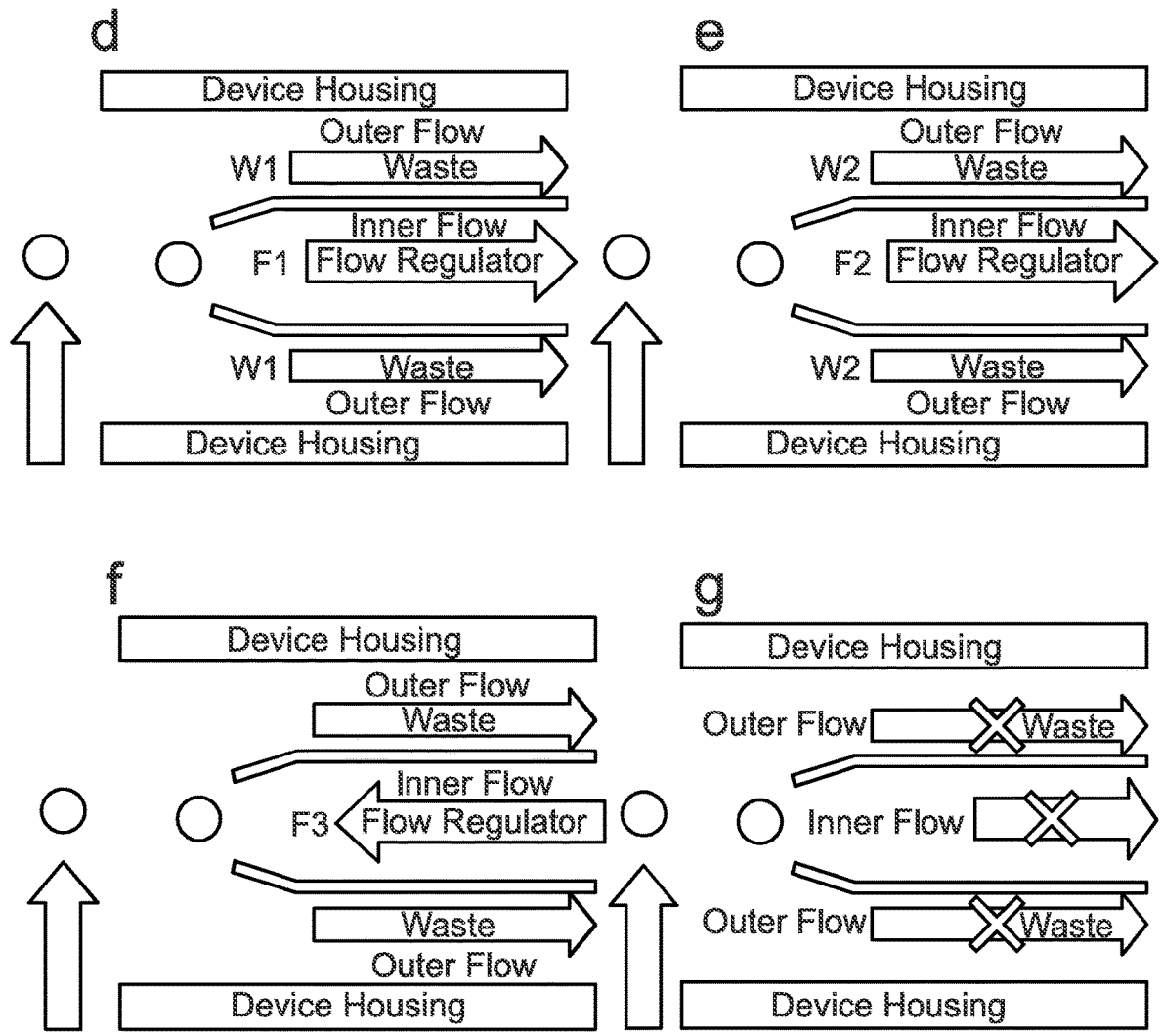
FIG. 21 shows a workflow depicting a use of the device.
Figure 21:
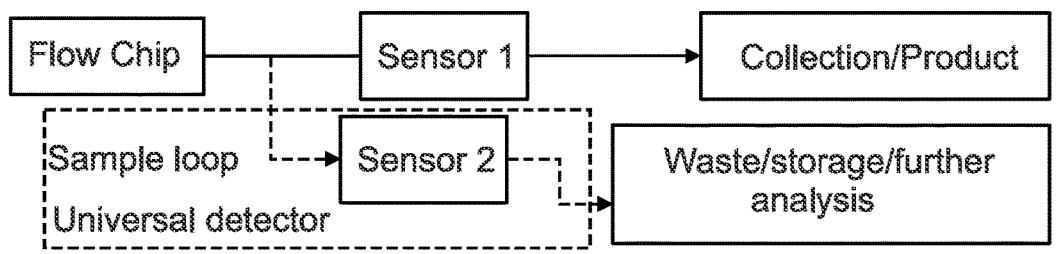

The workflow is shown schematically in FIG. 21. The device (1) can also be used in the absence of flow, for example, where a user wants to inject a sample/material into the sensor for analysis, e.g. blood, milk or nanomaterials/nanomedicines. The measurement can be used to characterise the physical properties of the materials, or where the properties of the materials are related to the sample matrix and the physical properties of the particles acts as a diagnostic/analytical signal.

The analysis package described below may be implemented as a computer program configured to, when run on a processor, perform one or more of the steps noted above.

Generally, such a computer program may be configured to, when executed by a computer processor, perform at least: receiving, as input, data representing a resistive pulse corresponding to a particle, the resistive pulse obtained by a particle sensor as described herein; comparing the received data to prestored characterising shape and size data representing particles of known shape and size; determining, based on the comparison, one or more of the shape and size of the at least one particle; and outputting the determined one or more of the shape and size of the particle. It will be appreciated that examples of computer programs disclosed herein may be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of non-transitory machine-readable storage that are suitable for storing a program or programs that, when executed, implement embodiments of the present disclosure. Accordingly, examples disclosed herein may provide a program comprising code for implementing any method as disclosed herein and a machine readable storage medium storing such a program. Still further, examples disclosed herein may be conveyed electronically via any medium such as a communication signal carried over a wired or wireless connection and examples suitably encompass the same.

In a further aspect of the invention, there is provided a computer implemented method, comprising:
receiving, as input, pulse data representing a current pulse corresponding to a particle;
comparing the received pulse data to prestored characterising shape data representing particles of known shape;
determining, based on the comparison, a shape of the at least one particle; and
outputting an indication of the determined shape of the particle.

In some embodiments, the current pulse may be obtained from a particle sensor as defined herein, or a device as defined herein. However, in other embodiments, the pulse data may be obtained from other types of Resistive Pulse Sensor (RPS).

In some embodiments the prestored characterising shape data comprises one or more spline coefficients representing the particles of known shape.

In some embodiments the one or more spline coefficients are one or more spline coefficients for b-splines representing the particles of known shape.

In some embodiments the one or more spline coefficients are a predetermined set of spline coefficients representing the particles of known shape.

The prestored characterising shape data may be for a normalised particle size, wherein the computer program is configured to normalise the received data.

In some embodiments the prestored characterising shape data comprises an indication of a width of the resistive pulse.

In some embodiments the prestored characterising shape data comprises an indication of a maximal depth of the resistive pulse.

The data representing the resistive pulse corresponding to the particle may comprise data corresponding to the particle traversing the sensor. In some embodiments, the data representing the resistive pulse corresponding to the particle comprises data corresponding to the particle traversing the nanopore.

In a further aspect, there is provided a computer implemented method, comprising:
receiving, as input, pulse data representing a current pulse corresponding to a particle of known shape;
determining a model in dependence on the received data indicative of the particle of known shape.

In some embodiments, the current pulse may be obtained from a particle sensor as defined herein, or a device as defined herein. However, in other embodiments, the pulse data may be obtained from other types of Resistive Pulse Sensor (RPS).

In a further aspect, the invention provides a computer-implemented method of characterising a nanoparticle, comprising:

receiving pulse data indicative of ionic current flow between first and second electrodes associated with a microfluidic channel whilst the nanoparticle passes though the microfluidic channel; and classifying the pulse data as corresponding to one of a plurality of predetermined types of nanoparticle using a pulse-shape model.

Figure 34:
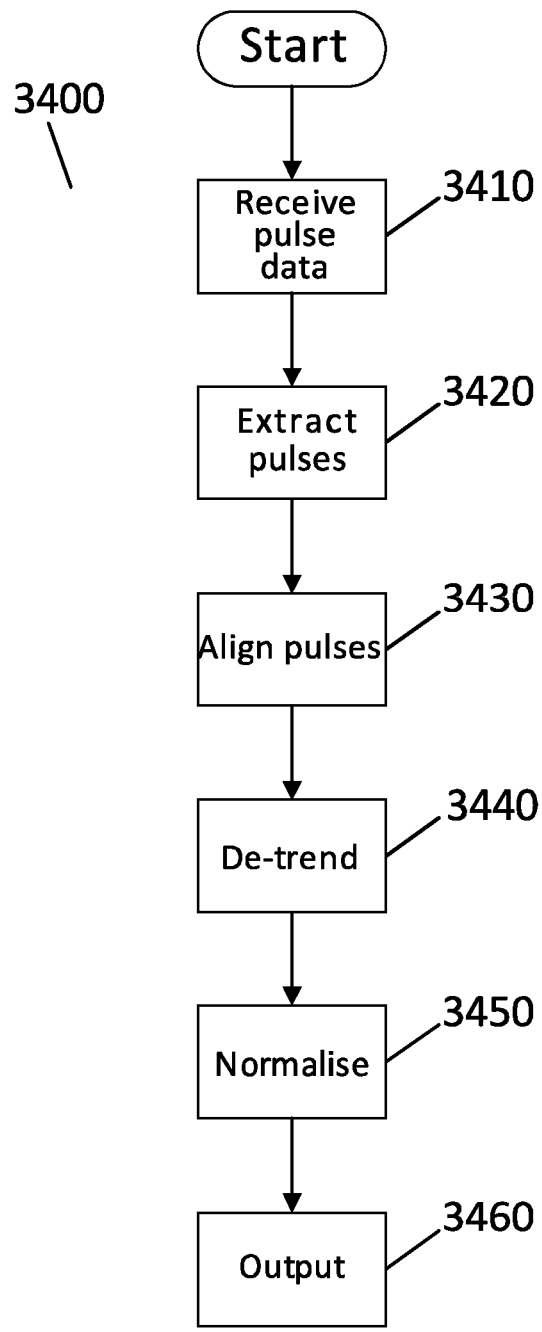
FIG. 34 illustrates a method according to an embodiment of the invention.

FIG. 34 illustrates a method 3400 according to an embodiment of the invention. The method 3400 is a method of processing pulse data according to an embodiment of the invention. The pulse data may be received from a particle sensor according to an embodiment of the invention. The method 3400 may be used to pre-process pulse data. The pre-processed pulse data may be used with methods according to other embodiments of the invention, such as described below with reference to FIG. 35.

In block 3410 pulse data is received from a particle sensor, such as that described with reference to at least FIG. 20a. The pulse data may be received from each of one or more particle sensors, such as first and second particle sensors of the particle sensor. In some embodiments, the pulse data is received in a plurality of channels from the particle sensor. The pulse data may be stored in a memory of an apparatus, such as a computer, receiving the pulse data. The pulse data may be in the form of raw signal pulse data as shown in the upper portion of FIG. 24. The pulse data may be in the form of a series of data samples at respective points in time.

In block 3420 pulses are extracted from the pulse data. In block 24 one or more individual pulses are extracted from the raw pulse data. Each pulse may be identified in dependence on a significant deviation from a baseline of the raw pulse data. Each pulse may comprise a predetermined number of data points or data samples.

Figure 24:
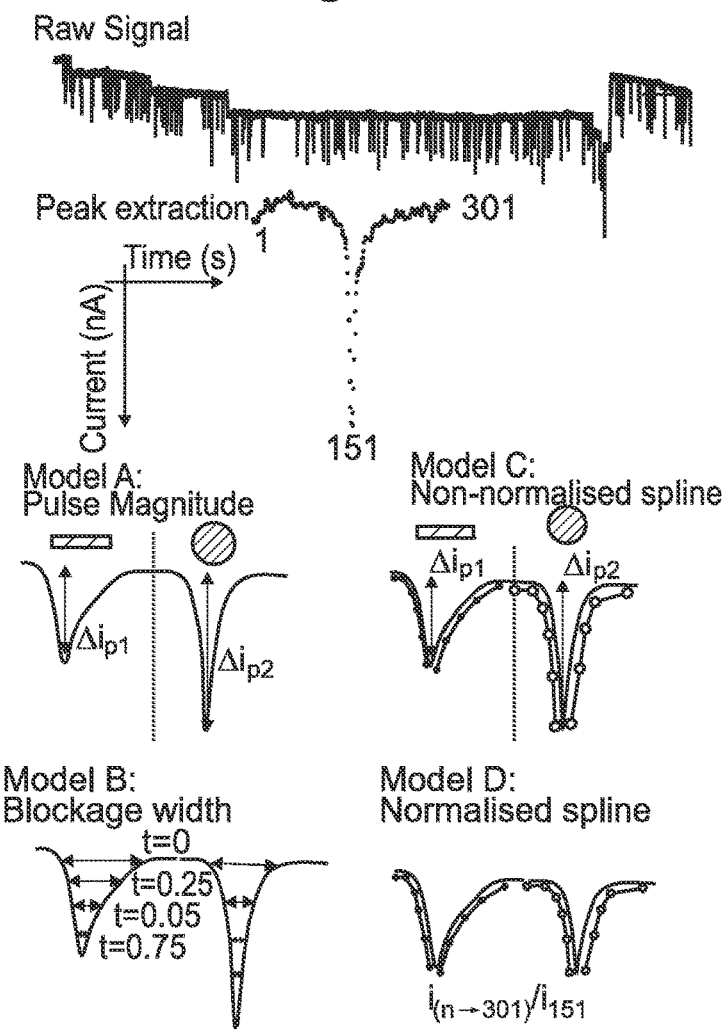
FIG. 24 shows recorded pulse data. Each pulse containing 301 data points is isolated. The analysis of the pulse was done by one of five models. A) Pulse magnitude, B) Blockade width, at fractions 0.75, 0.5, 0.25 of the pulse heights. C) Non-normalised spline fitting and D-E) Spline fitting on normalised pulse magnitudes.

In block 3430 each pulse is aligned to comprise the predetermined number of data samples. That is, the predetermined number of data samples of the pulse is aligned to capture a predetermined number of data samples. In one embodiment, each pulse comprises 301 data samples, although it will be appreciated that other numbers of data samples may be used. In particular, an uneven number of data samples may be used, such that a number of data samples either side of a middle data sample may be the same i.e. data sample 151 may be selected as a middle data sample and the pulse comprises 150 data samples at either side. The number of data samples is shown in FIG. 24.

In block 340 the pulse data is de-trended. By de-trending it is meant that any trend, such as an increasing or decreasing magnitude of the raw pulse data is removed from the sampled pulse data of each pulse.

In some embodiments, the method 3400 comprises normalising a magnitude of each pulse. By normalising the magnitude it is meant that each pulse is determined to have a predetermined magnitude, such as a normalised magnitude or depth of 1. In this way, a size of each pulse is removed from the pulse data. The normalized pulse data allows a separation of shape information of the pulse from size information. By using normalized pulse data, each pulse and corresponding particle may be classified according to its shape, as will be explained.

In block 3460 the pulse data is output. The pulse data may be output by being stored in a data storage medium, such as a memory of an apparatus performing the method 3400.

Figure 35:
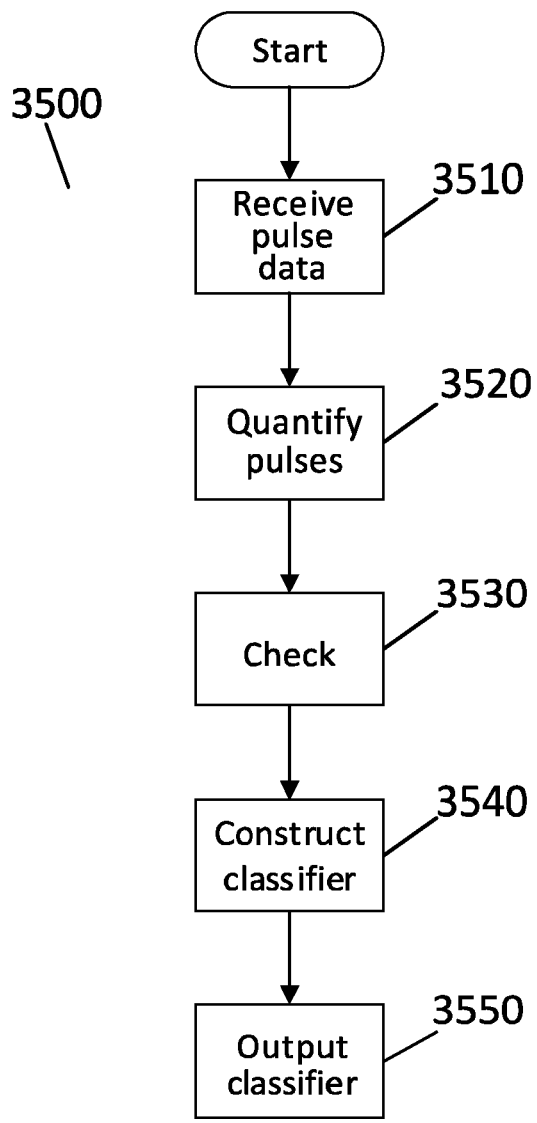
FIG. 35 illustrates a method according to an embodiment of the invention.

Embodiments of the present invention comprise a method of creating a classifier for classifying particles. The pulse data may be received from a particle sensor according to an embodiment of the invention. However the method may be used with pulse data obtained from other sensors. An embodiment of the method 3500 is illustrated in FIG. 35.

The method comprises a block 3510 of receiving pulse data. The pulse data may be received from a method such as illustrated in FIG. 34 in the form of pre-processed pulse data. The pulse data may be received from a memory such as of a computer system implementing the method.

In block 3520, the pulse data is quantified. By quantified it is meant that one or more quantities or measures of each pulse are determined. The pulse data may be quantified by determining one or more statistics of each pulse. As shown in FIG. 24, the quantities or statistics may comprise one or more of: an indication of a pulse magnitude $A_i$ for each pulse $p_1, p_2 \ldots p_n$; an indication of a width of each pulse and one or more measures of a shape of each pulse.

The indication of a width of each pulse, or blockade width, may be determined one or more fractions of each pulse height, such as 0.75, 0.5, 0.25 of the pulse height, as illustrated in FIG. 24. The one or more measures of a shape of each pulse may comprise fitting splines to the pulse data. In some embodiments, the pulse data is normalised before fitting the splines. The splines may be quadratic splines. In some embodiments the splines are quadratic splines with 25 fixed knots and three fixed points (24 coefficients). The spline coefficients provide a mathematical description of the shape of the denoised pulse. Where the splines are fitted to normalise pulse data, the splines are indicative of only the shape of each pulse.

In some embodiments, the method 3500 comprises a block 3530 of checking consistency of the data. In order to verify correct operation, pulse data is acquired for predetermined particles of known size, shape and composition. In block 3530 the statistics for the pulses corresponding to the predetermined particles is checked against expected values. If the statistics are outside of one or more thresholds for the predetermined particles the method 3500 may stop. Otherwise the method processes to block 3540.

In block 3540 a classifier is constructed for distinguishing between particles having different characteristics. For example, the classifier may be constructed to distinguish between particles of different shape, such as spheres and rods, although other classes of particle shape may be envisaged. In other examples, a classifier may be constructed to distinguish between particles of different size and/or material. To construct the classifier, pulse data is obtained for pulses corresponding to sets of particles corresponding to those which it is desired to distinguish as calibration pulse data. For example a first set of pulse data may be obtained for spherical particles and a second set of pulse data may be obtained for rod-shaped particles. Given the sets of pulse data, a predictive classification model is constructed using a regression method. The regression method may be a penalised regression method. In one embodiment, the model uses a maximal depth of the pulse, in another embodiment, the model uses the pulse width, in another embodiment the method uses spline coefficients for the pulse data, which may also comprise the maximal depth of the pulse, in another embodiment the model uses spline coefficients for the normalised pulse data, where the spline coefficients may spline coefficients for b-splines and, in another embodiment the model uses fixed set of spline coefficients from the normalised pulse data. The fixed set of coefficients may be coefficients 9, 10, 16, 17, 18 and 19 which have been found to be particularly effective, although it will be realised that other coefficients may be used. In this way, the classifier is constructed to be able to distinguish between particles of different class, such as different shapes of particle based on their pulse data output from a particle sensor, which may be according to an embodiment of the invention.

In block 3550 the constructed classifier is output, such as by being stored in a memory of a computer system performing the method 3500. The classifier is stored for later use to classify particles according to their corresponding pulse data.

Figure 36:
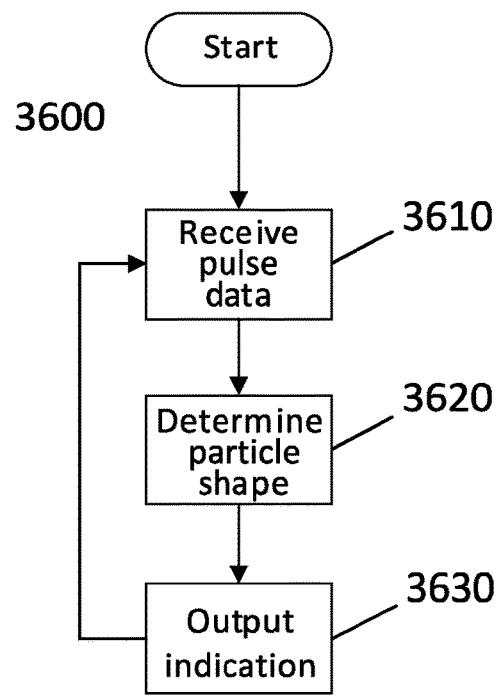
FIG. 36 illustrates a method of using a classifier according to an embodiment of the invention.

FIG. 36 illustrates a method of using a classifier according to an embodiment of the invention. The classifier may be that produced by the method 3500 of FIG. 35. The method 3600 is a method of characterising a particle in dependence on received pulse data. The method 3600 may be performed by an apparatus such as that described below with reference to FIG. 37.

The method 3600 comprises a block 3610 of receiving pulse shape data from a particle sensor. The particle sensor may be a particle sensor according to an embodiment of the invention as described above. The pulse shape data may be conveyed as an electrical signal received at an interface of an apparatus performing the method 3600. The pulse shape data may be received in one of a plurality of data channels as described above with reference to FIG. 20a. The pulse shape data may comprise a plurality of data points at respective points in time indicative of current flow between electrodes of an electrode set, such as 301 data points as described above.

The method 3620 comprises a block 3620 of determining the particle shape. Block 3620 may comprise classifying the received pulse data 3625 as corresponding to one of a plurality of predetermined types of nanoparticle using a pulse-shape classifier as provided by the method 3500, which is stored in a memory of the apparatus. In some embodiments, block 3620 comprises comparing the received pulse data 3625 to prestored characterising shape data representing particles of known shape. Furthermore, in some embodiments, block 3620 comprises determining, based on the comparison, a shape of the at least one particle corresponding to the received pulse shape data. The classifier may output an indication of the pulse data corresponding to one of a predetermined number of classes of particle, such as particles having predetermined shape or predetermined shape and/or size.

In block 3630 an indication of the determine particle shape is output. Block 3630 may comprise storing the indication in the memory of an apparatus performing the method.

Figure 37:
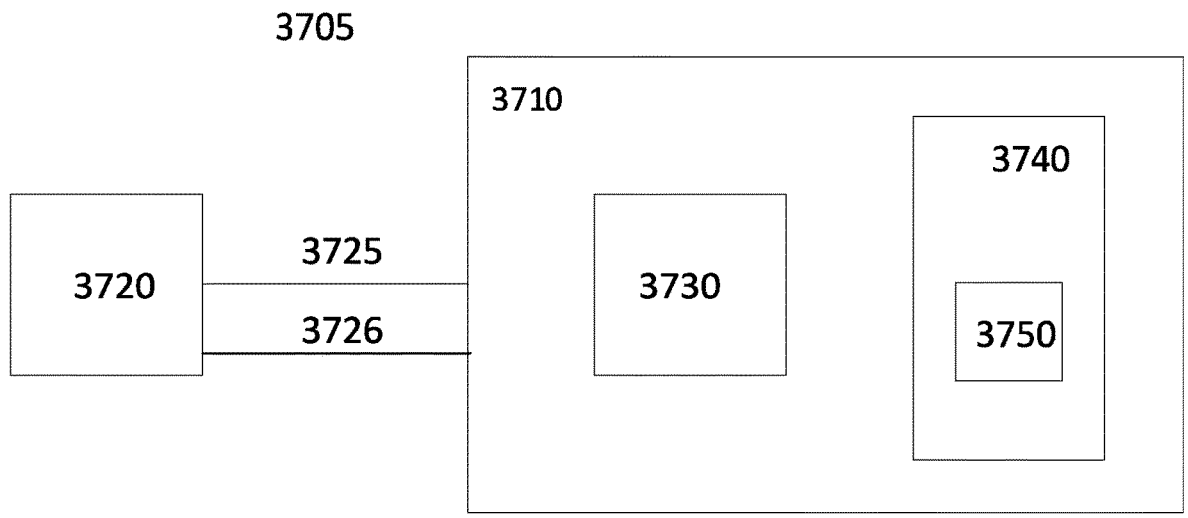
FIG. 37 illustrates a system according to an embodiment of the invention.

FIG. 37 illustrates a system 3705 according to an embodiment of the invention. The system 3705 comprises a control unit 3710 and particle sensor 3720. The particle sensor 3720 may be according to an embodiment of the invention, such as described above. In particular, the particle sensor 3720 may comprise a plurality of particle sensors, such as first and second particle sensors. Each particle sensor may output data on a respective data channel 3725, 3726 as illustrated in FIG. 37 which comprises two data channels.

The control unit 3710 is arranged to receive the pulse data 3725, 2726 which is indicative of current flow between first and second electrodes of a working electrode set associated with a microfluidic channel whilst a particle passes though the microfluidic channel.

The control unit 3710 comprises a processing device 3730 and a memory 3740. The processing device 3730 is arranged to execute computer-readable instructions which may be stored in the memory 3740. The processing device 3730 is arranged to perform a method according to an embodiment of the invention as defined by the computer-readable instructions. The memory 3740 may be arranged to store data for use in the method. The received pulse data may be stored in the memory 3740. In particular, the memory 3740 may store the pulse data 3725 received from the particle sensor 3720. The memory 3740 may further store one or more models 3750 or classifiers for use in the method. The one or more classifiers 3750 may be one or more pulse-shape classifiers 3750, such as described above for classifying the pulse data 3725 as corresponding to one of a plurality of predetermined types of particle. The control unit 3710 may be arranged to perform a method 3600 according to an embodiment of the invention, such as illustrated in FIG. 36.

The presence of an analyte results in the release of particles into solution. The number of particles released in related to the concentration of the analyte. Each analyte causes the release of a specific shape or sized nanoparticle. The released particles in solution are identified and counted by the sensor providing the rapid quantification.

A surface of a material e.g. glass slide, cellulose membrane etc, is functionalised with a DNA molecule. The DNA 2 is complimentary to a DNA 1 immobilised onto a particle. The particle is held on the surface via the formation of double stranded DNA between DNA 1 and 2. The presence of an analyte-1 in solution causes the disruption of the interaction between DNA 1 and DNA 2 (where DNA 1 or 2 could be an aptamer to the analyte-1). The interaction between analyte-1 and DNA 1/2 causes the particles to be released into solution. The number of particles in solution are counted via the RPS sensor.

Multiple analytes can be simultaneously quantified as the surface can be loaded with many different sized or shaped particles. Each particle is held on the surface via the formation of dsDNA. Here DNA 1 and DNA 2 are complementary, and there is no interaction between DNA 3 and 4. Equally DNA 3 and DNA 4 and complementary and particle 2 is held on the surface via the interaction of DNA3 and DNA 4. In the presence the analyte 1, there is a specific interaction between analyte 1 and DNA1/2 causing particle 1 to be released into solution. In the presence of analyte 2 there is a specific interaction between analyte 2 and DNA 3 or 4 causing particle 2 to be released into solution. The RPS sensor of the present invention can measure and identify the number of different particles.

The presence of the flow, and the ability to characterise the wide range of particle sizes enhances the diagnostic application and is a unique combination of diagnostic chip and RPS sensor.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Example 1: Shape Analysis

Materials and Methods

Materials: Three types of nanoparticles were used in this study: carboxylated polystyrene particles (200 nm in diameter, denoted CPC200, from Izon Science, Christchurch, NZ), Carboxylated polystyrene particles (158 nm in diameter denoted PS150, purchased from Bangs Laboratories, Inc, Indiana, USA), nanorods purchased from CMD Ltd. Iron oxide nanorods were supplied by CMD Ltd, Cardiff, UK.

Particle preparation: Carboxyl groups were added to the iron oxide nanorods using PEI and PAAMA (Poly(ethylenimine) (PEI), Mw 750,000 g mol-1, analytical standard, 50% wt., P3143, poly(acrylic acid-co-maleic acid) (PAAMA), Mw ~3000 g mol-1 50% wt., 416053, purchased from SigmaAldrich, UK. Reagents were prepared in purified water with a resistance of 18.2 MΩ cm. Particles were taken from stock (50 μL) and suspended in PEI (1 mL, 5% in $H_2O$). The solution was placed on the rotary wheel for 30 min. The solution was centrifuged for 5 min at 10,000 rpm, and the PEI solution removed from the particles and replaced with water.

The sample was vortexed and sonicated until the particles were fully dispersed. This wash step was repeated twice to ensure all excess PEI had been removed. The PEI-coated particles were suspended in PAAMA (5% in 50 mM NaCl) for 30 min and placed on the rotary wheel. The same process for removing the excess PEI was used. The particles were then stored at 2-4° C. in water. The carboxyl polystyrene particles (158 nm) from Bangs Laboratories, US and the CPC200 (200 nm) from Izon Science, NZ were used without modification. The particles were diluted using 50 mM potassium chloride solution (KCl, >99%, P/4240/60 purchased from Fisher Scientific, UK).

Method validation: To develop the models we used particles of comparable volume, i.e. PS150 and carboxyl coated nanorods. For the mixtures we calibrated the model with a sample of pure nanorods and (small, PS150) nanospheres. We then recorded >500 events where the solution contained mixture of nanorods to (large CPC200) nanospheres. To create the mixtures, we first diluted the nanorod and nanosphere particle solutions so that each sample had a comparable particle count rate, i.e. number of pulses per unit time. Thus when mixed in equal amounts the signal ratio of nanorods to nanospheres is equal to 1. We do not here make the assumption that the concentrations of nanorods to nanospheres is equal, just that the number of translocations from each type of particles are comparable. Mixing different volumes of these stock solutions then results in a known ratio of pulses RPS Setup: All measurements were conducted using the nano (Izon Science, NZ) combing tunable nanopores (NP150s) with data capture and analysis software, Izon Control Suite v.3.1. The lower fluid cell contains the electrolyte (75 μL). The particle is suspended in the same electrolyte and placed in the upper fluid cell (40 μL). Prior to analysis, all samples were vortexed and sonicated for 30 s. After each sample run, the system was washed by placing 40 μL of electrolyte into the upper fluid cell several times with various pressures applied to ensure there were no residual particles remaining and therefore no cross contamination between samples. As multiple pores were required throughout the set of experiments, we ensured where possible that they had comparable pore dimensions. To do this, we used the same dimensions of pores as supplied by the manufacturer. Due to the polyurethane material and manufacturing process, some variance is expected in the size. To compensate for this, we matched the baseline current within 5% of 110 nA, as well as running control samples, blanks, and calibrations beads, to allow for comparison between data sets. In the absence of information on the exact dimensions of the PU pore, the response of the nanopore can be calibrated using a particle of known size and volume. Here we used polystyrene particles with a mean diameter of 235 nm. As the RPS blockade magnitude, $\Delta i_p$, signal has a linear relationship with particle volume, a one-point calibration is enough.

Within the PU setup, two main modes of transport exist. The first is electrophoresis. As all particles have a carboxyl surface chemistry they travel towards the anode on the side of the membrane opposite to the sample. The second is convection, caused by fluid flow under the influence of gravity. Here the pores have a vertical orientation and the sample is placed at the top of the membrane.

Electron Microscopy Setup: Polystyrene nanospherical nanoparticles and iron oxide nanorods were diluted in DI-water and 5 μl of sample was dropped onto a copper plate and allowed to evaporate at room temperature.

Mathematical Model Method: Data obtained from instrument software, including both the resistance data for the entire run and the blockade output file, were analysed in R 3.4.1 using the RStudio interface. First a method was developed to reproducibly extract each pulse. This involved extracting 1001 time points containing a detected blockade event, identifying the blockade minimum, then extracting 301 time points with the pulse minimum at point 151. This resulted in 150 data points before and after the pulse magnitude. To account for any base line drift, and variation in noise, each pulse was detrended using the first 50 and last 50 time points.

A file consisting of all extracted pulses was created from each run, as well as a file of extracted pulses normalised to depth 1. Finally, the extracted pulses and normalised extracted pulses were each approximated by quadratic b-splines with fixed knots (using the R package cobs) and the coefficients saved in two additional datasets.

Models were built in both the R base package (glm) and in the package glmnet (for lasso penalised regression). Two calibration runs were used to train the models using solutions of either nanospheres or nanorods alone. Following the calibration data two test solutions were run, again containing just nanorods or just nanospheres. This process was repeated for each nanopore, and in total 5 PU nanopores were tested and in terms of their ability to predict the shape of each nanoparticle recorded within the run using the R package pROC.

Simulation Method: The Finite Element Method (FEM) was used to predict the pulse shape caused by a nanosphere and a nanorod traversing a conical pore on an on-axis trajectory. The commercial software Comsol Multiphysics 5.2 was used to solve the underlying electrostatic problem, governed by the Laplace equation $\Delta\phi=0$. The boundary condition for the channel walls and the particle were assumed to be insulating, meaning that the component of the electric field normal to the boundary has to vanish at the surface. The pore was assumed to be of conical form with a pore length of 250 μm, a diameter of the large pore opening of 52 μm and the small opening of 666 nm. The values for the pore length and the large pore opening were extracted from SEM data, while the small pore opening was calculated from the baseline current (applied voltage 1.46 V, conductivity of the solution of 0.667 S/m) using a model described elsewhere. The length and the width of the nanorod was 450 nm length and 90 nm respectively, both extracted from SEM data. The nanospheres of 158 nm was chosen so that it matches the volume of the nanorod. The simulations for both nanorod and nanosphere were repeated for a sufficient number of points along the pore axis so that the current as a function of the particle's centre position could be extracted. As the main transport mechanism for the parameters used in the experiments is hydrodynamic flow resulting from the pressure head applied and it can be assumed that the particles follow with the fluid flow, the position-current relationship can be directly be scaled into a time-current relationship.

Results and Discussion

We have developed a method for the analysis of nanoparticles that permits us to categorise individual particles by shape allowing us to determine the ratio of different shaped particles in solution. This method termed resistive pulse sensing logistic regression models RPS-LRM, links resistive-pulse data to a signal processing and shape prediction statistical algorithm to classify individual particles by shape as they pass through the pore. Two sets of experiments were carried out.

3.1 Using the RPS Signal to Identify the Particle Shape

Figure 22:
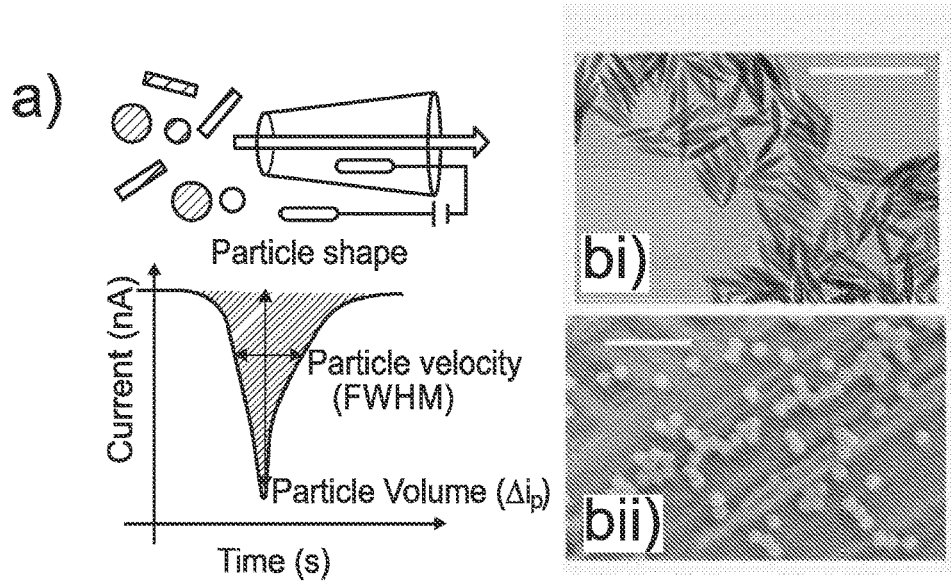
FIG. 22(bi) is a TEM image of carboxyl coated iron oxide nanorods.

The first experiment involved two types of nanoparticles, a nanorod (FIG. 22bi), and a nanosphere (FIG. 22bii). To develop the method we chose materials to have roughly equal volumes. Whilst efforts to match the exact the volume of nanorod and nanosphere were made, it should be noted that they are not equal. It is interesting to note the excellent agreement between RPS and S/TEM data. This simple observation is important as previous RPS studies into nanorod analysis have shown that tumbling rates of smaller nanorods can influence the blockade magnitude, resulting in an over estimation of nanorod size. Here we don't exclude the ability of the nanorods to tumble in solution, but the calculated number of rotations as they transit the sensing zone of the nanopore was calculated to be <0.5 rotation per pulse. Thus the orientation that they approach the pore is likely to the same one as they exit the sensing zone.

Figure 23:
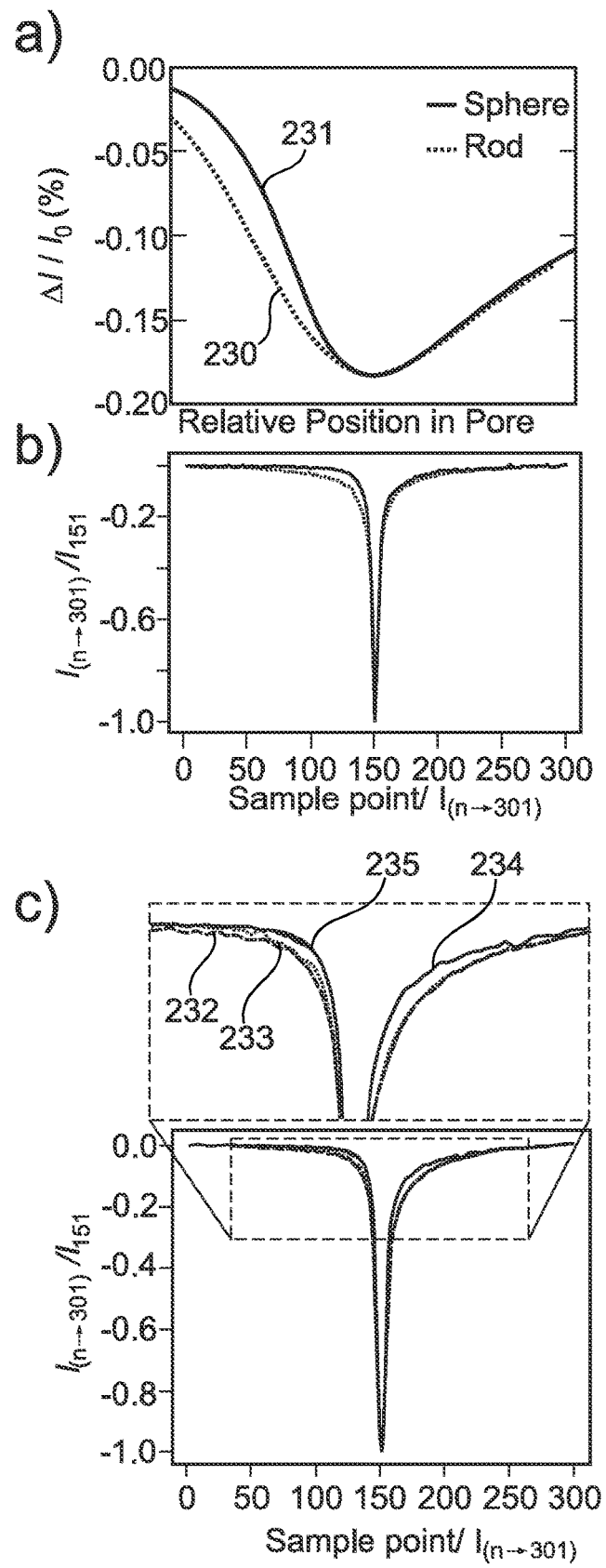
FIG. 23a) shows predicted normalised pulse shape for nanorod and nanosphere.
FIG. 23b) shows average normalised resistive pulse recorded for nanospheres (231) and nanorods (230).
FIG. 23c) shows average normalised pulse recorded for NanoRods of aspect ratio 5 (232), 2.8 (233), 1.8 (234) and NanoSphere (235)

A computational model was built to determine the theoretical pulse shapes for the nanospheres and the nanorods as a function of particle position within the pore. FIG. 23a shows the simulated normalised pulse shape for a nanorod and nanosphere as they translocate the nanopore. A clear difference in current-position relationship for nanorods and nanospheres is observed as the particle approaches the sensing zone, left hand side. Whilst a smaller difference is predicted as the particle exists the sensing zone, right hand side. Note that whilst we have modelled the nanorod aligned to the axis of the nanopore (see experimental section), there is no way to predict that the nanorods have a preferred orientation as they approach the opening. For comparison, FIG. 23b shows the average measured pulse shape for >500 nanospherical and nanorod particles. Note that the difference in pulse sharpness between the predicted and observed pulses is due to the difference between horizontal axes and number of data points. However in terms of a comparison between pulses for the two particles, the average measured pulse show a similar trend to the simulations, which suggests that it should be possible to determine which type of particle has been detected by using information about the pulse shape. To further illustrate the sensitivity of this technique nanorods of different aspect ratios were run through the setup. FIG. 23c shows the average measured pulse shape for >500 particles for varying aspect ratios. In the current setup nanorods with an aspect ratio below 2 are indistinguishable from nanospheres.

3.2 Measuring the Proportion of Nanorods in a Mixed Solution.

RPS is however a single particle analysis technique, capable of size and concentration analysis, and this also hold for nanorods. Each nanoparticle as it traverses the first particle sensor or the second particle sensor records a signal. Thus taking an average of hundreds of pulses to enable a shape classification may be misleading. If a sample contained both nanospherical and nanorod shaped particles, then depending upon the ratio of nanorods to nanospheres the average signal may cause a misclassification or false positive for the material. Having shown that the PU pores can detect average differences between nanorods and nanospheres the next step was to apply an analysis and classification process to each pulse and particle moving through the nanopore. For each experiment two runs of each type of nanomaterial were performed. Using the analysis package described below, individual pulses of 301 time points centred on the pulse minimum are extracted from the raw data file (see FIG. 24). Each pulse is then aligned and detrended. The choice of 301 time points is to balance between the desire to have a stable baseline at either end of the pulse in order to detrend and align signals, but to avoid in most cases capturing two pulses in the same time period. The pulses are then normalised to depth 1 in order to separate size information from shape information. This helped illustrate the versatility of the technique as particles of any size/volume can be shape classified in future applications.

Shape data in the form of spline coefficients for the normalised pulses is obtained using quadratic splines with 25 fixed knots and three fixed points (24 coefficients). The spline coefficients provide a mathematical description of the shape of the denoised pulse. Note that standard Fourier methods of denoising are not suitable in this setting, as pulse lengths are on the same length scale as noise oscillations. A schematic of this is shown in FIG. 24, but it should be noted that the knots are not evenly spaced as represented; more knots are used along the areas of rapid change in current than in the mostly stable regions at the ends.

FIG. 24 shows recorded pulse data. Each pulse containing 301 data points is isolated. The analysis of the pulse was done by one of five models. A) Pulse magnitude, B) Blockade width, at fractions 0.75, 0.5, 0.25 of the pulse heights. C) Non-normalised spline fitting and D-E) Spline fitting on normalised pulse magnitudes.

Figure 25:
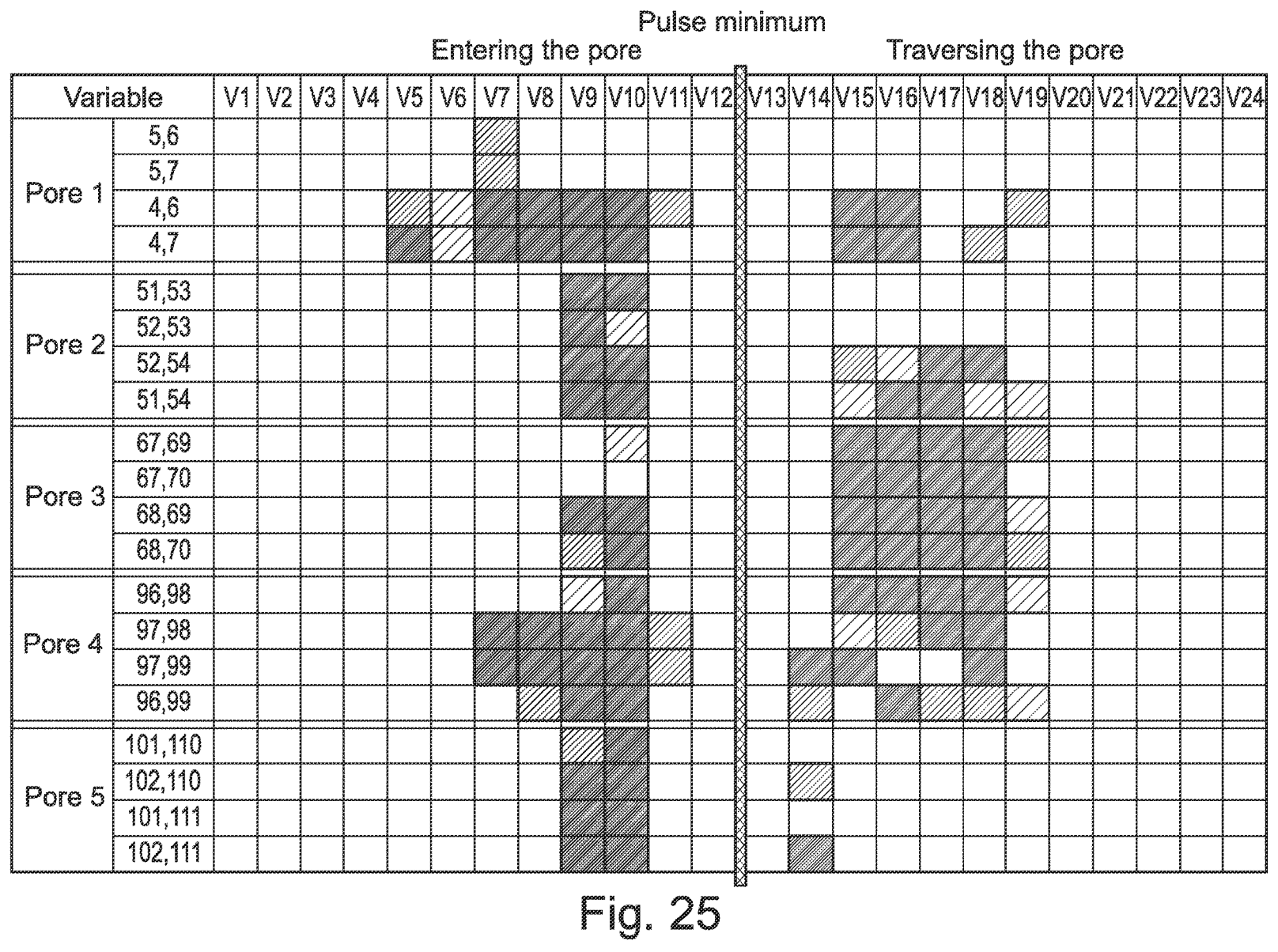

FIG. 25 shows visualisation of the key spline segments that identify particle shape as determined by multiple t-tests with a Bonferroni correction.

Figure 26:
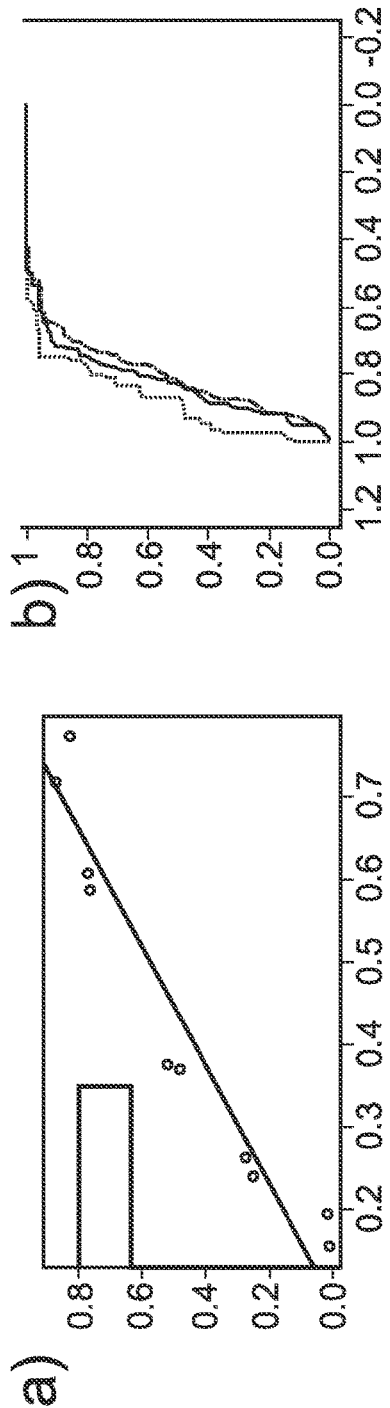
FIG. 26(a) shows a plot of predicted ratio of rods to spheres versus known ratio, using data model D.

FIG. 26 (a) shows a plot of predicted ratio of rods to spheres versus known ratio, using data model D.

Five different types of logistic regression models may be fit to data from one pure rod run and one pure sphere run (the training data). To determine the performance of each model in developing the analysis, we built each model on data from five pores and tested for particle classification on data from a second pair of runs from each pore (the testing data). The first model, A, uses only the maximal depth of the pulse, which is has been shown to be approximately proportional to particle volume. The second model, B, uses the vector (pulse width) of the blockade data described elsewhere. The third model, C, uses spline coefficients for the extracted signals. This also includes the size data from model A. The fourth model, D, uses spline coefficients for $b$-splines fit to the extracted signals after they were all normalised to have depth 1. This model only examines the shape of the resistive pulse as the size (depth) data has been removed. Models B, C and D are fit for each pore on the training data using lasso penalised regression (glmnet package in R). This means that the variables selected (i.e., with non-zero coefficients) for these models are different for different pores. The final model, E, uses a fixed set of spline coefficients from the normalised signal data based on the results of the multiple t-tests (coefficients 9, 10, 16, 17, 18 and 19), and fits the model using standard logistic regression. The signal processing and modelling methods are illustrated in FIG. 24.

The performance of the models was compared using the maximum of sensitivity+specificity along the ROC curve on the testing data for each model. Here sensitivity is the percent of correctly classified nanospheres and specificity is the percent of correctly classified nanorods, and thus a perfect score would be 200. For each set of data (two runs of each particle type), there were four choices (two choices of nanosphere run and two of nanorod run) of training and testing data. We refer to the models built and tested in these four different ways as replicates. The model scores for these four replicates across 5 nanopores are recorded in Table 1. Important to note that for all models, each pore had to be calibrated before it could characterise particle shape, i.e. a sample of pure nanorods or nanospheres were passed through each pore first. It should also be noted that the calibration on one pore would not predict particle shape on another, data not shown. We attribute this to differences in pore structure and reproducibility of the manufacturing process, as well as its stability over the course of the experiment.

To ascertain which parts of the normalised spline model were key in identifying the particle shape, we performed multiple t-tests with a Bonferroni correction on each spline coefficient over all pairs of rod and sphere data taken for each pore (4 pairs per pore). FIG. 25 visualises the key spline segments i.e. the parts of the curve whose shape shows a significant difference between spheres and rods. For all pores, the fall in current, i.e. as the particle enters the pore, has splines that show significant features for particle shape (green segments). In some cases, pores 2, 3 and 4, the second part of the pulse i.e. the part that is recorded as it traverses the pore also shows a significant ability to measure particle shape. It also suggests that pores of different shapes may have overall better ability than conical pores to distinguish particle shape.

We have demonstrated that model C, which involves spline coefficients on non-normalised signals performs better than models involving data that has conventionally been extracted from RPS depth and pulse width. In particular, for model A (depth data only), the overall mean score for each combination of training and testing data over the five pores was 144±15 with a standard deviation of 15, with approximately 74% of spherical particles identified as spheres, and 70% of rod particles identified as rods. Model B had an average score of 129±20. Interestingly, this performed worse on average than the model using only depth, indicating that pulse width data is not an effective way to capture shape data, and that the extra width data can in fact lead to model overfitting rather than improved predictive performance. This is also indicated by the high standard deviation, which shows that instrument collected width data is not a reliable measure of shape.

TABLE 1

Combined sensitivity and specificity values for each model and nanopore tested.

| | Model A | Model B | Model C | Model D | Model E |
|---|---|---|---|---|---|
| Pore 1 | | | | | |
| Replicate 1 | 162 | 108 | 168 | 135 | 161 |
| Replicate 2 | 167 | 112 | 174 | 151 | 162 |
| Replicate 3 | 140 | 106 | 144 | 120 | 149 |
| Replicate 4 | 139 | 104 | 141 | 115 | 152 |
| Pore 2 | | | | | |
| Replicate 1 | 148 | 121 | 145 | 119 | 150 |
| Replicate 2 | 140 | 119 | 137 | 118 | 147 |
| Replicate 3 | 148 | 116 | 149 | 127 | 144 |
| Replicate 4 | 137 | 127 | 143 | 124 | 137 |
| Pore 3 | | | | | |
| Replicate 1 | 163 | 164 | 159 | 142 | 135 |
| Replicate 2 | 159 | 142 | 155 | 121 | 114 |
| Replicate 3 | 160 | 158 | 161 | 137 | 127 |
| Replicate 4 | 161 | 162 | 153 | 148 | 143 |
| Pore 4 | | | | | |
| Replicate 1 | 128 | 136 | 167 | 163 | 162 |
| Replicate 2 | 117 | 146 | 155 | 148 | 153 |
| Replicate 3 | 142 | 156 | 156 | 142 | 136 |
| Replicate 4 | 149 | 135 | 145 | 128 | 131 |
| Pore 5 | | | | | |
| Replicate 1 | 122 | 131 | 134 | 135 | 133 |
| Replicate 2 | 129 | 108 | 125 | 123 | 124 |
| Replicate 3 | 129 | 129 | 136 | 134 | 136 |
| Replicate 4 | 135 | 107 | 127 | 123 | 121 |
| Mean pores 1-5 | 144 | 129 | 149 | 133 | 141 |
| Standard Deviation | 15 | 20 | 13 | 13 | 14 |

By contrast, the average score of Model C at the optimal classification point was 149±13. Thus, we see that on average the inclusion of the pulse shape yields a somewhat better classification model for nanomaterial shape then depth alone, and also with a marginally lower standard deviation, indicating a somewhat more reliable method of model building. Model C also has the powerful advantage that it removes the need for any pre-knowledge of the particle size for the materials analysis.

It is notable that even when size information is removed through pulse normalisation, shape information is retained. In particular, model E had an average score of 141±14, corresponding to about 75% sensitivity (correct sphere classification) and 66% specificity (correct rod classification). In general, specificity was below sensitivity at the maximum of the sum in all cases, which we attribute to the effect of variation in rod orientation creating a wider range of possible pulse shapes, which are thus more difficult than spheres to characterise with a dichotomous model.

Whilst the identification of particle shape for a pure sample is powerful, a final demonstration of the power of the RPS-LRM was to mix different ratios of spheres and rods together and ask the model to predict the ratio of rods to spheres in the mixture. Despite its somewhat worse performance (on average 133±13), Model D was used here instead of model E, to illustrate that with no knowledge of the key splines vectors any user can download the R code here and apply it to their RPS experiments. Particles of different sizes were chosen for this experiment for two reasons. First, this allowed us to use size to determine if each given pulse corresponded to a rod or a sphere, thus giving us access to ground truth about particle shape. Recall that model D uses only shape data from depth normalised pulses, thus we can compare the performance of this model for shape detection of particles in solution with the ground truth as given by size. Thus, our predicted ratio of particles using size and the Model D classification ratio should be comparable. A second reason was to demonstrate that a model fit using spheres of one size could be used to determine the shape of spheres of a different size, thus further demonstrating that shape can be studied independent of size.

These samples were analysed. Model D gave a linear response, that is, as the ratio of rods increased the model identified an increase, with an impressive linear relationship (R squared value of 0.9264). The gradient here is greater than 1, due the imperfect specificity and sensitivity reported earlier. It is important to note that the presence of both particles in solution does not affect the model's ability to predict particle shape. This data can also be used to estimate the optimal sensitivity and specificity possible with this current experimental setup when the run conditions for all particles in the testing and training sets are identical. Note that for this particular data on the particular pore tested, using model D we got a model with sensitivity of 72% and specificity of 91%. That is, 91% of spherical (large) particles were identified by just their shape data as spheres, and 72% of rod (small) particles were identified by just their shape data as rods (FIG. 26b).

Example 2: A Tunable 3D Printed Microfluidic Resistive Pulse Sensor

Materials and Methods

Chemicals and reagents: CPC2000, 2 micron carboxylated polystyrene calibration particles were obtained from Izon Science Ltd, 10 micron and 20 micron carboxylated polystyrene calibration particles denoted as CP10M and CP20M were obtained from Izon Science Ltd. 30 Micron carboxylated polystyrene particles, Cat No. 84135, were obtained from Sigma-Aldrich, potassium chloride obtained from Fisher Scientific UK, >99% cat no: P/4240/60, Acc Silicones QSil216 was obtained from RS components, catalogue no: 458-765, part no: QSil 216, Algae samples were obtained from Roscoff Culture Collection, *Aurantiochytrium Mangrovei* (Spherical), catalogue number: RCC893 and *Navicula ramosissima* (Rod), catalogue number: RCC5374Isopropanol obtained from VWR.

Data Analysis: Data analysis was performed within the data analysis module of the Izon control suite, pulse shape extraction was performed using molecular devices clampfit version 10.7, and pulse shape analysis was performed with a custom R Code.

Device Assembly: In order to assemble the device, the lid was affixed to the base via six machine screws, located at each corner, and two screws in the middle of the device. The screws were tightened and secured in place using nuts. Into each one of the screw threads, HPLC fittings were attached in order to accommodate the inlet from the pumps, the electrodes and the outlet. Once fully assembled, the device was placed into a custom-made faraday cage and electrolyte solution was pumped into the device.

Device Printing: Both the lid and base of the device were printed on an Asiga Pico HD27 UV using FORMlabs clear resin. Files were converted from the CAD software, Siemens NX11 to STL and prepared for printing using Asiga Composer software. Once printed, the parts were cleaned and post cured using a UV light box.

PDMS Gasket: The PDMS gaskets were formed by mixing parts A and B of QSil 216 in a 10:1 ratio. The lid was placed into a petri dish with the ridge oriented to the bottom. The uncured PDMS was poured around the edge of the lid making sure that the whole lid was covered up the ridge and no larger air pockets remained. The PDMS was then cured for one hour at 70° C. or until set.

SEM/EDS and Optical Imaging: Prior to SEM imaging, the samples were sputter coated in Au/Pd for 90 seconds using a Quorum Q150T ES gold sputter coater. SEM images were captured on a Zeiss 1530VP FEGSEM. EDS data was captured using Oxford instruments X-mas 80 mm2 detector and processed using Oxford Instruments Aztec EDS microanalysis software. Microscope images were captured using a Nixon Optiphot 2 optical microscope, and images were captured using a DS 5M camera with a DS-L1 camera control unit.

Electrode fabrication: Electrodes were fabricated by inserting a section of silver wire, 0.25 mm diameter, 99.99% purity obtained from Advent Research materials catalogue no: AG5485, into a pipette tip. A small section of the wire is threaded through the narrow end of the pipette, and the wire is glued in place using Araldite® Rapid epoxy resin; the electrodes were then left to dry.

Sample run: Samples were loaded into Dolomite mitos p-pump which is controlled via the flow control centre software. Once the required pressure has been entered into the software, the pumps then drive the sample into the device. When signals are detected, the recording software is activated and each sample is recorded for the required time or until the required number of particles have been detected. The flow rate was determined by setting the lid to the required baseline and pressure. A pre-weighed Eppendorf was then positioned at the outlet for one minute, then removed and reweighed to determine the mass and volume of the liquid run through the device over that period of time.

Tea sample preparation: Tea samples were prepared by making an incision into the bag and discarding the contents. The bags were then washed with deionised water and allowed to dry.

Finally, a glass vial of deionised water was heated to 95° C. and the dried tea bag was placed into the vial for 5 minutes. After 5 minutes, the solution was decanted into another vial and allowed to cool. The sample was then diluted to the required concentration with electrolyte solution.

Tea sample electron microscopy preparation: The samples were prepared by vacuum filtrating the decanted solution using an ANODISK 47 mm filtration membrane, 0.02 micron. The membrane was then washed five times with deionised water, 15 MΩ, and allowed to dry before being mounted onto an aluminium SEM stub using a carbon adhesive tab. Pulse shape analysis: The pulses were analysed by custom R code which has been previously reported. Pulses were extracted, detrended and aligned, then approximated using b-splines (using the COBS package). Logistic models for shape/run discrimination were built on training data using three spline coefficients showing the greatest predictive power for shape classification (under lasso penalised regression using the glmnet package). Classification power was then evaluated on independent testing data.

Results

Figure 27:
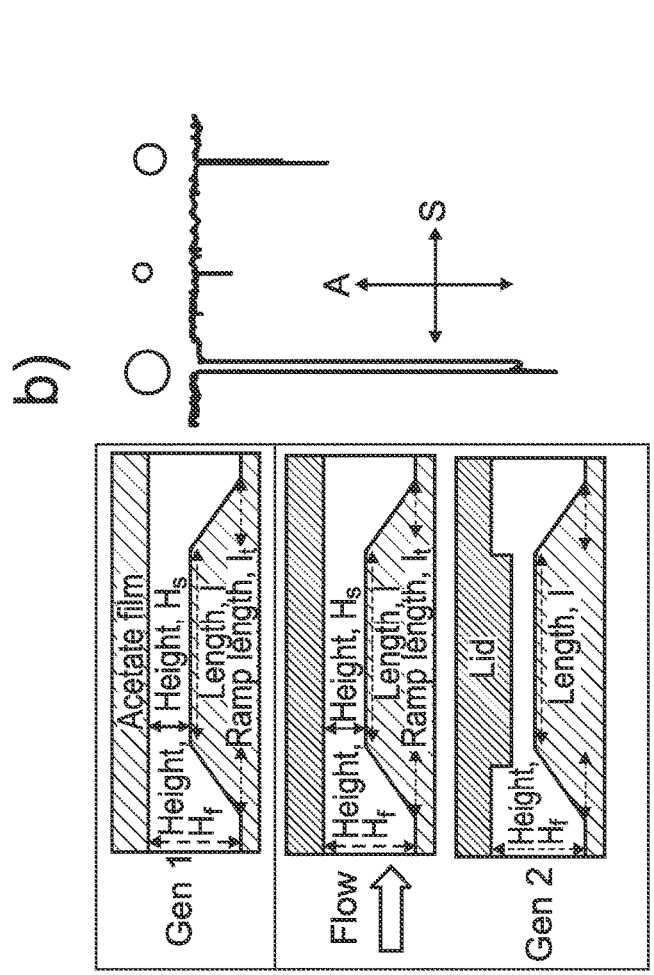
FIG. 27a) a schematic of the sensing zone when using an acetate film, a flat lid and ridge lid, b) schematic of the resistive pulses expected when a particle passes through the sensing zone.

FIG. 27a, shows images of a base unit, lid and sensing zone and electrodes. The lids can have several designs; the first is a flat surface that mimics the acetate film. The second design has a ridge that extends 1 mm out from the surface and is aligned to extend into the microfluidic channel. The third has multiple ridges that can change the shape of channel and sensing region. The device was designed to be integrated into a flow system, thus has printed screw threads to connect pumps.

Figure 28:
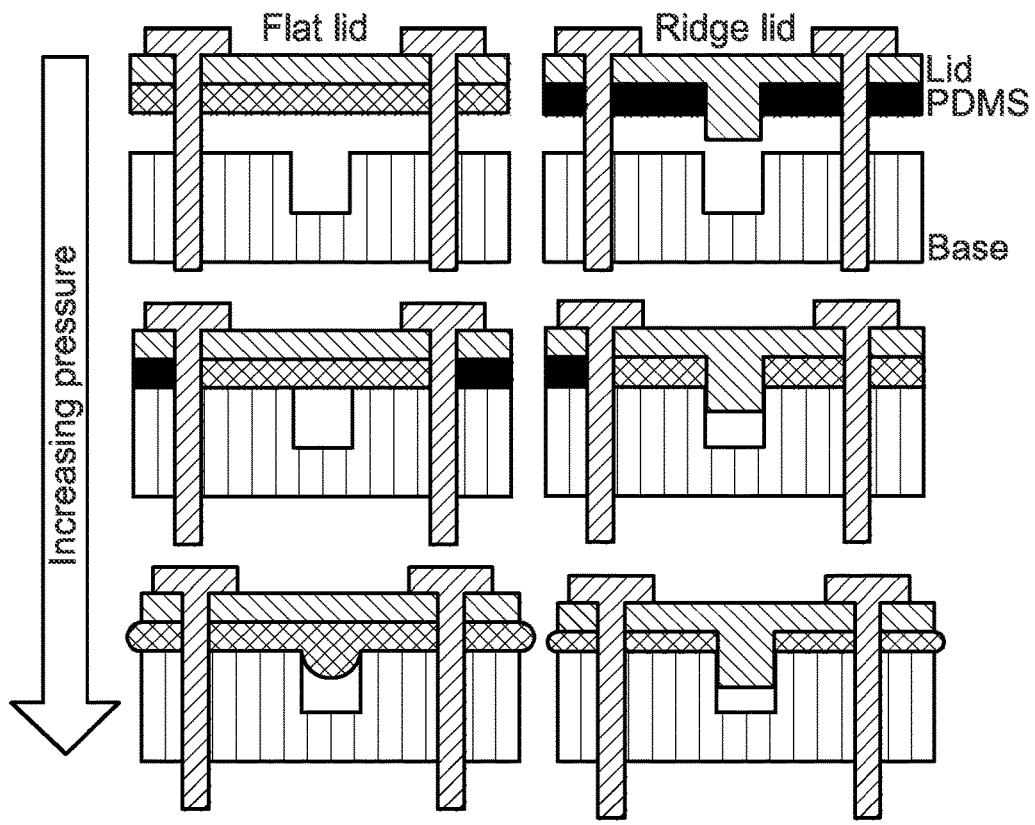
FIG. 28 shows a schematic of a first particle sensor with different lid designs, demonstrating how the dimensions of the microfluidic channel may be tuned via provision of a polymer layer on a surface of a lid, and via applying increasing pressure to the lid.

The PDMS layer acts as a gasket sealing the components and preventing any leakage. It is held in place by the screws, and the shape or dimensions (internal volume) of the channel can be controlled via two mechanisms. The first is by altering the shape and structures on the lid. The lid can be made with a flat surface, or containing protrusions designed to fit within the main channel in base unit. The second option is to use the PDMS layer, which is compressed into the channel upon the application of a force via the screws. FIG. 28 shows the schematic of this process, for the flat lid the PDMS covers its entire under surface and as the screw tension is increased, it forces the flexible PDMS gasket into the channel, causing the channel's internal volume to decrease. For the second lid design, the ridge causes the largest change in channel volume upon tightening of the screws, as opposed to the PDMS layer, which does not extend over the ridge itself.

When the channel is filled with a conductive liquid and a potential difference is applied between the two electrodes, the size of the channel can be monitored in real time through the base line current, I, as I is proportional to the sensing volume the resistance can then be related to the current via Ohm's law: $R=L/\sigma hw$, (where R is the resistance, L is the channel length, $\sigma$ is conductivity of solution, and h and w are the height and width of the channel, respectively.

Figure 29A:
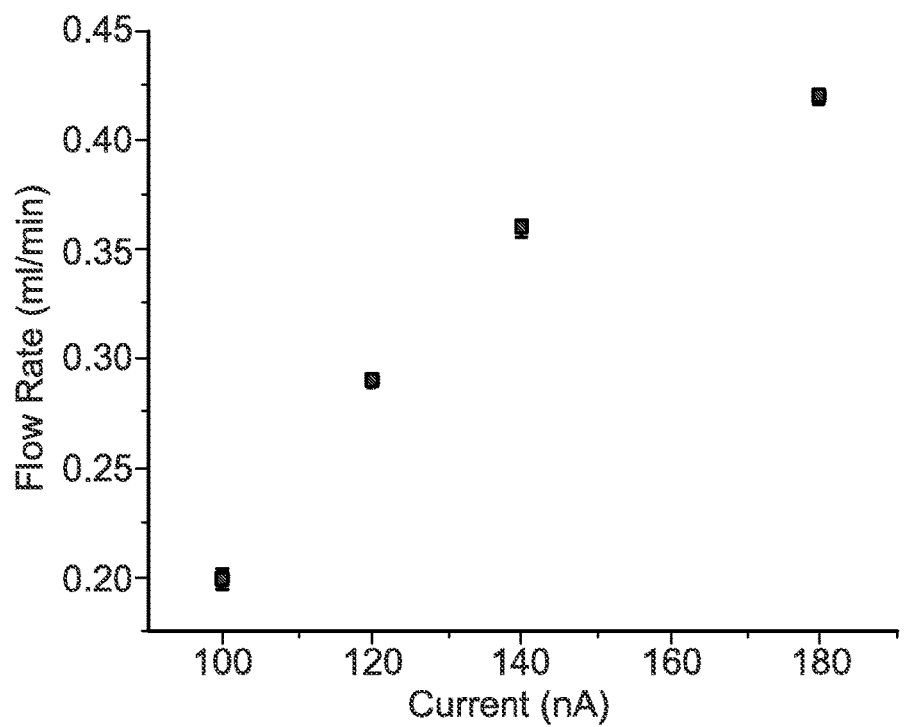
FIG. 29(a) is a plot of measured current versus flow rate for a flat PDMS lid, voltage=5.64 V, 0.25 mM KCl. Current-Voltage plots for b) Absence of flow c) 100 mbar of pressure applied to the liquid, d) Baseline currents for the device with 100 mbar flow pressure in 100, 50 and 0.25 mM KCl (left to right), Voltage=0.5V (100 mM), 0.6V (50 mM), 8.5V (0.25 mM)

FIG. 29a shows the flow rate versus baseline current for the flat lid device under a constant applied pump pressure. The base line current was controlled by changing the pressure on the lid through the screws. A higher force, compressed the PDMS layer or ridge further into the channel and resulted in a smaller base line current. The data in FIG. 29a shows the relationship between base line current and screw tension, illustrating the use of a compressible PDMS layer to tune the channel dimensions. By adding a ridge on the lid that extends into the flow, the shape of the sensing region as well as its internal volume is reduced further, as shown in FIG. 28. The screws and PDMS compression layer allow further tuning of the channel volume. An extreme version of this allows the ridge to fully seal the channel and acts like a 3D printed valve.

FIG. 29 also illustrates the relationship between applied voltage and current for the ridge lid in the presence and absence of convection. The linear relationship between current-voltage and the consistency of the current in the presence of fluid flow, shows no preferential current flow/rectification or problems with resistance between the electrodes. To test any effect that the lid material may have on the current, the base unit was sealed with an acetate film to mimic gen-1. Also shown in FIG. 29d is example baseline current traces and noise during convection for various ionic strengths. After the channel was sealed with the PDMS gasket and lid, the device was used as a resistive pulse sensor. 20 μm particles were added to a sample reservoir and pushed through the device using a range of flow rates.

Figure 30:
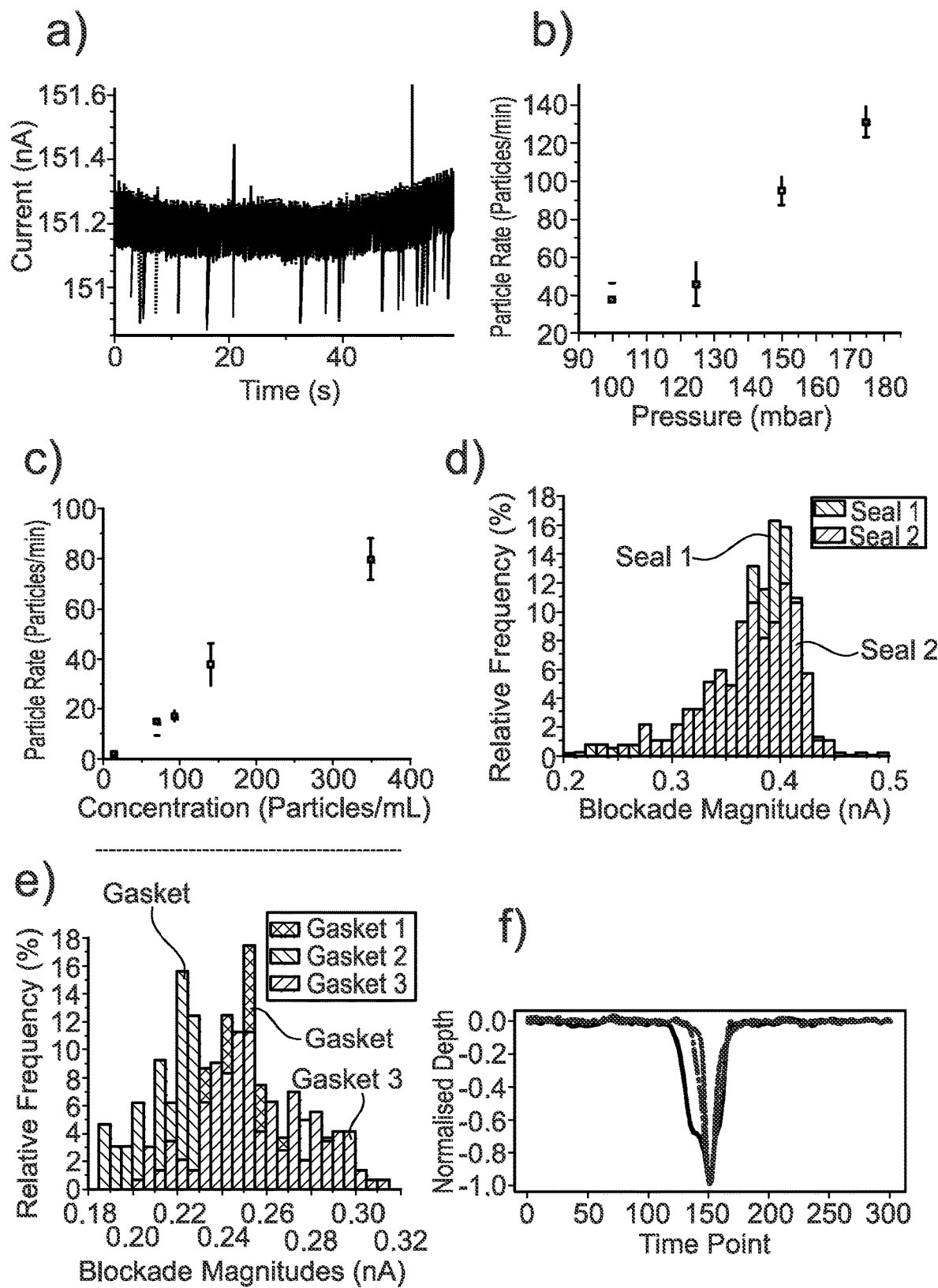
FIG. 30(a) is an example of a current trace from a ridge lid design, particles $20\times10^{-6}$ m in diameter, 8.5 V. b) Particle count versus pressure, particles $20\times10^{-6}$ m in diameter, 8.5 V. c) Particle count versus concentration, particles $20\times10^{-6}$ m in diameter, 8.5 V. d) Distribution of pulse magnitudes, particles 30×10-6 m in diameter, 5.64 V, before and after the same device and PDMS gasket was disassembled. e) Distribution of pulse magnitudes, particles $20\times10^{-6}$ m in diameter, voltage=7.5 V, using three different PDMS gaskets. f) Average pulse shape for each gasket in e, average of over >60 particles. All examples were run on 0.25 mM KCl.

FIG. 30a shows example current vs time traces, and the relationship between pulse frequency and flow rate, FIG. 30b. The pulse frequency, J, has linear relationships with flow rate, ΔP, and with concentration, Cs, (FIG. 30b,c), as predicted by the equation J=CsΔP, where the contribution from electrophoresis and electroosmosis is negligible given the high flow rates. The flow rate does not change the magnitude of the signal, but does change the translocation times.

The same PDMS gasket could be reused 3 times before any leakages were observed, each time the components were placed together and the tension on the screws could be adjusted to match the baseline current. This was interpreted as producing a channel of similar dimensions. Example data sets from the same device and PDMS gasket taken apart and resealed are show in FIG. 30d. The device could remain sealed for four days without any deterioration in signal quality, although it should be noted that on each day a calibration is needed to be run to quantify the analyte as there is some drift in the signal. An example of the reproducibility of the setup is also shown in FIG. 30e which shows the blockage distributions of 20 μm particles using the same base and lid unit with different PDMS gaskets, with the average pulse shape shown in FIG. 30f for the three different assemblies. It is important to note that here the shape of the pulse reflects the internal shape of the sensing zone. Whilst we hypothesised that the signal should be a rectangular pulse with a flat and consistent current during the translation event, the pulse shape indicates a different relationship. Similar effects were seen in the previous examples, and future work is needed to model the current and behaviour of the signal. We also note that the thickness of each PDMS gasket may vary, but by tightening the screws to match the base line current a consistent sensing zone could be produced each time. The pulse shape is also dependent upon the flow rate, as this effect the time within the channel.

Figure 31:
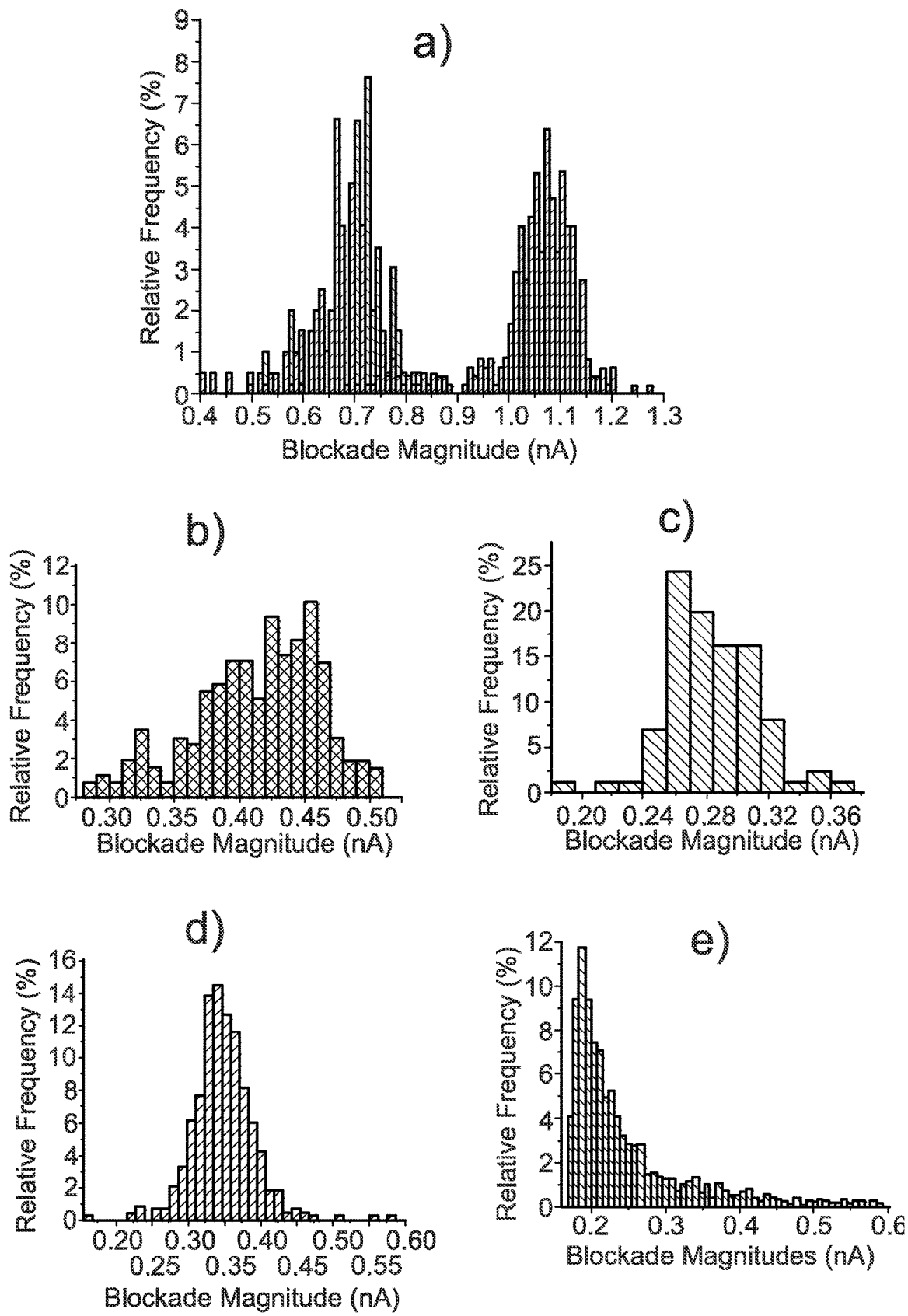
FIG. 31(a) shows blockade distributions for $30\times10^{-6}$ m in diameter particles Voltage=5.64 V, 0.25 mM KCl, using two different (low—left, high—right) screw tensions. b) As a control, acetate tape (Gen-1) was used to seal the device. $30\times10^{-6}$ m in diameter particles Voltage=5.64 V, 0.25 mM KCl. Increasing the tension on the screws allows the RPS to measure smaller particles. c) 20×10-6 m in diameter particles Voltage=8.5 V, 0.25 mM KCl, d) $10\times10^{-6}$ m in diameter particles Voltage=0.6 V, 100 mM KCl. e) $2\times10^{-6}$ m in diameter particles Voltage=1 V, 100 mM KCl.

Changing the volume of the sensing zones allows the sensitivity of the RPS to be varied. An example of this is shown in FIG. 31a, where upon tightening the screws the blockage magnitude of the same sized particles increases with increasing screw tension. With this ability the same device, printed with an initial channel dimensions of 100 μm could measure particles from 2 to 30 μm (FIGS. 31b-e). This simple configuration enables an enhanced dynamic range on a single set of reusable components.

The device was designed to screen environmental and food samples for contamination. An emerging threat to the global environment is that of microplastics, thus a first test was inspired by a recent publication. Hernandez and co-workers found that certain tea bags shed billions of plastic microparticles during their use. Follow their published protocol (*Environ. Sci. Technol.*, 2019, 53, 12300-12310), we placed the bags into hot water for 5 mins, and passed the solution through our sensor. Within seconds, particles could be observed translocating the device, FIG. 32*a*. Using a particle of known size and concentration we calculated the average size to be 21.9 µm at $6.52 \times 10^3$ particles/mL. We acknowledge that unlike in the previous study we cannot be counting the entire particle size range and the number of nanoplastics are not included in this value. Teabags from several manufacturers were tested, and the total number of particles shed from one teabag was as high as $6.52 \times 10^4$. The presence of the particles was consistent across several tea manufactures, and analysis via SEM confirmed the particles were carbon based. Varying the ionic strength of the liquid produced interesting effects, FIG. 32*b*. At lower ionic strengths, the pulse direction inverted and conductive pulses are prominently recorded. The inversion of the pulse could be caused by two factors, the first is that the polymers may contain a higher concentration of ions, making them "conductive" relative to the surrounding liquid; similar effects have been seen in hydrogels. Alternatively, the high surface area seen in the SEM, combined with the lower ionic strength and a larger double layer, could result in a dense ion cloud around each particle that increase the conductivity of the liquid during each translocation. When the same polymer purchased with a smooth surface was placed into the device, only resistive pulses were recorded even at low ionic strengths. Porous silica particles found within toothpastes also produced predominantly conductive pulses at lower ionic strengths. Whilst the conductive pulse gives an indication of a change in physical properties, the lack or suitable calibrants makes it harder to size the particles using conductive pulses. For a fully automated screening device, confirmation of the chemical nature of the particles may require additional sensors embedded into the channels and is the scope of future work. However, the pulse direction may give an early indication of man-made particles.

Figure 32:
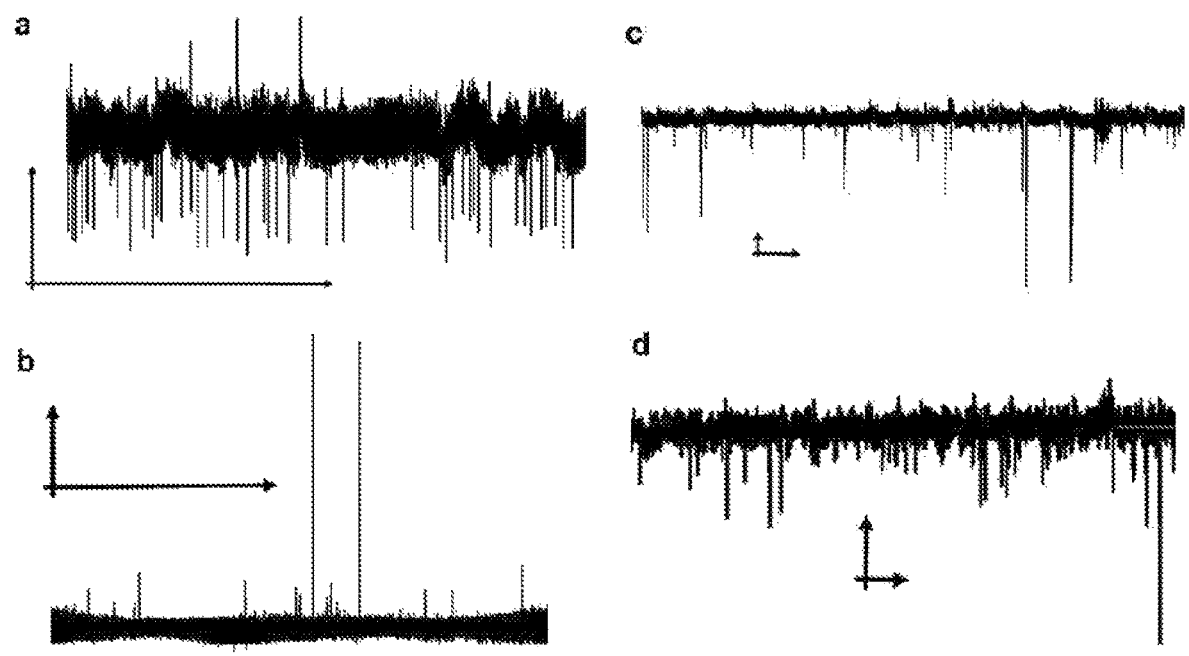
FIG. 32 shows signals obtained from (a) Microplastic particles run in 50 mM KCl, voltage, 0.4 V, b) Microplastic particles run in 0.25 mM KCl, 7.5 V c) Algae particles run in 50 mM KCl, 0.7 V, and d) 0.25 mM KCl 7 V. In all images scale bar is x=10 sec. y=0.5 nA.

Within oceans, counting plastics in the presence of biological particles is challenging. The results in FIG. 32, however, suggest that bacteria and algae particles, which have fairly smooth surfaces, should also give resistive pulses. This is confirmed within the data shown in FIGS. 32*c* and *d*. Here a series of data collected for algae particles across a range of ionic strengths is presented. FIG. 32 demonstrates that the algae always produce resistive pulses across all ionic strengths. This interesting observation may allow scientist to rapidly screen samples for the presence of plastics.

Figure 33:
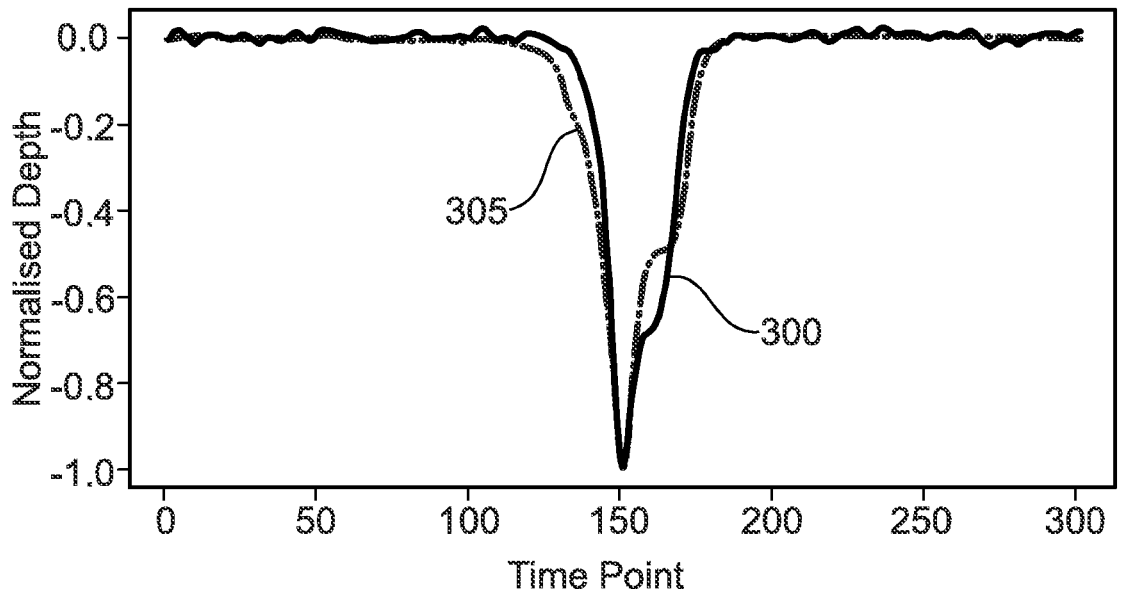
FIG. 33 shows a) average pulse shapes of the spherical algae (300) to the rod shape algae (305), b) The average pulse shape for the rod algae across pressures, 50 mbar (310), 100 mbar (312), 125 mbar (312) and 150 mbar (316)
Figure 33:
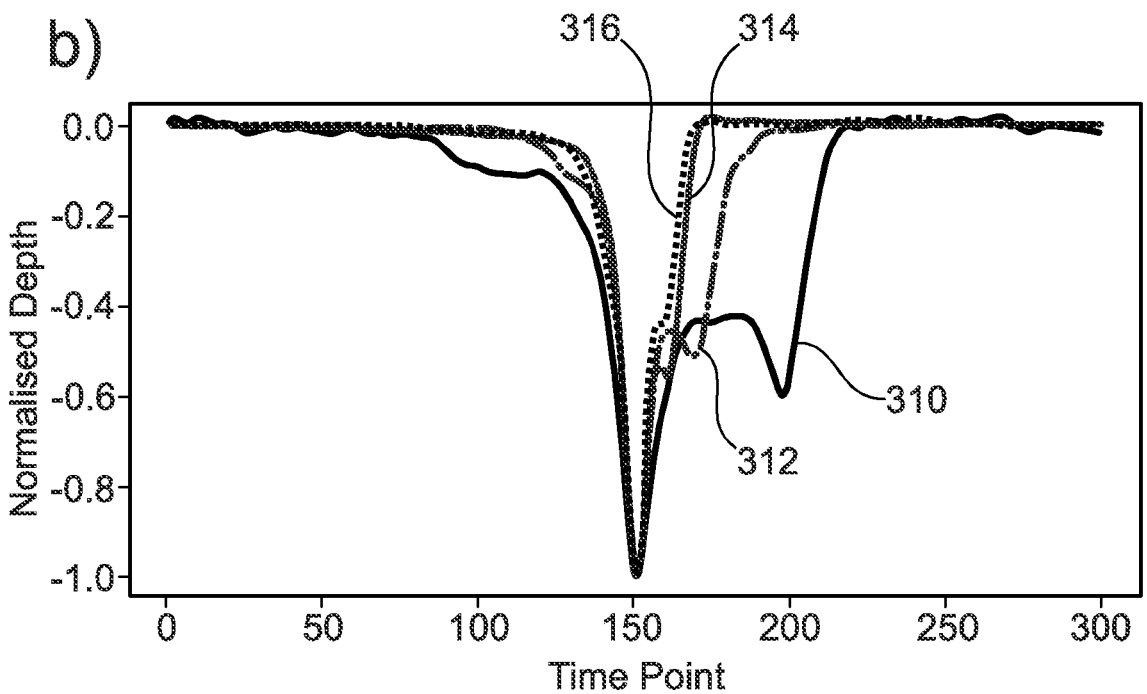

Diatoms and algae are known to come in a variety of shapes depending upon the strain. Thus, a description of particle shape may help with the identification. Here we placed a rod-shaped algae (*Navicula ramosissima*) and some spherical algae (*Aurantiochytrium Mangrovei*) through the device. We have previously shown how the shape of a particle can be inferred from the shape of the pulse it generates. FIG. 33 shows the average depth-normalised pulse shapes for the two algae strains and their corresponding calibration bead runs. In order to quantify the differences between the pulses arising from algae and calibrants, the pulses were approximated by splines and the spline coefficients compared using the modelling method described above. For these models the splines just before pulse minimum, and around the second peak in each pulse were used, as they showed the greatest differences between the algae and calibrants. For each type of algae, the model and device were calibrated against a sphere run under the same assembly. When comparing the calibrants to the algae, the model was able to correctly identify 87% of algae spheres and 86% of algae rods. This signifies that most of the algae can be identified against a spherical calibrant. For comparison, when two runs of calibration spheres were run under the same assembly, the model correctly identified the run for only 66% of the spheres, which is close to the random 50% correct classification expected when pulses from two runs are identical. A surprising outcome of the data sets was the ability to identify spherical algae. Whilst their general shape should be similar to the calibrants, the algae have a flexible surface which may be deformed within the fluidic system. The deformation of biological particles has been explored for cells and exosomes and here the same feature may help differentiate the biological particle from manmade ones. This establishes that the device can be used for shape analysis, and this is likely to improve with an optimised run method and model. A second unexpected and favourable outcome from the analysis was that the device was capable of shape analysis across multiple uses, e.g. days and assemblies, as long as it was calibrated each time; this is in contrast to the current commercial system that the model was originally developed for, which lost the ability to detect shape permanently after a much shorter period of use. The flow rate used to count the algae also affects the quality of the pulse shape information; as shown in FIG. 33*b*, the shape of the pulses from the two strains converge at higher flow rates.

The invention may be defined by the following clauses:

1. A first particle sensor comprising:
   a base comprising a microfluidic channel, wherein the microfluidic channel comprises a first electrode and a second electrode positioned along the microfluidic channel, wherein the first particle sensor is configured such that when a fluid sample comprising at least one particle passes along the microfluidic channel and over the first and second electrodes, under the application of a potential difference between the first and second electrodes, each of the at least one particle is recorded as a resistive pulse.

2. A second particle sensor comprising:
   a holder which houses a membrane and an electrode, wherein the membrane comprises at least one hole, wherein the second particle sensor is configured such that when a fluid sample comprising at least one particle passes through the at least one hole of the membrane, the electrode detects at least one particle in the fluid sample records a resistive pulse.

3. A device for characterisation of one or more particles in a fluid sample comprising:
   (iii) a first particle sensor according to clause 1; and/or
   (iv) at least one second particle sensor according to clause 2,
   wherein the device further comprises a fluid inlet and a fluid outlet which are connected by the first particle sensor of clause 1, wherein in use, the fluid sample flows in through the inlet, along the microfluidic channel of the first particle sensor, over the first and second electrodes, and exits through the fluid outlet under the application of a potential difference between the first and second electrodes, and wherein each of the at least one particle is recorded as a resistive pulse.

4. The device according to clause 3, wherein the device comprises at least one second particle sensor according to clause 2, which is positioned within the microfluidic channel.

5. The device according to clause 3 or clause 4, wherein each of the components of the device are 3D printed.

6. The device according to any one of clauses 3 to 5, wherein the device further comprises a lid which is configured to seal the microfluidic channel of the device and create a constriction within the microfluidic channel, so as to tune the sensitivity of the first particle sensor.

7. The device according to clause 6, wherein the lid comprises a primary ridge which fits into and is configured to seal the microfluidic channel.

8. The device according to clause 7, wherein the primary ridge further comprises a secondary ridge extending from the primary ridge, wherein the secondary ridge comprises a conduit which allows the fluid sample to flow through the secondary ridge when the lid seals the microfluidic channel.

9. The device according to any one of clauses 3 to 8, wherein the base further comprises a groove which comprises an O-ring which surrounds the microfluidic channel and is configured to prevent leaks from the microfluidic channel.

10. The device according to any one of clauses 3 to 9, wherein the device comprises a polymer layer between the lid and the base, wherein the polymer layer is configured to seal the device, preferably wherein the polymer layer is a polydimethyl siloxane (PDMS). Where the thickness of the PDMS also tunes the channel.

11. The device according to any one of clauses 3 to 10, wherein the microfluidic channel is filled with an electrolyte solution.

12. The device according to any one of clauses 3 to 11, wherein the second particle sensor is filled with an electrolyte solution between the membrane and the electrode.

13. The device according to any one of clauses 3 to 12, wherein the second particle sensor membrane (9) is selected from the group consisting of silicon nitride, polyurethane and polyester.

14. The device according to any preceding clause wherein the first particle sensor is configured to detect particles of from 5 μm to 100 μm in size.

15. The device according to any of clauses 2 to 13, wherein the second particle sensor is configured to detect particles of from 1 μm to 100 μm in size.

16. The device according to any of clauses 3 to 15, wherein the device is configured on a chip.

17. A method of characterising one or more particles in a fluid sample comprising the device according to any one of clauses 3 to 16, wherein the method comprises passing a fluid sample comprising at least one particle through the fluid inlet, along the microfluidic channel, over the first and second electrodes, and out of the fluid outlet; and wherein under the application of a potential difference between the first and second electrodes, each of the at least one particles present in the fluid sample is recorded as a resistive pulse.

18. The method according to clause 17, wherein the first particle sensor can detect particles of 5 μm to 100 μm in size.

19. The method according to clause 17 or clause 18, wherein the second particle sensor can detect particles of 1 nm to 100 μm in size.

20. The method according to any of clauses 17 to 19, wherein the method further comprises the step of using predictive logistic regression models to characterise the resistive pulses.

21. The method according to any of clauses 17 to 19, wherein the method is for characterization of one or more of:
   cells in body fluids
   (ii) organic compounds, proteins, cells, bacteria, viruses, DNA, exosomes, colloids and nanomedicines.

22. The method according to any one of clauses 17 to 21, wherein the method is used for in-line sensing of one or more fluid samples for high-throughput processing.

23. A computer program, recorded on a computer-readable storage medium, configured to, when executed by a computer processor, perform at least:
   receiving, as input, data representing a resistive pulse corresponding to a particle, the resistive pulse obtained by a particle sensor according to any of clauses 1 to 3;
   comparing the received data to prestored characterising shape and size data representing particles of known shape and size;
   determining, based on the comparison, one or more of the shape and size of the at least one particle; and
   outputting the determined one or more of the shape and size of the particle.

The invention claimed is:

1. A device for characterization of one or more particles in a fluid sample, the device comprising:
   an inlet;
   an outlet;
   a microfluidic channel extending between the inlet and the outlet and providing an axial flow path for fluid flowing therealong;
   a particle sensor for detecting the passage of particles moving along the axial flow path first and second electrodes positioned along the microfluidic channel;
   wherein, in use, one or more particles flowing along the microfluidic channel are detected by the first particle sensor and passage of said one or more particles is recorded as a pulse; and
   wherein the device further comprises at least one second particle sensor for detecting particles comprising a nanopore and wherein the nanopore of the second particle sensor is located in a second channel which extends from the microfluidic channel of the first particle sensor.

2. The device of claim 1, wherein the particle sensor is located within the microfluidic channel or extends at an angle to the microfluidic channel.

3. The device of claim 1, wherein the first particle sensor is configured to detect particles of from 1 μm to 100 μm in size.

4. The device of claim 1, wherein the second particle sensor is configured to detect particles within a different size range to the first particle sensor, for example to detect particles of from 1 nm to 1 μm in size.

5. The device of claim 4, wherein the second particle sensor is located downstream of a detection region of the first particle sensor.

6. The device of claim 1, wherein the nanopore of the second particle sensor is a solid state nanopore comprising a hole formed in a membrane.

7. The device of claim 4, wherein the second particle sensor comprises an electrode.

8. The device of claim 1, wherein the second particle sensor comprises a holder which houses the nanopore and an electrode, wherein the holder has a second channel therein in which the nanopore is located.

9. The device of claim 8, wherein the holder is in the form of a plug or screw which is releasably inserted into a port in the base of the first particle sensor, such that a fluid connection is formed between the microfluidic channel and the second channel.

10. The device of claim 4, comprising two or more second particle sensors and wherein each of the second particle sensors is configured to detect a different particle size range.

11. The device of claim 1, wherein the device comprises a third sensor configured for measuring a parameter of the fluid, and wherein the parameter may be selected from temperature, pH, oxygen content, ionic strength and viscosity.

12. The device of claim 1, wherein the device further comprises a lid which is configured to seal the microfluidic channel.

13. The device of claim 12, wherein the lid comprises a primary ridge which is configured to be received within the microfluidic channel, thereby reducing the volume of the channel.

14. The device of claim 13, wherein the primary ridge further comprises a secondary ridge extending from the primary ridge, thereby creating a constriction within the microfluidic channel and wherein the primary ridge and the secondary ridge together span the height and width of the microfluidic channel, and wherein the secondary ridge comprises a conduit which allows fluid to flow through the secondary ridge when the lid seals the microfluidic channel.

15. The device of claim 12, wherein the lid comprises a polymer layer on a surface of the lid which mates with the base so as to seal the microfluidic channel and wherein the lid is attached to the or a base with one or more screws and wherein upon tightening the screws the polymer layer can be forced into the microfluidic channel, thereby reducing the volume of the channel.

16. A kit for characterization of one or more particles in a fluid sample, the kit comprising:
   a device comprising a first particle sensor according to claim 1; and
   at least one second particle sensor for connecting to the base of the first particle sensor.

17. A device for characterization of one or more particles in a fluid sample, the device comprising:
   a first particle sensor comprising a base comprising a microfluidic channel, wherein the microfluidic channel comprises a first electrode and a second electrode positioned along the microfluidic channel, and a detection region between the first and second electrodes;
   an inlet; and
   an outlet;
   wherein the device further comprises at least one second particle sensor for detecting particles comprising a nanopore and wherein the nanopore of the second particle sensor is located in a second channel which extends from the microfluidic channel of the first particle sensor; and
   wherein in use, a fluid sample comprising at least one particle flows in through the inlet, along the microfluidic channel of the first particle sensor, over the first and second electrodes, and exits through the fluid outlet, and wherein the passage of said at least one particle through the detection region is recorded as a pulse.

18. A computer implemented method, the method comprising:
   receiving, as an input from a particle sensor having first and second electrodes, pulse data representing a current pulse corresponding to a particle, and
   comparing the received data to prestored characterizing shape data representing particles of known shape;
      determining, based on the comparison, a shape of the at least one particle; and
      outputting an indication of the determined shape of the particle.

19. The method of claim 18, wherein the prestored characterizing shape data comprises one or more spline coefficients representing the particles of known shape and wherein the one or more spline coefficients are one or more spline coefficients for b-splines representing the particles of known shape or are a predetermined set of spline coefficients representing the particles of known shape.

* * * * *